(12) United States Patent
Zimmerman et al.

(10) Patent No.: US 11,735,186 B2
(45) Date of Patent: Aug. 22, 2023

(54) HYBRID LIVE CAPTIONING SYSTEMS AND METHODS

(71) Applicant: 3Play Media, Inc., Boston, MA (US)

(72) Inventors: Roger S. Zimmerman, Boston, MA (US); Christopher S. Antunes, Winchester, MA (US); Stephanie A. Laing, Somerville, MA (US); John W. Slocum, Newton, MA (US); Nicholas R. Moutis, Somerville, MA (US); Theresa M. Kettelberger, Cambridge, MA (US)

(73) Assignee: 3Play Media, Inc., Boston, MA (US)

( * ) Notice: Subject to any disclaimer, the term of this patent is extended or adjusted under 35 U.S.C. 154(b) by 7 days.

(21) Appl. No.: 17/467,764

(22) Filed: Sep. 7, 2021

(65) Prior Publication Data

US 2023/0077037 A1    Mar. 9, 2023

(51) Int. Cl.
  *G10L 15/26*   (2006.01)
  *G10L 15/01*   (2013.01)
  *G06F 40/56*   (2020.01)
  *G06F 40/166*  (2020.01)
  *G10L 15/28*   (2013.01)

(52) U.S. Cl.
  CPC ............ *G10L 15/26* (2013.01); *G06F 40/166* (2020.01); *G06F 40/56* (2020.01); *G10L 15/01* (2013.01); *G10L 15/285* (2013.01)

(58) Field of Classification Search
  CPC ....... G10L 15/26; G10L 15/01; G10L 15/285; G06F 40/56; G06F 40/166
  USPC ....................................................... 704/235
  See application file for complete search history.

(56) References Cited

U.S. PATENT DOCUMENTS

| | | |
|---|---|---|
| 5,179,627 A | 1/1993 | Sweet et al. |
| 5,298,995 A | 3/1994 | Monta |
| 5,477,274 A | 12/1995 | Akiyoshi |
| 5,508,754 A | 4/1996 | Orphan |
| 5,537,151 A | 7/1996 | Orr |
| 5,721,940 A | 2/1998 | Luther et al. |
| 6,097,442 A | 8/2000 | Rumreich |
| 6,172,675 B1 | 1/2001 | Ahmed et al. |
| 6,243,419 B1 | 6/2001 | Satou et al. |
| 6,363,380 B1 | 3/2002 | Dimitrova |
| 6,473,778 B1 | 10/2002 | Gibbon |
| 6,505,153 B1 | 1/2003 | Van Thong et al. |

(Continued)

OTHER PUBLICATIONS

R. V. Cox, B. G. Haskell, Y. LeCun, B. Shahraray and L. Rabiner, "On the applications of multimedia processing to communications," in Proceedings of the IEEE, vol. 86, No. 5, pp. 755-824, May 1998, doi: 10.1109/5.664272. (Year: 1998).*

(Continued)

*Primary Examiner* — Bharatkumar S Shah
(74) *Attorney, Agent, or Firm* — Finch & Maloney PLLC

(57) ABSTRACT

A computer system configured to generate captions is provided. The computer system includes a memory and a processor coupled to the memory. The processor is configured to access a first buffer configured to store text generated by an automated speech recognition (ASR) process; access a second buffer configured to store text generated by a captioning client process; identify either the first buffer or the second buffer as a source buffer of caption text; generate caption text from the source buffer; and communicate the caption text to a target process.

48 Claims, 20 Drawing Sheets

(56) References Cited

U.S. PATENT DOCUMENTS

| | | |
|---|---|---|
| 6,580,437 B1 | 6/2003 | Liou et al. |
| 6,710,811 B1 | 3/2004 | Lin et al. |
| 6,980,953 B1 | 12/2005 | Kanevsky et al. |
| 7,006,881 B1 | 2/2006 | Hoffberg |
| 7,016,844 B2 | 3/2006 | Othmer et al. |
| 7,031,998 B2 | 4/2006 | Archbold |
| 7,165,264 B1 | 1/2007 | Westrick |
| 7,206,029 B2 | 4/2007 | Cohen-Solal |
| 7,346,489 B1 | 3/2008 | Bever et al. |
| 7,558,735 B1 | 7/2009 | Obilisetty |
| 7,661,121 B2 | 2/2010 | Smith et al. |
| 8,346,563 B1 | 1/2013 | Hjelm |
| 8,918,311 B1 | 12/2014 | Johnson et al. |
| 9,460,719 B1 | 10/2016 | Antunes |
| 2002/0075403 A1 | 6/2002 | Barone, Jr. et al. |
| 2002/0077833 A1 | 6/2002 | Arons et al. |
| 2002/0122136 A1 | 9/2002 | Safadi |
| 2002/0128842 A1 | 9/2002 | Hoi et al. |
| 2002/0140862 A1 | 10/2002 | Dimitrova |
| 2003/0169366 A1 | 9/2003 | Lenzi |
| 2003/0189669 A1 | 10/2003 | Bowser |
| 2003/0190148 A1 | 10/2003 | Lee |
| 2004/0125877 A1 | 7/2004 | Chang et al. |
| 2004/0170392 A1 | 9/2004 | Lu et al. |
| 2004/0255249 A1 | 12/2004 | Chang et al. |
| 2006/0026052 A1 | 2/2006 | Klett |
| 2007/0033515 A1 | 2/2007 | Sull et al. |
| 2007/0118801 A1 | 5/2007 | Harshbarger et al. |
| 2007/0253680 A1 | 11/2007 | Mizote et al. |
| 2008/0059173 A1 | 3/2008 | Gilbert et al. |
| 2008/0276159 A1 | 11/2008 | Narayanaswami et al. |
| 2009/0222346 A1 | 9/2009 | Greene |
| 2009/0273711 A1 | 11/2009 | Chapdelaine |
| 2010/0125450 A1 | 5/2010 | Michaelangelo et al. |
| 2010/0223128 A1 | 9/2010 | Dukellis et al. |
| 2010/0257444 A1 | 10/2010 | Bever et al. |
| 2011/0022394 A1 | 1/2011 | Wide |
| 2011/0069230 A1* | 3/2011 | Polumbus ............... G10L 15/26 707/711 |
| 2011/0099006 A1 | 4/2011 | Sundararaman |
| 2012/0155658 A1 | 6/2012 | Tsunoo et al. |
| 2012/0281139 A1 | 11/2012 | Zhang |
| 2012/0293712 A1 | 11/2012 | Mountain |
| 2012/0304062 A1 | 11/2012 | Schultz et al. |
| 2012/0315009 A1 | 12/2012 | Evans et al. |
| 2013/0011121 A1 | 1/2013 | Forsyth et al. |
| 2013/0060572 A1 | 3/2013 | Garland et al. |
| 2013/0100347 A1 | 4/2013 | Zinovieva |
| 2013/0124984 A1 | 5/2013 | Kuspa |
| 2014/0105505 A1 | 4/2014 | Ioffe et al. |
| 2014/0122069 A1 | 5/2014 | Bravin |
| 2015/0066505 A1* | 3/2015 | Baker .................... G10L 15/08 704/235 |
| 2018/0270350 A1* | 9/2018 | Engelke ............. H04M 1/2475 |

OTHER PUBLICATIONS

I. Gonzílez-Carrasco, L. Puente, B. Ruiz-Mezcua and J. L. López-Cuadrado, "Sub-Sync: Automatic Synchronization of Subtitles in the Broadcasting of True Live programs in Spanish," in IEEE Access, vol. 7, pp. 60968-60983, 2019, doi: 10.1109/ACCESS.2019.2915581. (Year: 2019).*

R. V. Cox, B. G. Haskell, Y. LeCun, B. Shahraray and L. Rabiner, "On the applications of multimedia processing to communications," in Proceedings of the IEEE, vol. 86, No. 5, pp. 755-824, May 1998, doi: 10.1109/5.664272. (Year: 1998) (Year: 1998).*

I. Gonzalez-Carrasco, L. Puente, B. Ruiz-Mezcua and J. L. L6pez-Cuadrado, "Sub-Sync: Automatic Synchronization of Subtitles in the Broadcasting of True Live programs in Spanish," in IEEE Access, vol. 7, pp. 60968-60983, 2019, doi: 10.1109/ACCESS.2019.2915581. (Year: 2019) (Year: 2019).*

M. de Castro, D. Carrero, L. Puente and B. Ruiz, "Real-time subtitle synchronization in live television programs," 2011 IEEE International Symposium on Broadband Multimedia Systems and Broadcasting (BMSB), Nuremberg, Germany, 2011, pp. 1-6, doi: 10.1109/BMSB.2011.5954889. (Year: 2011).*

Ramshaw, et al; Text Chunking using Transformation-Based Learning, ACL Third Workshop on Very Large Corpora, Jun. 1995, pp. 82-94.

EEG Enterprises, Inc.,"Lexi Automatic Captioning Service for Live Video", Internet Archive, as captured May 17, 2021, http://web.archive.org/web/20210517150540/https:/eegent.com/products/QAM44XW07EVXHHZS/lexiTM-automatic-captioning.

* cited by examiner

User Interface Screen 600

Add Event Instructions: Monthly Company Meeting ✕

Event Name ← Name Control 602

[Event Name (internal use only)]

Event Description ← Description Control 604

Additional context around the event, such as time, location, place, purpose of the event.

[Enter event description here]

Speaker Names ← Speaker Control 606

Add a list of names of people who may be speaking during the event to more accurately caption speaker labels.

[Speaker Name]   ⊗ Delete Speaker

+ New Speaker

FIG. 6

HYBRID LIVE CAPTIONING SYSTEMS AND METHODS

RELATED APPLICATIONS

The present application relates to U.S. patent application Ser. No. 13/246,123, titled "ELECTRONIC TRANSCRIPTION JOB MARKET" and filed on Sep. 27, 2011, ("'Electronic Transcription Job Market' application"), which is incorporated herein by reference in its entirety. The present application relates to U.S. Pat. No. 9,576,498, titled "SYSTEMS AND METHODS FOR AUTOMATED TRANSCRIPTION TRAINING" and issued on Feb. 21, 2017, ("'Transcription Training' application"), which is incorporated herein by reference in its entirety.

NOTICE OF MATERIAL SUBJECT TO COPYRIGHT PROTECTION

Portions of the material in this patent document are subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

Technical Field

The technical field relates generally to the transcription of content and, more particularly, to systems and methods for providing automated captioning services based on automatically and manually generated text.

Discussion

Providing captions for live video is technically difficult. Current speech recognition and natural language processing algorithms produce captions known to have a number of common error modes. Examples of these error modes include word recognition inaccuracies (e.g. "wreck a nice beach" instead of "recognize speech"), erroneous insertion of words during background noise or music, omission of words due to poor microphone placement or low speaker volumes, numeric formatting errors (e.g. "3 oh four", whereas "304" would be preferred), spelling errors, especially for proper nouns, which are often critical for understanding and branding, punctuation and capitalization errors, missing speaker labels (a known very difficult task for current automated technologies), and missing annotation of sound effects (e.g. "[APPLAUSE]" or "[MUSIC PLAYING]"), which is also a known difficult task for current automated technologies. These limitations result in approximately 80-90% overall accuracy.

SUMMARY

Example systems and processes disclosed herein address the accuracy limitations of the current solutions, by providing a hybrid system which flexibly combines automated speech recognition (ASR) with skilled human captioners to allow customers to optimize the tradeoff between cost and caption quality. These systems and processes also support the use case wherein a live stream is subsequently provided on the internet as on-demand video, perhaps in an edited form, where the functional and legal requirements for captioning accuracy are much more stringent. Some of these example systems are targeted for inclusion in the "Live Auto Captioning" service provided by 3Play Media, of Boston, Mass.

In at least one example, a computer system is provided. The computer system is configured to generate captions. The computer system includes a memory and at least one processor coupled to the memory. The at least one processor is configured to access a first buffer configured to store text generated by an automated speech recognition (ASR) process; access a second buffer configured to store text generated by a captioning client process; identify either the first buffer or the second buffer as a source buffer of caption text; generate caption text from the source buffer; and communicate the caption text to a target process.

Examples of the computer system can include one or more of the following features. In the system, to identify either the first buffer or the second buffer can include to always identify the second buffer. To identify either the first buffer or the second buffer can include to identify the second buffer by default; and identify the first buffer after expiration of a threshold time period since the text generated by the captioning client process was last received in the second buffer. The system can further include the captioning client process. The captioning client process can be configured to generate heartbeat messages. In the system, to identify either the first buffer or the second buffer can include to identify the second buffer by default; and identify the first buffer after expiration of a threshold time period since a heartbeat message was last generated by the captioning client process.

In the system, the first buffer can be further configured to store a confidence metric regarding the text generated by the ASR process; and to identify either the first buffer or the second buffer comprises to identify the first buffer where the confidence metric exceeds a threshold value. The second buffer can be further configured to store a confidence metric regarding the text generated by the captioning client process; and to identify either the first buffer or the second buffer comprises to identify the second buffer where the confidence metric exceeds a threshold value. The first buffer can be further configured to store a confidence metric regarding the text generated by the ASR process; the second buffer can be further configured to store a confidence metric regarding the text generated by the captioning client process; and to identify either the first buffer or the second buffer comprises to identify a buffer storing a higher confidence metric as the source buffer.

In the system, to identify either the first buffer or the second buffer can include to calculate a percentage of words within the first buffer that match to corresponding words in the second buffer; and identify the first buffer as the source buffer where the percentage of words transgresses an accuracy threshold. To identify either the first buffer or the second buffer can include to identify a buffer storing words with greater frequency as the source buffer. To identify either the first buffer or the second buffer can include to identify a buffer storing words with less latency as the source buffer. To identify either the first buffer or the second buffer can include to identify a buffer storing a greater number of words from a wordlist as the source buffer.

The system can further include a network interface. In the system, the at least one processor can be further configured to receive event content via the network interface; communicate the event content to the ASR process; receive the text generated by the ASR process based on the event content; and store the text generated by the ASR process in the first buffer. In the system, the ASR process can be a first ASR process and the captioning client process can be configured to receive vocal input from a user; communicate the vocal input to a second ASR process; receive text generated by the second ASR process based on the vocal input; and store the text generated by the second ASR process in the second buffer. The captioning client process can be further configured to receive the event content; and present the event content via a user interface. The first ASR process and the second ASR process can be distinct processes. The captioning client process can be further configured to receive additional input from the user; and modify the text generated by the second ASR process based on the additional input before the text generated by the second ASR process is stored in the second buffer.

In at least one example, a method of generating captions is provided. The method includes accessing a first buffer configured to store text generated by an automated speech recognition (ASR) process; accessing a second buffer configured to store text generated by a captioning client process; identifying either the first buffer or the second buffer as a source buffer of caption text; generating caption text from the source buffer; and communicating the caption text to a target process.

Examples of the method can include one or more of the following features. In the method, identifying either the first buffer or the second buffer can include identifying the second buffer only. The method can further include storing the text generated by the ASR process in the first buffer; and storing the text generated by the captioning client process in the second buffer. In the method, identifying either the first buffer or the second buffer can include identifying the second buffer by default; and identifying the first buffer after expiration of a threshold time period since text was last stored in the second buffer. The method can further include generating heartbeat messages. In the method, identifying either the first buffer or the second buffer can include identifying the second buffer by default; and identifying the first buffer after expiration of a threshold time period since a heartbeat message was last generated.

The method can further include accessing a confidence metric regarding the text generated by the ASR process. In the method, identifying either the first buffer or the second buffer can include identifying the first buffer where the confidence metric exceeds a threshold value. The method can further include accessing a confidence metric regarding the text generated by the captioning client process. In the method, identifying either the first buffer or the second buffer can include identifying the second buffer where the confidence metric exceeds a threshold value. The method can further include accessing a confidence metric regarding the text generated by the ASR process; accessing a confidence metric regarding the text generated by the captioning client process; and identifying either the first buffer or the second buffer comprises identifying a buffer storing a higher confidence metric as the source buffer.

In the method, identifying either the first buffer or the second buffer can include calculating a percentage of words within the first buffer that match to corresponding words in the second buffer; and identifying the first buffer as the source buffer where the percentage of words transgresses an accuracy threshold. Identifying either the first buffer or the second buffer can include identifying a buffer storing words with greater frequency as the source buffer. Identifying either the first buffer or the second buffer can include identifying a buffer storing words with less latency as the source buffer. Identifying either the first buffer or the second buffer can include identifying a buffer storing a greater number of words from a wordlist as the source buffer.

The method can further include receiving event content via a network interface; communicating the event content to the ASR process; receiving the text generated by the ASR process based on the event content; and storing the text generated by the ASR process in the first buffer. In the method, the ASR process can be a first ASR process and the method further include receiving vocal input from a user; communicating the vocal input to a second ASR process; receiving text generated by the second ASR process based on the vocal input; and storing the text generated by the second ASR process in the second buffer. The method can further include receiving the event content; and presenting the event content via a user interface. In the method, communicating the vocal input to the second ASR process can include communicating the vocal input to a second ASR process that is distinct from the first ASR process. The method can further include receiving additional input from the user; and modifying the text generated by the second ASR process based on the additional input before the text generated by the second ASR process is stored in the second buffer.

In at least one example, one or more non-transitory computer readable media are provided. The one or more non-transitory computer readable media store computer-executable sequences of instructions to generate captions via a computer system. The sequences of instructions comprising instructions to access a first buffer configured to store text generated by an automated speech recognition (ASR) process; access a second buffer configured to store text generated by a captioning client process; identify either the first buffer or the second buffer as a source buffer of caption text; generate caption text from the source buffer; and communicate the caption text to a target process.

Examples of the one or more non-transitory computer readable media can include one or more of the following features. In the media, the instructions to identify either the first buffer or the second buffer can include instructions to identify the second buffer only. The sequences of instructions further include instructions to store the text generated by the ASR process in the first buffer; and store the text generated by the captioning client process in the second buffer. The instructions to identify either the first buffer or the second buffer can include instructions to identify the second buffer by default; and identify the first buffer after expiration of a threshold time period since text was last stored in the second buffer. The sequences of instructions further include instructions to generate heartbeat messages. The instructions to identify either the first buffer or the second buffer can include instructions to identify the second buffer by default; and identify the first buffer after expiration of a threshold time period since a heartbeat message was last generated.

In the media, the sequences of instructions can further include instructions to access a confidence metric regarding the text generated by the ASR process. The instructions to identify either the first buffer or the second buffer can include instructions to identify the first buffer where the confidence metric exceeds a threshold value. The sequences of instructions can further include instructions to access a confidence metric regarding the text generated by the captioning client process, wherein the instructions to identify either the first buffer or the second buffer comprises instructions to identify the second buffer where the confidence metric exceeds a threshold value. The sequences of instructions can further include instructions to access a confidence metric regarding the text generated by the ASR process; and access a confidence metric regarding the text generated by the captioning client process. The instructions to identify either the first buffer or the second buffer can include instructions to identify a buffer storing a higher confidence metric as the source buffer.

In the media, the instructions to identify either the first buffer or the second buffer can include instructions to calculate a percentage of words within the first buffer that match to corresponding words in the second buffer; and identify the first buffer as the source buffer where the percentage of words transgresses an accuracy threshold. The instructions to identify either the first buffer or the second buffer can include instructions to identify a buffer storing words with greater frequency as the source buffer. The instructions to identify either the first buffer or the second buffer can include instructions to identify a buffer storing words with less latency as the source buffer. The instructions to identify either the first buffer or the second buffer can include instructions to identify a buffer storing a greater number of words from a wordlist as the source buffer.

In the media, the sequences of instructions can further include instructions to receive event content via a network interface; communicate the event content to the ASR process; receive the text generated by the ASR process based on the event content; and store the text generated by the ASR process in the first buffer. The ASR process can be a first ASR process and the sequences of instructions can further include instructions to receive vocal input from a user; communicate the vocal input to a second ASR process; receive text generated by the second ASR process based on the vocal input; and store the text generated by the second ASR process in the second buffer. In the media, the sequences of instructions can further include instructions to receive the event content; and present the event content via a user interface. The instructions to communicate the vocal input to the second ASR process can include instructions to communicate the vocal input to a second ASR process that is distinct from the first ASR process. The sequences of instructions can further include instructions to receive additional input from the user; and modify the text generated by the second ASR process based on the additional input before the text generated by the second ASR process is stored in the second buffer.

Still other aspects and advantages of various examples are discussed in detail below. It is to be understood that both the foregoing information and the following detailed description are merely illustrative of various aspects and examples and are intended to provide an overview or framework for understanding the nature and character of the claimed aspects and examples. Any example disclosed herein may be combined with any other example. References to "an example," "some examples," "at least one example," "another example," "other examples," or the like are not necessarily mutually exclusive and are intended to indicate that a particular feature, structure, or characteristic described in connection with the example may be included in at least one example. The appearances of such terms herein are not necessarily all referring to the same example.

BRIEF DESCRIPTION OF DRAWINGS

Various aspects of at least one example are discussed below with reference to the accompanying figures, which are not intended to be drawn to scale. The figures are included to provide an illustration and a further understanding of the various aspects and examples, and are incorporated in and constitute a part of this specification, but are not intended as a definition of the limits of any particular example. The drawings, together with the remainder of the specification, serve to explain principles and operations of the described and claimed aspects and examples. In the figures, each identical or nearly identical component that is illustrated in various figures is represented by a like numeral. For purposes of clarity, not every component may be labeled in every figure. In the figures:

FIG. 6 is a front view of another user interface screen provided by a customer interface according to one example of the present disclosure;

DETAILED DESCRIPTION

Figure 1:
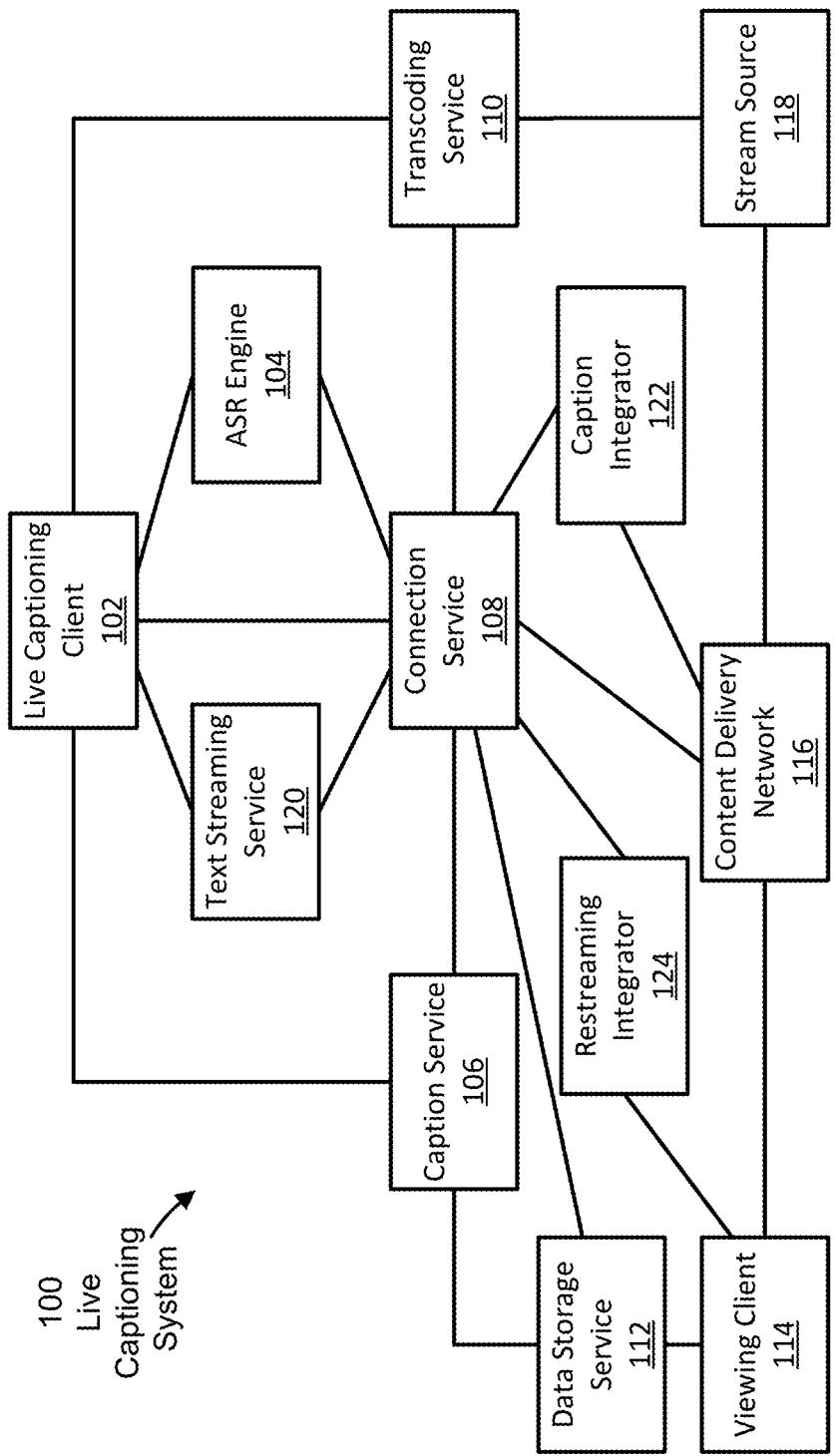
FIG. 1 is a block diagram illustrating an architecture of a live caption system according to one example of the present disclosure.

As summarized above, some examples disclosed herein include apparatus and processes for generating captions using a computer system. Various apparatus and processes included in these examples implement a variety of useful features. For instance, according to some examples, a process executed by a specially configured computer system generates captions by arbitrating between a stream of text captured from input received from a skilled human captioner and a stream of text automatically generated by an ASR engine. In these examples, the arbitration process executed by the computer system can adjust a variety of parameters to improve quality of the captions. These parameters can include a level of accuracy of the captions, a level of involvement of a human captioner, a level of involvement of automated captioning, and latency between utterance of a word in content and display of the word in the captions. Further, in certain examples, the specially configured computer system further enhances caption quality by producing captions that adhere to specific caption formats and a level of tolerance for potentially offensive words. In addition, the specially configured computer system also enhances the customer's overall experience by integrating with a variety of platforms and cloud-based storage services to broadcast and store the captions and content incorporating the captions. These and other advantageous features will be apparent in view of this disclosure.

Examples of the methods and systems discussed herein are not limited in application to the details of construction and the arrangement of components set forth in the following description or illustrated in the accompanying drawings. The methods and systems are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, examples, components, elements or acts of the systems and methods herein referred to in the singular may also embrace examples including a plurality, and any references in plural to any example, component, element or operation herein may also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls. It should be noted that any threshold or threshold value described herein may be both configurable and/or predefined.

Live Captioning System

Various examples utilize one or more computer systems to implement a live captioning system that is configured to receive orders for captioning services from customers and to provide, to the customers, captioning of customer content. FIG. 1 is a block diagram illustrating one particular example of such a system, a live captioning system 100. Each of the blocks included in FIG. 1 depicts one or more processes implemented by computer hardware or a combination of computer hardware and computer software. These processes include a live captioning client 102, an ASR engine 104, a caption service 106, a connection service 108, a transcoding service 110, data storage service 112, a viewing client 114, a content delivery network 116, a stream source 118, a text streaming service 120, a caption integrator 122, and a restreaming integrator 124. Each of the lines included in FIG. 1 depicts communications between processes. These inter-process communications can be transmitted within or across one or more computer systems via internal and/or external communication networks implemented by the computer systems. The communications can include, for example, application programming interface (API) requests and responses between the illustrated processes, although other inter-process communication mechanisms will be apparent in light of this disclosure.

Details regarding the various processes illustrated in FIG. 1 are provided below, but a high-level description of the processes and their interoperation follows. In some examples, the caption service 106 provides overall command and control to the remainder of the processes illustrated in FIG. 1. In these examples, the caption service 106 implements user interfaces to customers of the system 100, to captioners who provide captioning services, and to administrators who oversee the operation of the system 100. One of these user interfaces is the captioning client 102. Further, in certain examples, the caption service 106 generates and maintains a schedule of captioning jobs through which captioners agree to provide captioning services for customer events. As the scheduled time for each customer event approaches, the caption service 106 can interoperate with the connection service 108 via a system interface to prepare the connection service 108 for processing of one or more captioning jobs associated with the event. In addition, once the event concludes, the caption service 106 can determine customer cost, captioner pay, and execute follow-up processing, such as further transcribing event content after the event and/or storing of files that hold captions or captioned event content at prescribed locations (e.g., in the data storage service 112).

Continuing with the example of the system 100, the connection service 108 controls processing of individual captioning jobs. Prior to the start of a customer event, the connection service establishes connections to at least one source of event content, at least one source of ASR text generated from the event content by an ASR engine, at least one source of captured text generated from the event content by a human captioner, and at least one target for caption text generated by the connection service 108. The identity of the event content source, the ASR text source, the captured text source, and the caption text target varies depending on the configuration of the system 100 and the caption job and event being processed. The event content source can include, for example, the stream source 118 and/or the transcoding service 110. The ASR text source can include, for example, the ASR engine 104 and/or a locally hosted ASR engine (not shown in FIG. 1). The captured text source can include, for example, the captioning client 102, the text streaming service 120, and/or the caption service 106. The caption text target can include, the data storage service 112, the restreaming integrator 124, the content delivery network 116, the caption integrator 122, the transcoding service 110, the text streaming service 120, the caption service 106, and/or the viewing client 114.

Continuing with the example of the system 100, during caption job processing the connection service 108 arbitrates between the ASR text source and the captured text source to enhance the quality of caption text produced. A variety of arbitration processes are executed in various examples, but in all cases the arbitration processes are executed based on configuration information provided by the customer and advance customer objectives for the caption text and the overall caption service. After arbitrating between the ASR text source and the captured text source to generate caption text, the connection service 108 communicates the caption text to the caption text target. The caption text communicated can be incorporated into event content or stand-alone, distinct caption text, depending on the system interface exposed by the caption text target.

Continuing with the example of the system 100, during caption job processing the captioning client 102 receives event content from the event content source, interacts with the captioner to capture text based on the event content, and communicates the captured text to a process targeted to receive the captured text. Depending on the configuration of the system 100 and the caption job and event being processed, the target process can be, for example, the caption service 106, the text streaming service 120, and/or the connection service 108. To generate the captured text during caption job processing, the captioning client 102 presents the event content to the captioner, receives vocal input from the captioner, interoperates with an ASR engine to generate ASR text, receives any corrections needed to the ASR text, and communicates the corrected ASR text as captured text.

Continuing with the example of the system 100, the text streaming service 120 is a commercially available data streaming service, such as the KINESIS service available from Amazon Web Services, Inc. of Seattle, Wash. in the United States. In some implementations, the data storage service 112 is a commercially available cloud storage service, such as the Amazon S3 storage service available from Amazon Web Services. In some implementations, the content delivery network 116 is a commercially available content delivery network, such as the CLOUDFRONT content delivery network available from Amazon Web Services. In some implementations, the transcoding service 110 is a commercially available transcoding service, such as the transcoder included in the WOWZA STREAMING ENGINE available from Wowza Media Systems, LLC of Golden, Colo. in the United States. In some implementations, the viewing client 114 is a commercially available web browser, such as the CHROME web browser available from Google, Inc. of Mountain View, Calif. in the United States. In some implementations, the stream source 118 is a commercially available broadcast platform, such as the ZOOM video communications platform available from Zoom Video Communications, Inc. of San Jose, Calif. in the United States. The caption integrator 122 and the restreaming integrator are API endpoints (e.g. URLs, etc.) configured to accept caption data and or captioned event content for downstream presentation to a user of the viewing client 114.

In certain implementations, the caption service 106 and the connection service 108 interoperate via an AWS API, the connection service 108 and the ASR engine 104 interoperate via a Speechmatics API; the content delivery network 116 and the stream source 118 interoperate via a streaming protocol, and the stream source 118 and the transcoding service 110 also interoperate via the streaming protocol.

Continuing with the example of the system 100, the ASR engine 104 includes one or more a commercially available ASR engines, such as the ASR engine available from Speechmatics Ltd of Cambridge in the United Kingdom. The ASR engine 104 is configured to receive audio from the connection service 108 and/or the captioning client 102 and respond to the respective component with time-coded words along with, for example, confidences and alternate words. The ASR engine 104 may be configured to trade-off between latency and accuracy (i.e. with greater latency generally resulting in greater accuracy and vice versa). This trade-off can be configured in accordance with a customer's preferences via, for example, a customer interface.

Figure 2:
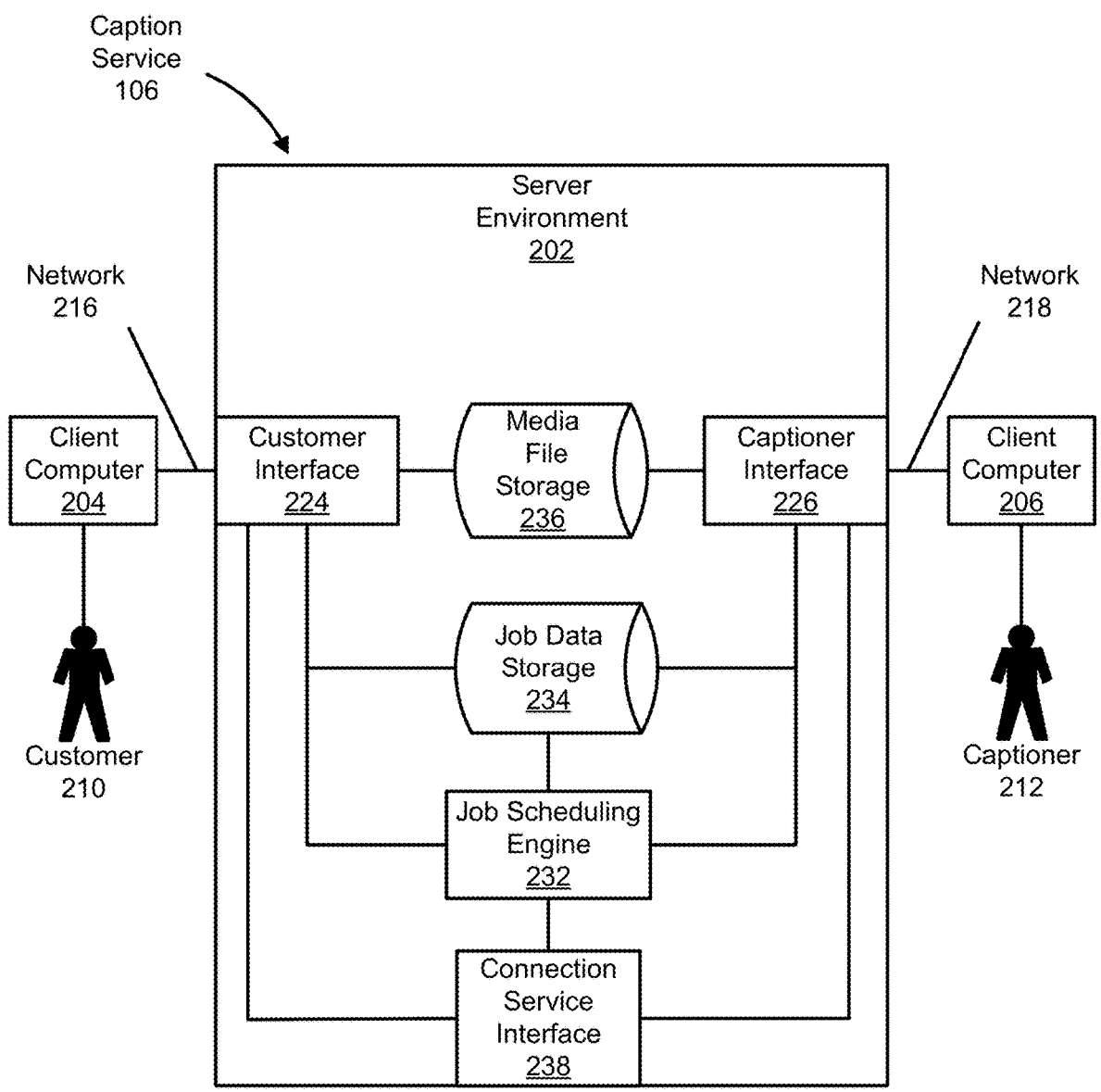
FIG. 2 is a block diagram showing an architecture of a caption service according to one example of the present disclosure.

Turning now to the individual processes illustrated in FIG. 1, in some examples the caption service 106 is configured to receive and fulfill requests from customers for captioning of content generated during events. As such, in operation, the caption service 106 schedules and controls the other processes illustrated in FIG. 1 to deliver captioning services to customers. FIG. 2 illustrates one implementation of the caption service 106 in accordance with some examples. FIG. 2 is a block diagram in which each of the blocks depicts one or more processes implemented by computer hardware or a combination of computer hardware and computer software. Similarly, each of the cylinders depicts a data store implemented by computer hardware or a combination of computer hardware and computer software. The processes illustrated in FIG. 2 include a customer interface 224, a captioner interface 226, a job scheduling engine 232, and a connection service interface 238. The data stores illustrated in FIG. 2 include a job data storage 234 and a media file storage 236. The processes 224, 226, 232, and 238 and the data stores 234 and 236 are hosted by a server environment 202. The server environment can include, for example, one or more computer systems. Each of the lines included in FIG. 2 depicts communications between processes and/or data stores. These communications can be transmitted within or across one or more computer systems via internal and/or external communication networks implemented by the computer systems. The communications can include, for example, API requests and responses between the illustrated processes, read and write requests to volatile and non-volatile memory, or the like, although other communication mechanisms will be apparent in light of this disclosure.

FIG. 2 also illustrates a customer 210, a captioner 212, client computer systems 204 and 206, and communication networks 216 and 218. The customer 210 may be a user who wishes to utilize the caption service 106 to procure live captioning services. The captioner 212 may be a user who wishes to interact with the captioner interface 226 to provide live captioning services. The client computer systems may be any computer system, an example of which is described below with reference to FIG. 18. The networks 216 and 218 may include any communication network through which computer systems can exchange information. For example, the network 216 may be a public network, such as the internet, and may include other public or private networks such as LANs, WANs, extranets and intranets.

As shown in FIG. 2, the customer interface 224 is configured to interoperate with the client computer 204 via the network 216 to process information regarding requests for captioning services. For instance, in some examples, the customer interface 224 is configured to provide a user interface to the customer 210 via the network 216 and the client computer 204. In one example, the customer interface 224 is configured to serve a browser-based user interface to the customer 210 that is rendered by a web-browser running on the client computer 204. In another example, the customer interface 224 is configured to interoperate with a locally installed client application native to the operating system of the client computer 204. In these and other examples, the customer interface 224 is configured to interact with the customer 210 via one or more user interface screens rendered by the client computer 204. Through these user interface screens the customer interface 224 can prompt the customer 210 to provide information useful in generating a captioning service request. In some examples, the user interface screens are configured to receive this information and communicate it to the customer interface 224. In these examples, the customer interface 224 is configured to receive the information regarding captioning service requests and store it within the server environment 202 (e.g., within the job data storage 234).

Continuing with the example of FIG. 2, examples of information stored in the job data storage 234 include information descriptive of jobs, events, customers, projects, and caption files. A particular example of the job data storage 234 is described below with reference to FIG. 3. Examples of information stored in the media file storage 236 include caption files. It should be noted that in some implementations the job data storage 234 and the media file storage 236 are configured to store the same information as the job data storage 134 and the media file storage 136 described in the 'Electronic Transcription Job Market' application.

Figure 3:
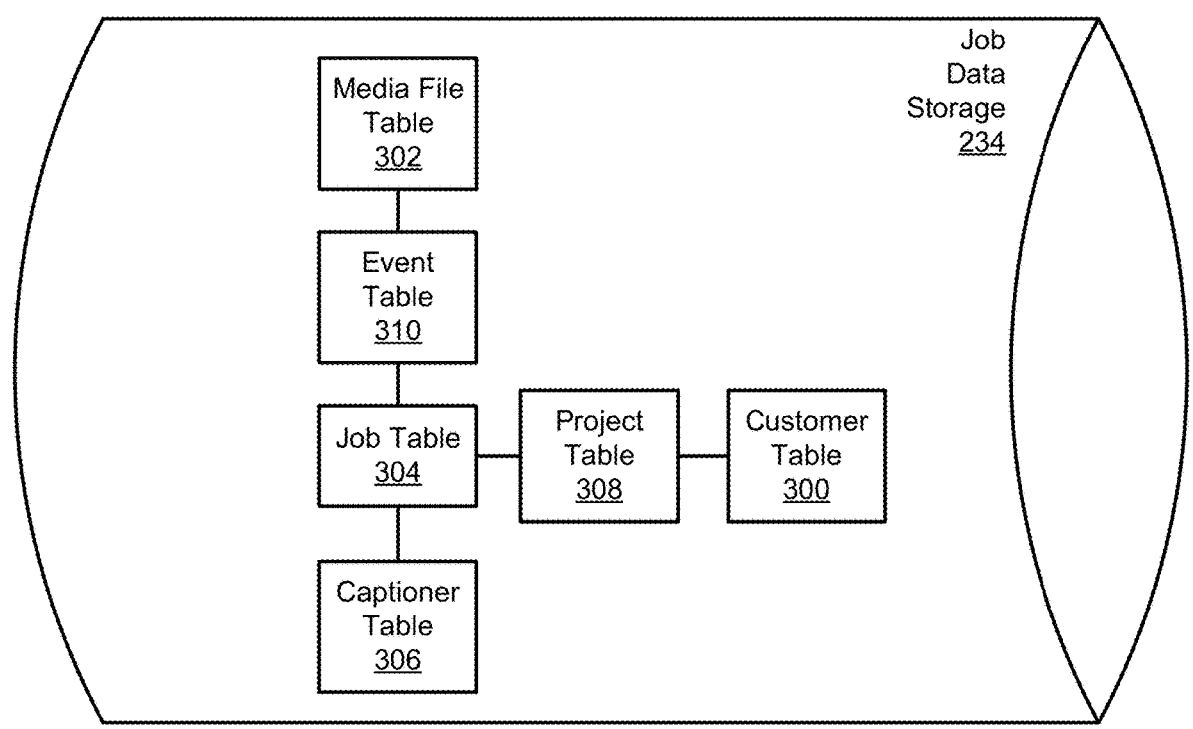
FIG. 3 is a block diagram depicting a data model underlying a caption service according to one example of the present disclosure.

FIG. 3 illustrates tables included in a job data storage (e.g., the job data storage 234 of FIG. 2) in some examples. As shown in FIG. 3, the job data storage 234 includes a customer table 300, a media file table 302, a job table 304, a captioner table 306, a project table 308, and an event table 310.

Continuing with the example of FIG. 3, the customer table 300 stores information descriptive of the customers who use a live captioning system (e.g., the system 100 of FIG. 1). In at least one example, each row of the customer table 300 stores information for a customer and includes a customer_id field, and a customer_name field. The customer_id field stores an identifier of the customer that is unique within the caption service. The customer_name field stores information that represents the customer's name within the caption service. The customer_id is used as a key by a variety of functions disclosed herein to identify information belonging to a particular customer.

Continuing with the example of FIG. 3, the media file table 302 stores information descriptive of the media files that have been uploaded to the caption service. In at least one example, each row of the media file table 302 stores information for one media file and includes the following fields: file_id, file_name, customer_id, event_id, caption_location, and duration. The file_id field stores a unique identifier of the media file. The file_name field stores the file system name of the media file. The customer_id field stores a unique identifier of the customer who provided the media file. The duration field stores information that represents the duration of the content of the media file. The event_id stores a unique identifier of the event captioned in the media file. The caption_location field stores an identifier of a location of caption text and metadata associated with the media file. The file_id is used as a key by a variety of functions disclosed herein to identify information associated with a particular media file. In some examples, the media file table 302 may store multiple versions of caption information associated with particular captioning service requests. Each of these versions may be produced using different configurations and each may reflect different user preferences, including preferences motivated by constraints of various media players.

Continuing with the example of FIG. 3, the job table 304 stores information descriptive of captioning jobs. In at least one example, each row of the job table 304 stores information for one job and includes the following fields: job_id, event_id, project_id, state, job_type, pay_rate, service_type, and captioner_id. The job_id field stores a unique identifier of the job. The event_id field stores a unique identifier of the event (or existing media file) to be serviced with live captioning. The state field stores the current state (or status) of the job. The project_id field stores a unique identifier of a project with which the job is associated. Example values for the state field include New, Available, Claimed, In_Progress, and Complete. The pay_rate field stores information that represents a payrate for completing the job. The service_type field stores information that represents a type of live captioning to be provided (human, automated, etc.). The captioner_id field stores the unique identifier of the captioner who has claimed this job. The progress field stores information that represents an amount of work completed for the job. The job_id is used as a key by a variety of functions disclosed herein to identify information associated with a particular job.

Continuing with the example of FIG. 3, the captioners table 306 stores information descriptive of the captioners who provide captioning services. In at least one example, each row of the captioners table 306 stores information for one captioner and includes the following fields: captioner_id and reward_points. The captioner_id field stores a unique identifier of the captioner. The reward_points field stores information that represent the number of reward points accumulated by the captioner. The captioner_id is used as a key by a variety of functions disclosed herein to identify information associated with a particular captioner.

Continuing with the example of FIG. 3, the project table 308 stores information descriptive of projects that the caption service is being utilized to complete. In at least one example, each row of the project table 308 stores information for a project and includes a project_id field, a project_name field, and a customer_id field. The project_id field stores information that identifies a group of events that belong to a project. The project_name field stores information that represents the project's name within the caption service. The customer_id field indicates the customer to whom the project belongs. The project_id is used as a key by a variety of functions disclosed herein to identify information grouped into a particular project.

Continuing with the example of FIG. 3, the event table 310 stores information descriptive of the events processed by the caption service. In at least one example, each row of the event table 310 stores information for an event and includes an event_id field, a description field, a date field, and a platform_id field. The event_id field stores a unique identifier of the event to be serviced with live captioning. The description field stores a textual description of the event. The date field stores a timestamp indicating a time at which the event is scheduled to commence. The platform_id field stores a unique identifier of the platform upon which the event will be broadcast.

Figure 4:
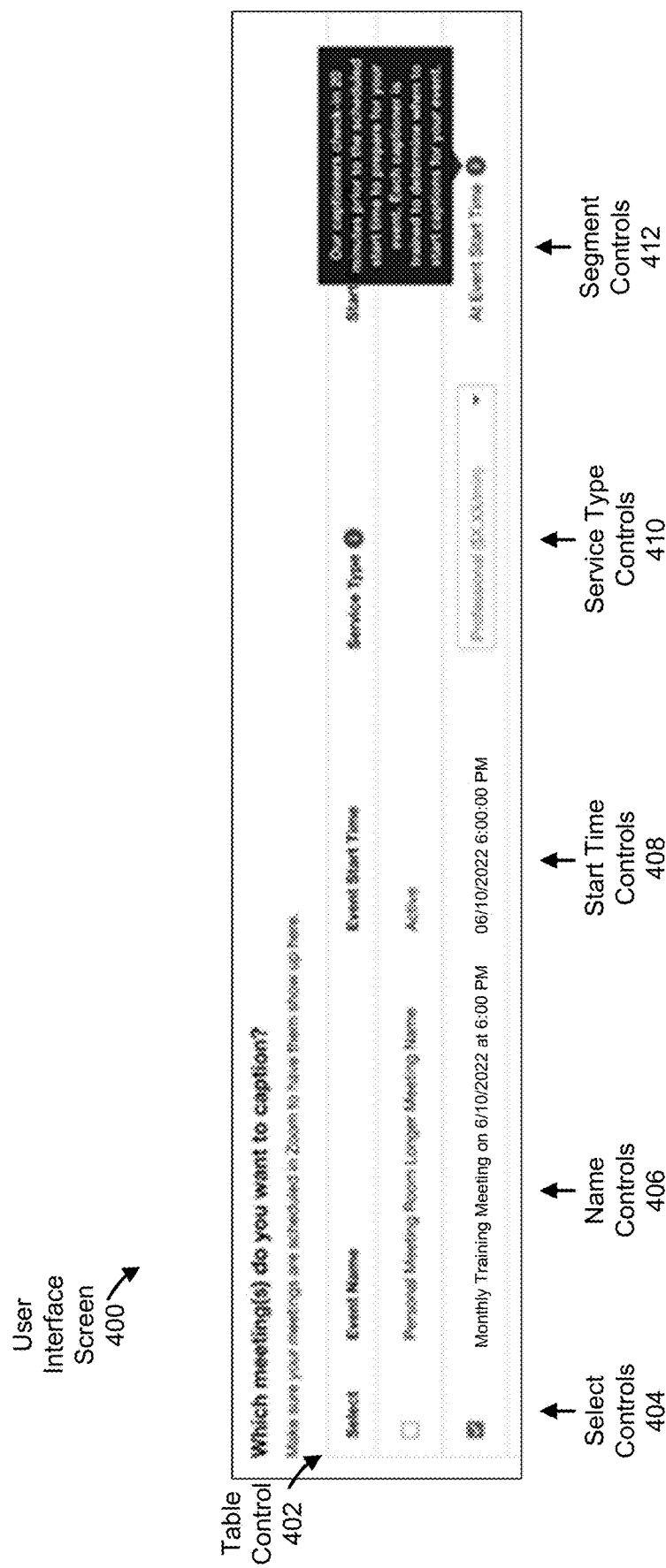
FIG. 4 is a front view of a user interface screen provided by a customer interface according to one example of the present disclosure.

Returning to the customer interface 224 of FIG. 2, the user interface screens provided by interoperation between the customer interface 224 and the client computer 204 can prompt the customer 210 for a variety of information pertinent to creation of a captioning service request. For instance, in some examples, the user interface screens can prompt the customer 210 for event schedule information including an identifier (e.g., a name) of an event targeted for live captioning, a start time and duration (or end time) of the event, a type of captioning (e.g., automated, human, a mixture of automated and human, etc.) service requested for the event, and identifiers of one or more segments of the event for which the type of captioning is requested. Moreover, in certain examples, the schedule information can include an identifier of a third-party broadcast platform through which the event is scheduled for broadcast. Where the event is scheduled for broadcast on a supported third-party platform (e.g. Zoom, YouTube, Facebook, Brightcove, etc.), the customer interface 224 can interoperate with the supported platform (e.g., via an API exposed and implemented by the platform) to request, receive, store, and display schedule information for events scheduled for the customer 210 in the platform. FIG. 4 illustrates an example user interface screen 400 presented to a customer (e.g., the customer 210 of FIG. 2) in some of these implementations.

As shown in FIG. 4, the screen 400 includes a table control 402 that lists schedule information regarding a set of meetings scheduled for the customer in a supported third-party broadcast platform. Each row of the table control 402 is associated with an event and includes a select control 404, a name control 406, a start time control 408, a service type control 410, and an event segment control 412. Each select control 404 is configured to receive input selecting or deselecting the event associated with its row for live captioning service. As shown in FIG. 4, the select control 404 in the first row of the table control 402 currently is deselected for live captioning, which indicates that an event associated with the first row is not targeted for live captioning. However, the select control 404 in the second row of the table control 402 currently is selected for live captioning, which indicates that the customer has selected an event associated with second row for live captioning. In this example, the event associated with the second row is a monthly training meeting.

Continuing with the example of FIG. 4, each name control 406 is configured to display an identifier (e.g., a human-comprehendible name and/or description) of the event associated with its row. Each start time control 408 is configured to display a time at which the event associated with the row will begin. Each service type control 410 is configured to receive input selecting a type of live captioning service requested for the event associated with its row. As shown in FIG. 4, the service type control 410 in the first row of the table control 402 currently is not rendered, which indicates that the event associated with the first row is not targeted for live captioning. However, the service type control 410 in the second row of the table control 402 currently displays a selection of professional (human) live captioning, which indicates that the customer has selected professional live captioning as the type of captioning service requested for the event associated with the second row or that professional live captioning is the default value for the service type controls 410.

Continuing with the example of FIG. 4, each segment control 412 is configured to receive input selecting one or more segments of the event for which live captioning is requested. As shown in FIG. 4, the segment control 412 is configured to receive input specifying a start time for each segment, a duration for each segment, and a type of each segment. The type of each segment indicates the type (human, automated, none) of live captioning the customer wishes to be performed during the segment. As further shown in FIG. 4, the segment control 412 in the first row of the table control 402 currently is not rendered, which indicates that the event associated with the first row is not targeted for live captioning. However, the segment control 412 in the second row of the table control 402 currently displays a selection of "At Event Start Time", which indicates that the customer has requested that live captioning begin with the event or that live captioning begin with the event is the default value for the segment controls 412.

It should be noted that the selections and schedule information presented in FIG. 4 are presented by way of example only and that other selections and schedule information are supported in various implementations. For instance, in some examples, the segment controls 412 are configured to receive input specifying one or more particular periods of time within the event for which the selected type of live captioning is requested. Additionally or alternatively, in some examples, the segment controls 412 are configured to receive input specifying a duration (e.g., in units of time or as a percentage of the total duration) for which the selected type of live captioning is requested. Additionally or alternatively, in some examples, the segment controls 412 are configured to receive input specifying an overall accuracy for the event. In these examples, a human captioner generates live captioning when needed to maintain the overall accuracy specified in the segment control 412. Additionally or alternatively, in some examples, the segment controls 412 are configured to receive input specifying an overall cost for the event. In these examples, a human captioner generates live captioning but is stopped as needed to prevent a cost of the live captioning service from exceeding the overall cost specified in the segment control 412.

Returning to the example of FIG. 2, the user interface screens provided by interoperation between the customer interface 224 and the client computer 204 can prompt the customer 210 for additional information regarding a captioning service request. This additional information can include, for example, a real-time messaging protocol (RTMP) uniform resource locator (URL) exposed by a service other than a supported third-party broadcast platform, where the event is targeted for broadcast using the RTMP URL of the service and not via a RTMP URL associated with a supported third-party broadcast platform. Further, in some examples, the additional information can include transcoder configuration information (e.g., where the event is target for broadcast via an RTMP URL provided by a static or on-demand transcoding service (e.g., the transcoding service 110 of FIG. 1)). Alternatively or additionally, in some examples, the additional information can include output stream information useful for restreaming with embedded captions in 608 format and/or configuration information useful for downstream viewing platforms (e.g., the viewing client 114 of FIG. 1).

Continuing with the customer interface 224, the user interface screens provided by interoperation between the customer interface 224 and the client computer 204 can prompt the customer 210 for additional information applicable to an event. This additional information can include wordlists, speaker names, a sensitivity level regarding potentially offensive words, and special instructions applicable to the event. It should be noted that the applicability of the additional information to an event can be expressly established via user interface screens rendered in response to a request for live captioning services for the event. Alternatively or additionally, the applicability of the additional information to an event can be inferred from configuration information gathered via the customer interface 224 during setup of an account, project, and/or folder of the customer 210. For instance, a sensitivity level applicable to all captions generated for the customer 210 may be set at a default value (e.g., "2") during customer account creation and/or a list of speaker-names may be input that apply to all events common to a particular project (e.g., a series of meetings involving the same speakers). Specific examples of user interface screens configured to prompt the customer 210 for the additional information discussed above are described below with reference to FIGS. 5-8. Relationships between customer accounts, projects, and the like are described above with reference to FIG. 3.

Figure 5:
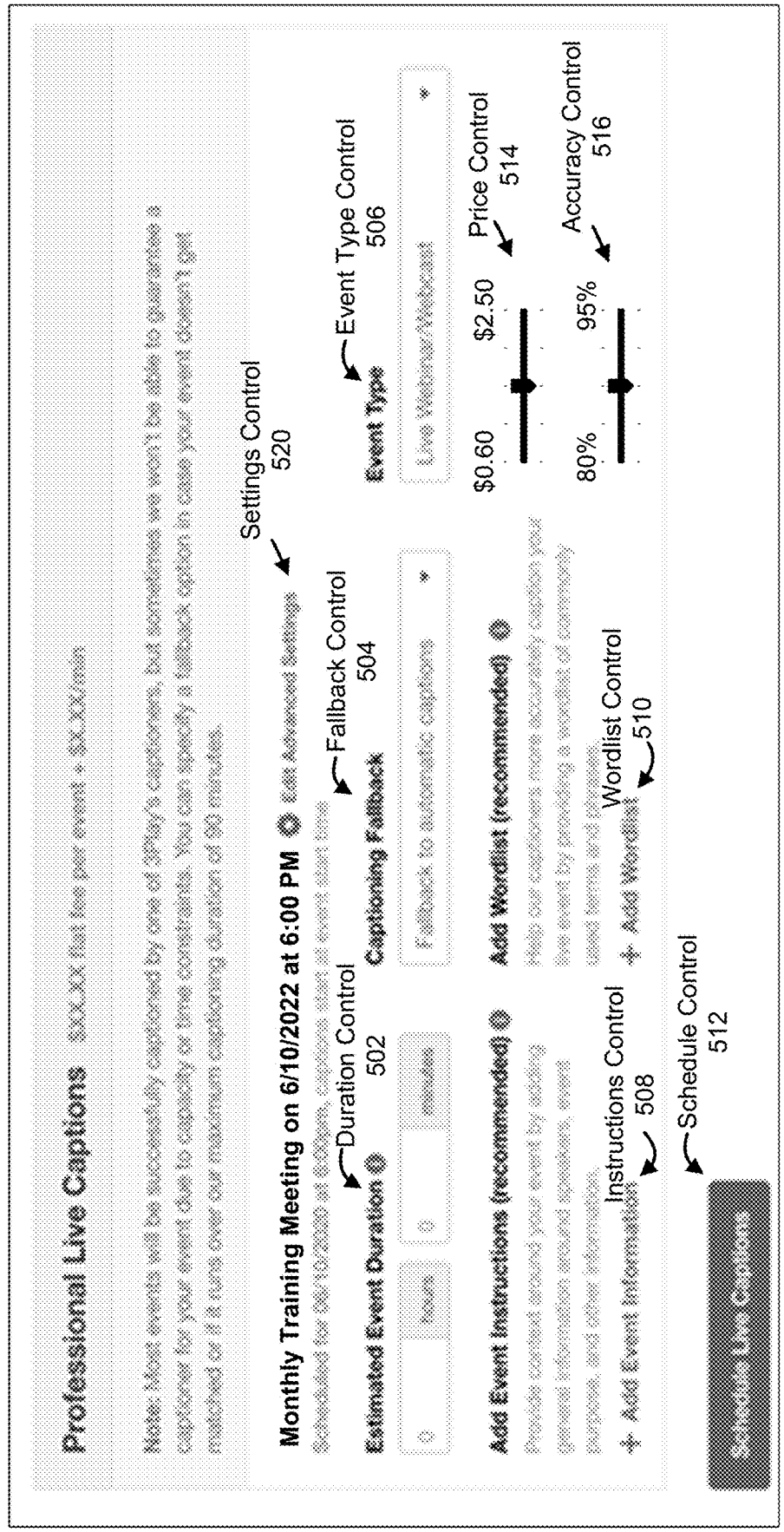
FIG. 5 is a front view of another user interface screen provided by a customer interface according to one example of the present disclosure.

FIG. 5 illustrates a user interface screen 500 provided by interoperation between a customer interface (e.g., the customer interface 224 of FIG. 2) and a client computer (e.g., the client computer 204 of FIG. 2) in some implementations. As shown in FIG. 5, the user interface screen 500 includes several controls configured to interact with a customer (e.g., the customer 210 of FIG. 2) to receive input specifying additional information associated with an event, such as the additional information described above. As illustrated in FIG. 5, the screen 500 includes a duration control 502, a fallback control 504, an event type control 506, an instructions control 508, a wordlist control 510, a schedule control 512, a price control 514, an accuracy control 516, and a settings control 520.

Continuing with the screen 500, the duration control 502 is configured to receive input specifying an estimated duration of the event in hours and minutes. The caption fallback control 504 is configured to receive input specifying a contingency option to be used where the primary captioning service is unavailable. Such contingency options can include, for example, automated, human, a mixture of automated and human, and/or no captioning service. The event type control 506 is configured to receive input specifying a type of the event (e.g., live webinar, webcast, etc.).

Continuing with the screen 500, the price control 514 is configured to receive input specifying a target price per minute that the customer is willing to pay for live captioning services for the event. The accuracy control 516 is configured to receive input specifying a target accuracy for the event. It should be noted that, in some examples, the customer interface is configured to automatically adjust the price control 514 in response to reception of input that will affect price from the accuracy control 516, as these two factors are directly related to one another. Similarly, in some examples, the customer interface is configured to automatically adjust the accuracy control 516 in response to reception of input that will affect accuracy from the price control 514.

Continuing with the screen 500, the instructions control 508 is configured to receive input (e.g., a click or other selection) specifying a request to access instructions for the event. In response to reception of this input, the customer interface initiates a user interface screen configured to receive the instructions regarding the event. FIG. 6 illustrates an example user interface screen 600 presented to the customer to receive the instructions. As shown in FIG. 6, the user interface screen 600 includes a name control 602, a description control 604, and a speaker control 606.

In some examples, the name control 602 is configured to receive input specifying a name of the event. The description control 604 is configured to receive input specifying a description of the event. The speaker control 606 is configured to receive input specifying one or more speakers attending the event. As shown in FIG. 6, the speaker control 606 includes elements selectable to add a new speaker and to delete an identified speaker.

Figure 7:
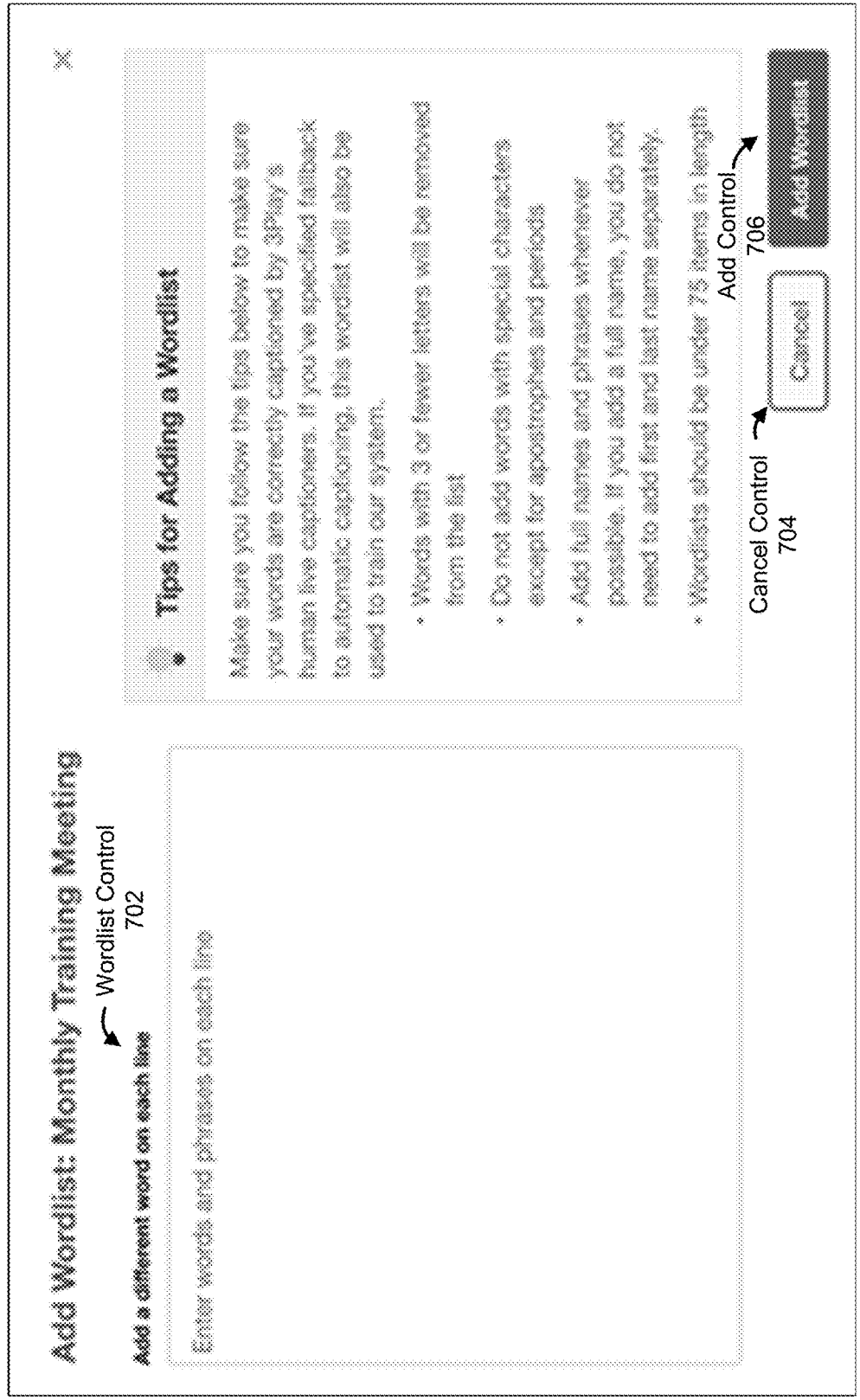
FIG. 7 is a front view of another user interface screen provided by a customer interface according to one example of the present disclosure.

Returning to the user interface screen 500, the wordlist control 510 is configured to receive input (e.g., a click or other selection) specifying a request to access a wordlist for the event. In response to reception of this input, the customer interface initiates a user interface screen configured to receive the wordlist for the event. In some examples, the wordlist is used to bias a language model of an ASR engine (e.g., the ASR engine 104 of FIG. 1) to be more likely to recognize uncommon words likely to be uttered during the event. FIG. 7 illustrates an example user interface screen 700 presented to the customer to receive the wordlist. As shown in FIG. 7, the user interface screen 700 includes a wordlist control 702, a cancel control 704, and an add control 706.

Continuing with the screen 700, the wordlist control 702 is configured to receive input specifying changes to the wordlist. The cancel control 704 is configured to receive input specifying cancellation of any changes to the wordlist specified in the wordlist control 704. A customer interface (e.g., the customer interface 224 of FIG. 2) is configured to close the interface screen 700 without storing any changes to the wordlist in response to receiving this input via the cancel control 704. The add control 706 is configured to receive input specifying addition of any changes to the wordlist specified in the wordlist control 704. The customer interface is configured to save any changes to the wordlist specified in the wordlist control 702 to an event data store (e.g., the event table 310 of FIG. 3) in response to receiving this input via the add control 706.

Figure 8:
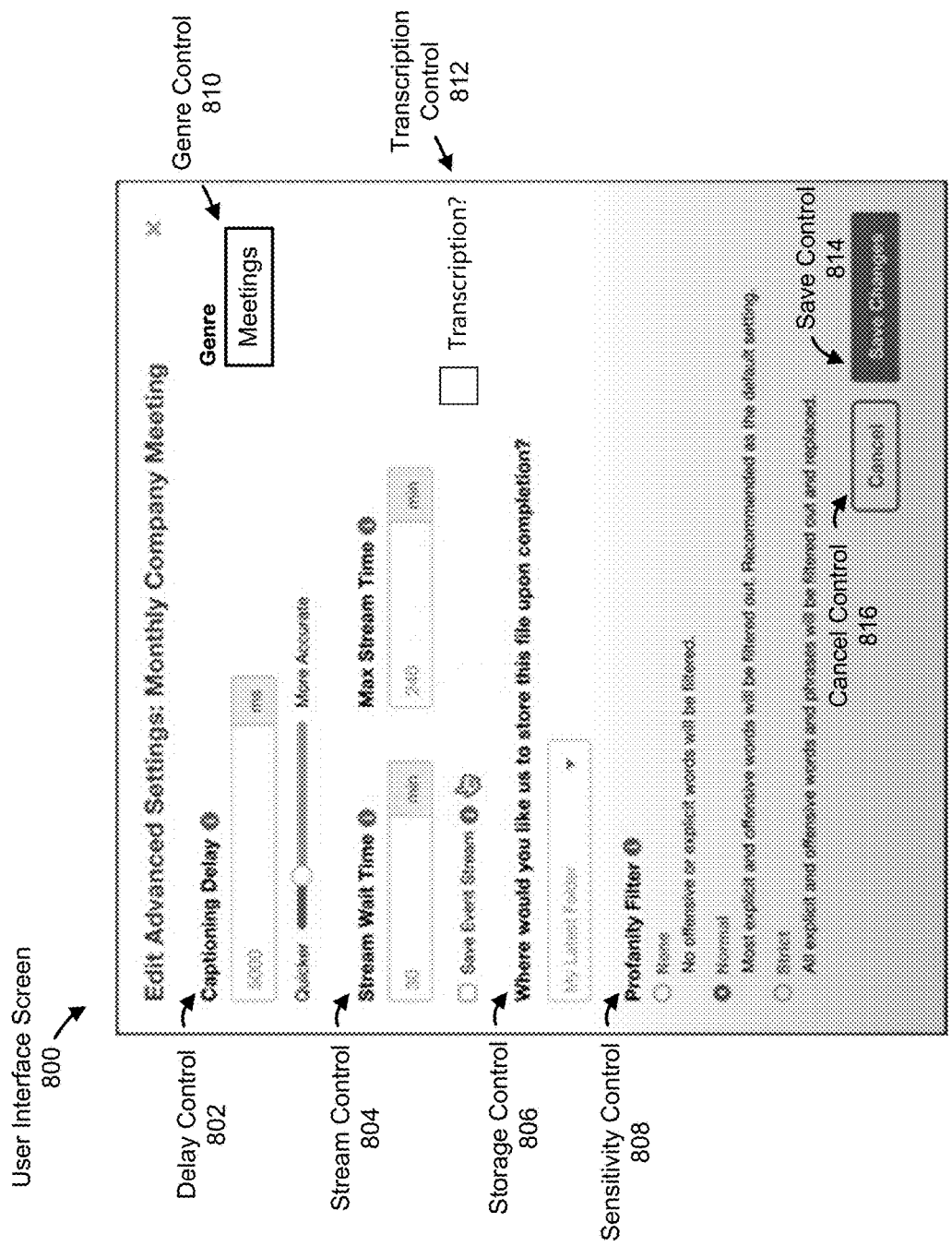
FIG. 8 is a front view of another user interface screen provided by a customer interface according to one example of the present disclosure.

Returning to the user interface screen 500 of FIG. 5, the settings control 520 is configured to receive input (e.g., a click or other selection) specifying a request to access advanced settings for the event. In response to reception of this input via the settings control 520, the customer interface initiates a user interface screen configured to receive advanced settings for the event. FIG. 8 illustrates an example user interface screen 800 configured to receive advanced event settings. As shown in FIG. 8, the user interface screen 800 includes a delay control 802, a stream control 804, a storage control 806, a sensitivity control 808, a genre control 810, a transcription control 812, a save control 814, and a cancel control 816.

Continuing with the interface screen 800, in some examples the delay control 802 is configured to interact with the customer to receive input specifying a maximum acceptable latency (e.g., 5000 milliseconds) between presentation of a word via a viewer (e.g., the viewing client 114 of FIG. 1) and display of the word in caption text. It should be noted that longer delays can result in more accurate caption text. In certain examples, the stream control 804 is configured to interact with the customer to receive input specifying a maximum duration for the event, whether a copy of the event content should be save to permanent storage (e.g., the data storage service 112 of FIG. 1), and a maximum amount of time that the live captioning system should delay beyond the scheduled start time of the event for content to start streaming prior to terminating the event. In some implementations, the storage control 806 is configured to interact with the customer to receive input specifying a storage location for a file including caption text generated for the event. In certain implementations, the sensitivity control 808 is configured to interact with the customer to receive input specifying a level of sensitivity of the customer to potentially offensive words. This sensitivity level can be used to filter caption text, in some examples. In some implementations, the genre control 810 is configured to interact with the customer to receive input specifying the genre to which the event belongs. In certain examples, the transcription control 812 is configured to interact with the customer to receive input specifying whether the caption service should generate a transcription of the event.

Continuing with the interface screen 800, in some implementations the save control 814 is configured to interact with the customer to receive input (e.g., a click or other selection) specifying a request to save the settings currently stored in the controls 802-812. A customer interface (e.g., the customer interface 224 of FIG. 2) is configured to save the settings to an event data store (e.g., the event table 310 of FIG. 3) in response to receiving this input via the save control 814. In certain implementations, the cancel control 816 is configured to interact with the customer to receive input specifying a request to close the interface screen 800 without saving the settings currently stored in the controls 802-812. The customer interface is configured to close the interface screen 800 without storing the settings stored in the controls 802-812 in response to receiving this input via the cancel control 816.

Returning to the user interface screen 500 of FIG. 5, the schedule control 512 is configured to receive input (e.g., a click or other selection) specifying a request to submit a captioning service request for the event. In some examples, the customer interface is configured to generate and store a request for captioning services in response to receiving this input via the schedule control 512. This request can be sent to a scheduling engine (e.g., the job scheduling engine 232 of FIG. 2) for scheduling as a job. In response to receiving a captioning service request, the scheduling engine can create a job record for the captioning job. This job record can store and/or be associated with information specifying the event to be live captioned and the characteristics of the live captioning service requested for the event. Thus, the job record can, in some examples, store and/or be associated with the information received and stored by the user interface screens provided by interoperation between the customer interface and the client computer 204, as described above.

Returning to the example of FIG. 2, the user interface screens provided by interoperation between the customer interface 224 and the client computer 204 can receive other information regarding a captioning service request. Examples of this other information can include sample videos that the customer 210 believes may help human captioner performance, if reviewed by the human captioner 212 prior to the event. These videos, which can be media files previously stored in the media file storage 236 and transcribed via the caption service for the same customer and/or customer project, may demonstrate attributes similar to those expected for the event, such as presentation style, event format, event recording technology, event content, or the like. Additionally or alternatively, and as explained above, the other information can include one or more Boolean values indicating whether to save the video, or one or more portions thereof, after the event and/or one or more Boolean values indicating whether to order a full transcription, or one or more portions thereof, after the event. Such a transcription may be provided by a caption service 106 or another system, such as the transcription system 100 described in the 'Electronic Transcription Job Market' application. Additionally or alternatively, and as explained above, the other information can include a desired caption latency. For example, the customer may select longer latency to help improve caption quality. Additionally or alternatively, the other information can include an identifier of a preferred captioner for the event. This preferred captioner may have an existing account with the caption service 106 or may provide captions via another tool.

Additionally or alternatively, the other information can include an indicator of whether the customer wishes to pay an incremental fee to guarantee availability of a human captioner for the event. Additionally or alternatively, the other information can include an indicator of whether the customer requests a single captioner for a group of events (e.g., a series of live events that may be multiple classes, conference sessions, and/or rehearsals). It should be noted that, in some examples, a preferred captioner can be requested for multiple events via association with a customer or project. Additionally or alternatively, the other information can include an indicator of whether the customer requests a second captioner for quality assurance of the captions generated by a primary captioner. Additionally or alternatively, the other information can include an indicator of whether the customer requests review of the live captions as they are produced (e.g., for quality assurance during the event). This may be accomplished, for example, by a secondary captioning client configured to receive captured text from a primary captioning client. Additionally or alternatively, the other information can include an indicator of whether the customer requests customer enhanced support options be available prior to and/or during the event. These enhanced support options can include email, chat, on demand or reserved phone support. Additionally or alternatively, the other information can include information specifying a budget for the human captioner, a budget for automated captioning, and/or a total budget for the live captioning service for the event. These budgets may be provided by the caption service 106 to potential human captioners for the event via the captioner interface 226 for use in receiving bids and/or claims for captioning jobs, as will be described further below. Additionally or alternatively, the other information can include information specifying instructions for multiple captioners (e.g., human and/or automated) to work in a particular sequence during the event. For example, the other information may specify that a relieving captioner assumes control at a specific time during the event or at a specific section within an event.

Figure 9:
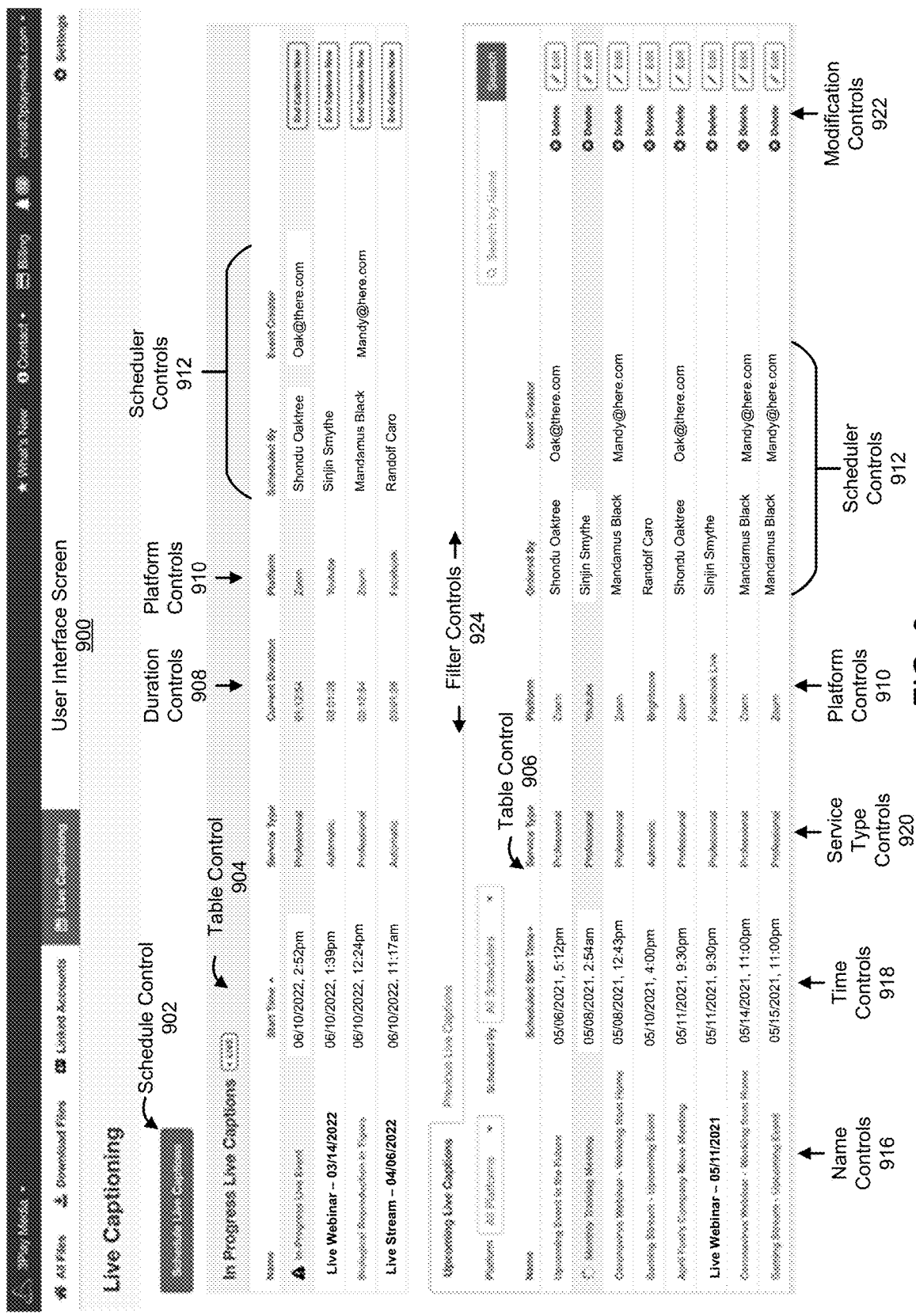
FIG. 9 is a front view of another user interface screen provided by a customer interface according to one example of the present disclosure.

Continuing with the example of FIG. 2, the customer interface 224 can be configured to interoperate with the client computer 204 to render a user interface screen that provides a dashboard view of captioning sessions generated from and associated with previously submitted captioning service requests and corresponding claimed captioning jobs. FIG. 9 illustrates a user interface screen 900 provided to a customer (e.g., the customer 210 of FIG. 2) in accord with these examples. As shown in FIG. 9, the screen 900 includes a schedule control 902, two table controls 904 and 906, and filter controls 924. Each of the table controls 904 and 906 include one or more rows. Each of these rows include additional controls, some types of which are common to both table controls 904 and 906. For example, both of the table controls 904 and 906 include one or more name controls 916, one or more time controls 918, one or more service type controls 920, one or more platform controls 910, one or more scheduler controls 912, and one or more modification controls 922. In addition, the table control 904 includes one or more duration controls 908. As illustrated in FIG. 9, the user interface screen 900 also includes several filter controls 924 that filter the information listed in the table control 906.

Continuing with the screen 900, the schedule control 902 is configured to receive input (e.g., a click or other selection) specifying a request to generate a captioning services request for an event. In response to reception of this input, a customer interface (e.g., the customer interface 224 of FIG. 2) initiates display of a user interface screen via a client computer (e.g., the client computer 204 of FIG. 2). This user interface screen is configured to receive information useful to request live captioning services. Examples of such a user interface screen include the user interface screens 400-800 of FIGS. 4-8.

Continuing with the screen 900, the table control 904 lists information regarding a set of captioning sessions currently in progress. Each row of the table control 904 is associated with a captioning session. Each captioning session, in turn, is associated with an event. In some examples, each row of the table control 904 includes instances of the controls 916, 918, 920, 908, 910, 912, and 922. In these examples, the name control 916 of each row is configured to display an identifier (e.g., a human-comprehendible name and/or description) of the event associated with the row. The time control 918 of each row is configured to display a time at which the event associated with the row began. The service type control 920 of each row is configured to display a type (e.g., professional (human) or automatic) of live captioning service being provided to the event associated with the row. The duration control 908 of each row is configured to display the current duration of the event associated with the row. The platform control 910 of each row is configured to display an identifier of a platform through which the event associated with the row is being broadcast. The scheduler control 912 of each row is configured to display an identifier of the customer who scheduled live captioning for the event associated with the row and an email address of the customer, if available.

Continuing with the screen 900, the modification control 922 of each row of the table control 904 is configured to receive input (e.g., a click or other selection) specifying a cancellation request for the captioning session associated with the row. In some examples, the customer interface is configured to initiate display of an additional screen via the client computer in response to reception of this input via the medication control 922. This additional screen may prompt the customer for input (e.g., click or other selection) confirming the cancellation request. This additional screen may also display additional information such as whether a human captioner remains scheduled for the captioning job associated with the captioning session and cost implications of cancelling the captioning session. These cost implications may include not charging the customer where the cancellation request is submitted in advance of a configurable period of time (e.g., 1 day) before the start time of the event and may include charging the customer a cancellation fee where the cancellation message is submitted within the configurable period of time. In addition, in some examples, the customer interface is configured to request termination of the captioning session where the cancellation request is confirmed. In these examples, the customer interface is configured to request termination of the captioning session by interoperating with a connection service (e.g., the connection service 108 of FIG. 1) responsive to receiving a confirmed cancellation request via a modification control 922.

Continuing with the screen 900, the table control 906 lists information regarding a set of pending or completed captioning sessions. Each row of the table control 906 is associated with a captioning session and an event (e.g., via the row's association with the captioning session). In some examples, each row of the table control 906 includes instances of the controls 916, 918, 920, 910, 912, and 922. In these examples, the name control 916 of each row is configured to display an identifier (e.g., a human-comprehendible name and/or description) of the event associated with the row. The time control 918 is configured to display a time at which the event associated with the row is scheduled to begin (for pending events) or began (for completed events). The service type control 920 of each row is configured to display a type (e.g., professional (human) or automatic) of live captioning service requested for the event associated with the row. The platform control 910 of each row is configured to display an identifier of a platform through which the event associated with the row is scheduled to use (for pending events) or used (for completed events). The scheduler control 912 of each row is configured to display an identifier of a customer who scheduled live captioning for the event associated with the row and an email address of the customer, if available.

Continuing with the screen 900, the modification control 922 of each row of the table control 906 is configured to receive input (e.g., a click or other selection) to edit or delete the captioning session associated with the row. In certain implementations, the customer interface is configured to display a user interface screen via the client computer in response to reception of input to edit the session via the modification control 922. This user interface screen is configured to receive information useful to request live captioning services. Examples of such a user interface screen include the user interface screens 400-800 of FIGS. 4-8. Further, in certain examples, the customer interface is configured to interoperate with a scheduling engine (e.g., the scheduling engine 232 of FIG. 2) to delete (or mark for deletion) the job record associated with the captioning session from a job data store (e.g., the job table 304 of FIG. 3) in response to reception of input to delete the session via the modification control 922.

Continuing with the screen 900, the filter controls 924 are configured to receive input selecting one or more filters of information displayed in the table control 906. Examples of filters selectable via the filter controls 924 include a filter to display pending captioning sessions scheduled for completion within a configurable number of days (e.g., 7) in the future, a filter to display captioning sessions completed within a configurable number of days (e.g., 7) in the past, a filter to display captioning jobs involving one or more identified broadcast platforms, a filter to display captioning sessions requested by one or more identified schedulers, and a filter to display captioning jobs associated with a particular event name.

Returning to the example of FIG. 2, it should be noted that in some implementations the customer interface 224 is configured to implement the functionality of the customer interface 124 described in the 'Electronic Transcription Job Market' application.

Continuing with the example of FIG. 2, the captioner interface 226 is configured to interoperate with the client computer 206 via the network 218 to process information regarding captioning jobs. For instance, in some examples, the captioner interface 226 is configured to provide a user interface to the captioner 212 via the network 218 and the client computer 206. In one example, the captioner interface 226 is configured to serve a browser-based user interface to the captioner 212 that is rendered by a web-browser running on the client computer 206. In another example, the captioner interface 226 is configured to interoperate with a locally installed client application native to the operating system of the client computer 206. In these and other examples, the captioner interface 226 is configured to interact with the captioner 212 via one or more user interface screens rendered by the client computer 206. Through these user interface screens the captioner interface 226 can prompt the captioner 212 to provide information useful in claiming a captioning job. In some examples, the user interface screens are configured to process this information by transmitting it to the captioner interface 226. In these examples, the captioner interface 226 is configured to receive the information regarding captioning jobs and store it within the server environment 202 (e.g., within the job data storage 234).

Continuing with the captioner interface 226, the user interface screens provided by interoperation between the captioner interface 226 and the client computer 206 can prompt the captioner 212 for a variety of information pertinent to claiming a captioning job. For instance, in some examples, the user interface screens are configured to display lists of captioning jobs with timing information derived from the information entered by the customer 210 and stored by the customer interface 224 in the job data storage 234. In some examples, the lists of captioning jobs and timing information can include a name of the event associated with the job, a description of the event, a start time and end time for the event, a captioner arrival time, a captioner finish time, offered payrate information, an indication of a segment of the event to be captioned, and an identifier of a customer who requested the job.

Continuing with the captioner interface 226, in certain examples the captioner arrival time is a configurable amount of time before the start of an event (e.g., 15 minutes) at which the captioner is required to sign into a captioning client (e.g., the live captioning client 102 of FIG. 1). The captioner finish time is an estimated time at which the captioner will complete work on the job. The captioner finish time can be affected by, for example, whether the customer is targeting a specific caption accuracy as higher accuracy generally requires more captioner time. The offered payrate information may be the current rate offered by the captioning service 106 to the captioner for the job.

Continuing with the captioner interface 226, the user interface screens presented by interoperation between the captioner interface 226 and the client computer 206 can include controls configured to receive bids for payrates to complete the jobs and receive claims for captioning jobs. In these examples, the controls configured to receive bids can receive a bid applicable to an entire job or multiple bids applicable to one or more segments of a job. The bid payrate is a payrate at which the captioner is willing to complete the job. The controls configured to receive claims for captioning jobs can receive a click or some other input indicating that the captioner 212 wishes to claim the job.

Figure 10:
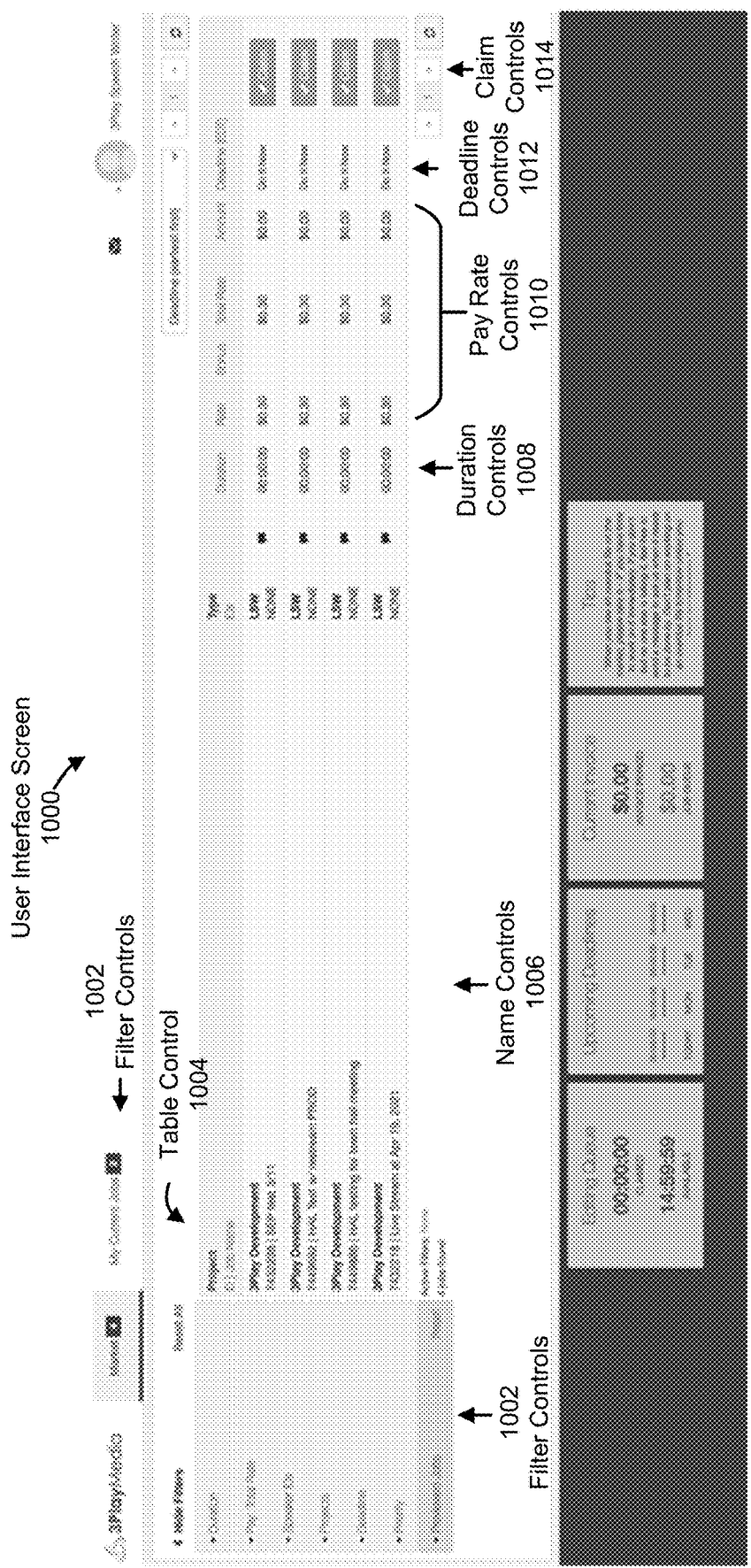
FIG. 10 is a front view of a user interface screen provided by a captioner interface according to one example of the present disclosure.

Continuing with the captioner interface 226, the user interface screens presented by interoperation between the captioner interface 226 and the client computer 206 can include controls configured to filter the captioning jobs presented to the captioner 212. For instance, these controls can filter the jobs by schedule, anticipated number of speakers, subject, genre, or any of a variety of other characteristics. FIG. 10 illustrates one example of a user interface screen 1000 presented to a captioner (e.g., the caption 212 of FIG. 2) by a captioner interface (e.g., the captioner interface 226 of FIG. 2) in some implementations.

As shown in FIG. 10, the user interface screen 1000 includes one or more filter controls 1002 and a table control 1004. The table control 1004 includes one or more rows. Each of these rows include additional controls and is associated with a captioning job. These additional controls include one or more name controls 1006, one or more duration controls 1008, one or more payrate controls 1010, one or more deadline controls 1012, and one or more claim controls 1014. In these examples, the name control 1006 of each row is configured to display an identifier (e.g., a human-comprehendible name and/or description) of the job associated with the row. The duration control 1008 of each row is configured to display an estimated duration of the job associated with the row. The payrate controls 1010 of each row are configured to display payrate information (e.g., rate, bonus, total amount, etc.) of the job associated with the row. In some examples, the payrate control 1010 are further configured to receive input specifying a bid for which a captioner is willing to perform a job. The deadline control 1012 of each row is configured to display a requested captioner check-in time of the job associated with the row. The claim control 1014 of each row is configured to receive input indicating that the captioner accepts the terms of, and claims (agrees to complete), the job associated with the row. In certain implementations, the captioner interface is configured to store an association between the caption job associated with a row and the captioner in a job data store (e.g., the job table 304 of FIG. 3) in response to reception of the input via the claim control 1014 of the row. In some examples, the claim control 1014 is also configured to receive input specifying a request to release, or un-claim, a job that is currently claimed. In these examples, the captioner interface is configured to disassociate the caption job associated with a row and the captioner in response to reception of the input specifying the release request via the claim control 1014 of the row, provided that a configurable period of time remains between the present and the start time (considering preparation time) of the caption job. This disassociation places the caption job back on the schedule and makes the caption job available for other captioners to claim at a recomputed payrate.

Continuing with the example of FIG. 10, the filter controls 1002 are configured to receive input selecting one or more filters of information displayed in the table control 1004. Examples of filters selectable via the filter controls 1002 include a filter to display jobs currently claimed by the captioner, a filter to display all unclaimed jobs on the market, a filter to display jobs having one or more estimated durations, a filter to display jobs having one or more total payrates, a filter to display jobs having one or more identified speakers, a filter to display jobs belonging to one or more projects, a filter to display jobs having one or more deadlines, a filter to display jobs already previewed by the captioner, and a filter to display jobs already claimed by the captioner. In some implementations, the captioner interface is configured to restrict rows displayed in the table control 1004 to rows associated with captioning jobs that pass selected filter(s).

Returning to the example of FIG. 2, it should be noted that in some implementations the captioner interface 226 is configured to serve and/or interoperate with a captioning client (e.g., the live captioning client 102 of FIG. 1). Further, it should be noted that in some implementations the captioner interface 226 implements the functionality of the editor interface 126 described in the 'Electronic Transcription Job Market' application. In this way, the captioner interface 226 can enable the captioner 212 to claim and service transcription editing jobs as described herein and/or with reference to the 'Electronic Transcription Job Market' application.

Figure 20:
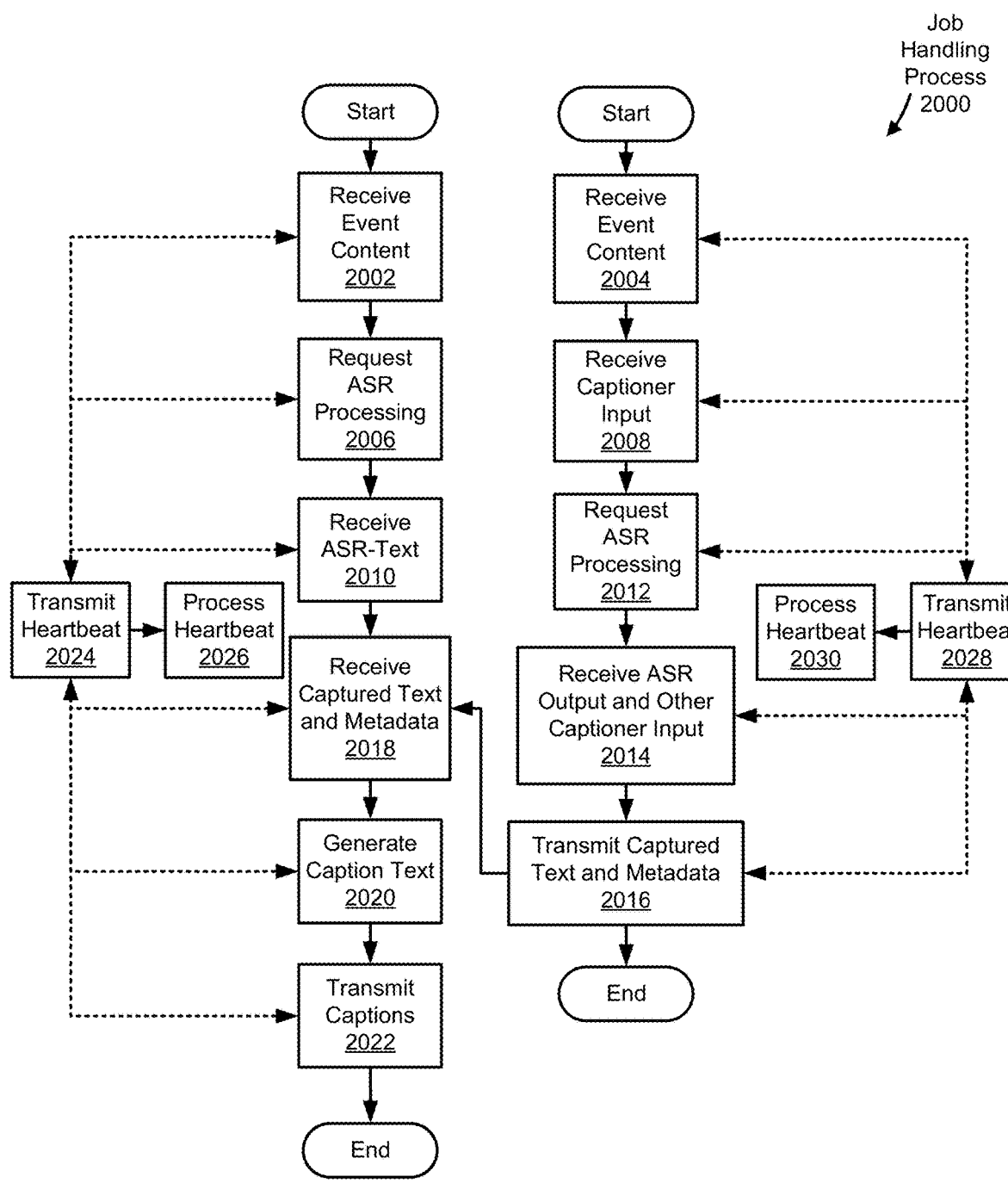
FIG. 20 is a flow diagram illustrating a process for processing a captioning job according to one example of the present disclosure.

Continuing with the example of FIG. 2, the connection service interface 238 is configured to interoperate with a connection service (e.g., the connection service 108 of FIG. 1) during caption job processing. For instance, in some examples, the connection service interface 238 is configured to receive and process heartbeat messages from the connection service. In certain examples, these heartbeat messages take the form of HTTP POSTS and include information regarding the status of the connection service. Examples of processes executed by the connection service interface 238 in response to reception of heartbeat messages are described further below with reference to FIG. 20.

Although the examples described above focus on a web-based implementation of the customer interface 224 and the captioner interface 226, examples are not limited to a web-based design. Other technologies, such as technologies employing a specialized, non-browser based client, may be used to implement user interfaces without departing from the scope of the aspects and examples disclosed herein.

Each of the interfaces disclosed herein may both restrict input to a predefined set of values and validate any information entered prior to using the information or providing the information to other processes. Additionally, each of the interfaces disclosed herein may validate the identity of an external entity prior to, or during, interaction with the external entity. These functions may prevent the introduction of erroneous data into the caption service 106 or unauthorized access to the caption service 106.

Continuing with the example of FIG. 2, the scheduling engine 232 is configured to both make captioning jobs available to captioners and to maintain an efficient schedule that results in captioning jobs being completed in a timely manner. In some examples, the scheduling engine 232 interoperates with the customer interface 224, the captioner interface 226, and the job data storage 234.

Continuing with the example of FIG. 2, the scheduling engine 232 is configured to identify unprocessed captioning service requests stored in the job data storage 234. In some of these examples, the scheduling engine 232 identifies unprocessed captioning service requests after receiving an indication of the storage of one or more unprocessed captioning service requests from another process, such as the customer interface 224 described above. In others of these examples, the scheduling engine 232 identifies unprocessed captioning service requests by periodically executing a query, or some other identification process, that identifies new, unprocessed captioning service requests by referencing information stored in the job data storage 234.

Continuing with the example of FIG. 2, in certain implementations the scheduling engine 232 is configured to perform a variety of processes in response to identifying unprocessed captioning service requests or in response to receiving a notification identifying unprocessed captioning service requests that are available for processing. For instance, in certain examples, the scheduling engine 232 is configured to create and post jobs corresponding to unprocessed captioning service requests, thereby making the jobs available to captioners for claiming and completion. In at least one example, as part of this processing, the scheduling engine 232 stores, within the job data storage 234, an association between each job and an event targeted for work by the job. This action is performed so that factors affecting payrate can be located in an event table (e.g., the event table 310) that is part of the job data storage 234.

Continuing with the example of FIG. 2, in some implementations the scheduling engine 232 is configured to periodically publish, or "push," notifications to captioners via the captioner interface 226 that indicate the availability of new jobs. In one of these examples, the scheduling engine 232 tailors these notifications by sending them only to particular captioners or groups of captioners, such as those captioners who have permission to complete the jobs. In other examples, the scheduling engine 232 tailors notifications based on other job characteristics, such as captioner check-in time. In some examples, the scheduling engine 232 sends notifications to captioners based on their ability to complete jobs having the attribute to which the notification is tailored. Continuing the previous examples, the scheduling engine 232 may send notifications to captioners who have a track record with the customer, are selected by the customer, have worked on a project of the customer, or who are highly efficient.

Continuing with the example of FIG. 2, in certain examples the scheduling engine 232 notifies captioners of near-term future job availability based on the upstream workflow. In this example, as captioning service requests are being entered by customers, the scheduling engine 232 predicts how many more jobs will be available and based on one or more the attributes of these jobs, such as duration, etc., the scheduling engine 232 sends out advanced notice to one or more captioners via the captioner interface 226. For example, using the start times and estimated duration for upcoming events, the scheduling engine 232 may compute an array of values representing the number of live events that will be in progress over an upcoming time period, with each array value representing a time slice, e.g. 15 minutes.

Continuing with the example of FIG. 2, to maintain an efficient disposition of jobs in some examples, the scheduling engine 232 is configured to determine when schedule conditions suggest intervening actions and to, in some cases, automatically take those intervening actions. For example, when the schedule is saturated with a number of unassigned jobs that transgress a configurable threshold, the scheduling engine 232 can intervene by increasing the payrate of jobs. In another example, the scheduling engine 232 can intervene to increase the payrate of a job where the proximity of the current date and scheduled date for the event associated with the job transgresses a threshold (e.g., 2 days).

Continuing with the example of FIG. 2, in some implementations the scheduling engine 232 is configured to use the preview functionality as an indicator of job difficulty and appropriate payrate. For instance, in one example, the scheduling engine 232 detects that the number of captioners that have previewed a job and not claimed it has exceeded a threshold. Alternatively, in another example, the scheduling engine 232 detects that the total preview duration of an unclaimed job has transgressed a threshold. These phenomena may indicate that the job is more difficult than is reflected by the current payrate. The scheduling engine 232 may then intervene to increase the payrate to improve the chance that the job will be claimed or to split into segments.

Continuing with the example of FIG. 2, in some examples the scheduling engine 232 monitors the status of, and information associated with, all jobs available on the market. This information includes payrate, due date/captioner check-in time, and summary information such as the number of captioners with permission to complete the job, the amount of time a job has been on the market, the number of previews of the job, and other data concerning the status of the job and its associated event. In some examples, the scheduling engine 232 is configured to use this information to ensure that problem jobs are accepted. For example, the scheduling engine 232 may increase the payrate, may enable a larger number of captioners to claim the job, or may cut the event associated with the job into shorter segments—thus producing several less difficult captioning jobs for the same event.

Continuing with the example of FIG. 2, in certain examples the scheduling engine 232 is configured to analyze the overall status of the schedule prior to modifying job characteristics. For instance, in one example, the scheduling engine 232 monitors the amount of work available on the schedule, and if the amount transgresses a threshold, increases the payrate for jobs that are within a threshold value of their scheduled dates. In other examples, the scheduling engine 232 is configured to analyze the dynamics of the overall schedule to determine intervening actions to perform. In one example, the scheduling engine 232 measures the rate at which jobs are being accepted and measures the number of jobs and/or duration of the jobs, and estimates the time at which only the least popular jobs will remain unclaimed. If the scheduling engine 232 determines that this time is sufficiently ahead of the due date/captioner check-in time for these jobs, then the scheduling engine 232 may wait before increasing the payrate.

Continuing with the example of FIG. 2, in certain implementations the scheduling engine 232 is configured to set meta rules to affect operation of the schedule. Meta rules globally modify the schedule by affecting how all or some of the available jobs will appear on the schedule. For instance, the scheduling engine 232 may set a meta rule that prevents some percentage of the jobs from being available to any captioners for a certain time period. The scheduling engine 232 may use this rule during periods when there is a surplus of work, and therefore help to smooth out the flow of jobs through the system. Various examples may implement a variety of meta rules, and examples are not limited to a particular meta rule or set of meta rules.

Continuing with the example of FIG. 2, the scheduling engine 232 is configured to make a copy of the captioned event available to the customer after a job is completed. The customer may then download the copy for his or her own use via the customer interface 224. It should be noted that a copy of an uncaptioned event can also be maintained in the media file storage 236 for reference and further processing (e.g., future captioning services).

It should also be noted that, in some examples, the scheduling engine 232 implements the functionality of the market engine 132 described in the 'Electronic Transcription Job Market' application. In these examples, the caption service 106 includes the configuration of the transcription system 100 and, thus, can process transcription jobs, QA jobs, auditing jobs, and the like in addition to captioning jobs. Additionally, in certain examples, the caption service 106 includes the configuration of the transcription system 100 of the 'Transcription Training' application and, thereby, is configured to autonomously train captioners to correct ASR text and/or transcribe content according to a defined set of standards. In these examples, the caption service 106 is configured to execute training processes that include a sequence of example live events, with instructions and tests, which may be manually or automatically scored according to rubrics. Moreover, in some examples, the caption service 106 is configured to execute a speech writing training process to increase a captioner's accuracy when interacting with a captioning client.

Information within the caption service 106, including data within the job data storage 234 and the media file storage 236, may be stored in any logical construction capable of holding information on a computer readable medium including, among other structures, file systems, flat files, indexed files, hierarchical databases, relational databases or object oriented databases. The data may be modeled using unique and foreign key relationships and indexes. The unique and foreign key relationships and indexes may be established between the various fields and tables to ensure both data integrity and data interchange performance.

Examples of the caption service 106 are not limited to the particular configuration illustrated in FIGS. 2 through 10. Various examples utilize a variety of hardware components, software components and combinations of hardware and software components configured to perform the processes and functions described herein. In some examples, the caption service 106 is implemented using a distributed computer system, such as the distributed computer system described further below with regard to FIG. 18.

Returning to the example in FIG. 1, the captioning client 102 is configured to interact with a captioner (e.g., the captioner 212 of FIG. 2), the ASR engine 104, the caption service 106, and the transcoding service 110 to generate live captioning for an event. In some examples, the captioning client 102 is executable by a browser, operating system, or some other execution environment of a computer system (e.g. the client computer 206 of FIG. 2) that is accessible by and associated with the captioner. In these examples, the captioning client 102 is configured to present one or more user interface screens to the captioner that enable the captioner to provide live captioning services.

Figure 11:
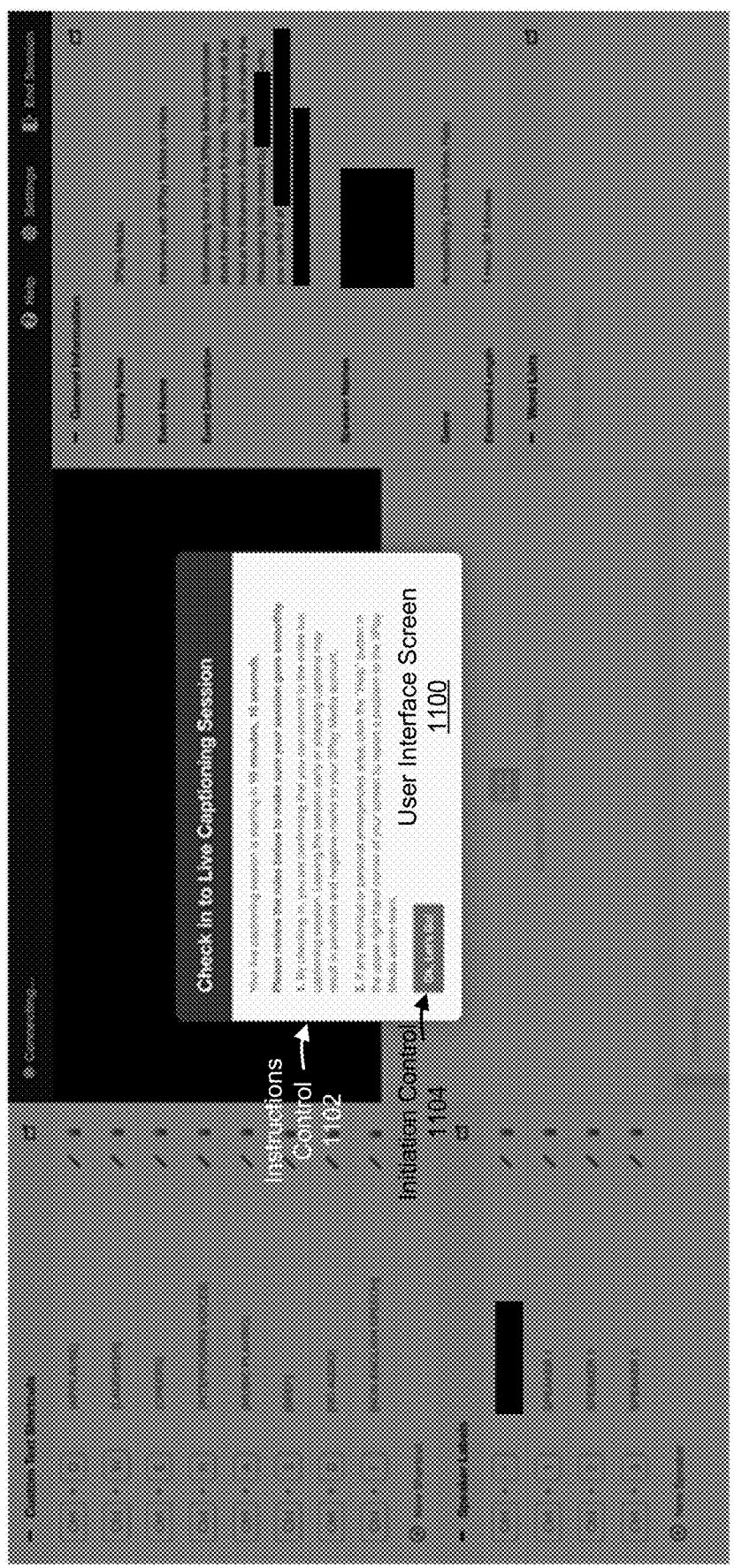
FIG. 11 is a front view of a user interface screen provided by a captioning client according to one example of the present disclosure.

FIG. 11 illustrates a user interface screen 1100 presented by a captioning client (e.g., the captioning client 102 of FIG. 1) in some examples. As shown in FIG. 11, the user interface screen 1100 greets the captioner and includes an instructions control 1102 and an initiation control 1104. The instructions control 1102 is configured to display initial instructions to the captioner. The initiation control 1104 is configured to receive input (e.g., a click or other selection) indicating that the captioner is ready to proceed. The captioning client is configured to close the user interface screen 1100 in response to reception of the input via the initiation control 1104, thereby transferring focus to the user interface screen in background within FIG. 11.

Figure 12:
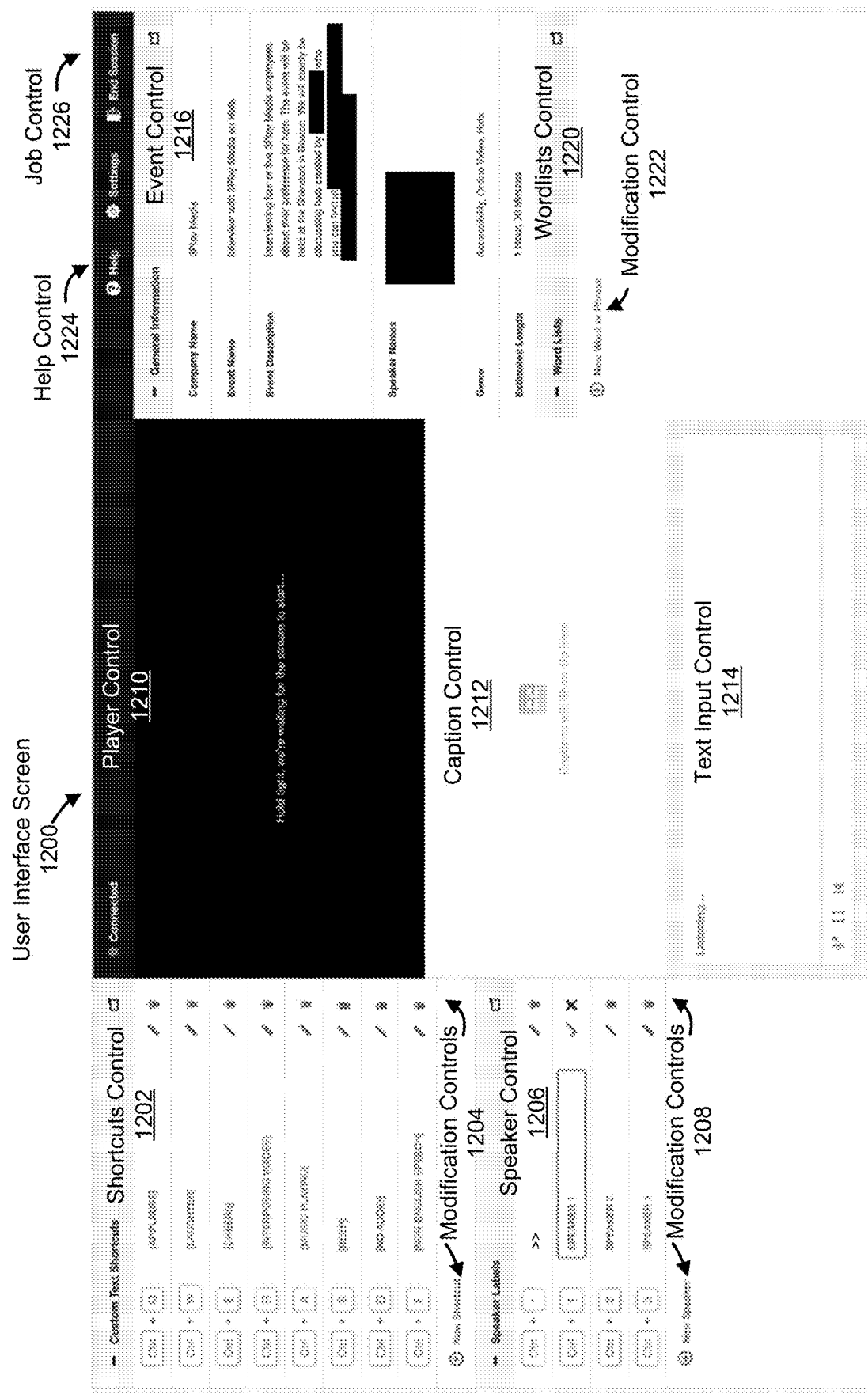
FIG. 12 is a front view of another user interface screen provided by a captioning client according to one example of the present disclosure.

FIG. 12 illustrates a user interface screen 1200 presented by a captioning client (e.g., the captioning client 102 of FIG. 1) to a captioner (e.g., the captioner 212 of FIG. 2) in some examples. As shown in FIG. 12, the user interface screen 1200 includes a shortcuts control 1202, a speaker control 1206, a player control 1210, a caption control 1212, a text input control 1214, an event control 1216, a wordlists control 1220, and modification controls 1204, 1208, and 1222. The shortcuts control 1202 is configured to display a set of keystrokes that enable common caption labels to be quickly inserted into the text currently being edited within the text input control 1214 during a live event. As shown in FIG. 12, the shortcuts control 1202 includes a table control in which each row is configured to display a combination of keystrokes and a caption label insertable via input of the combination of keystrokes. For instance, as depicted in FIG. 12, the first row of the shortcuts control 1202 indicates that the combination of the <control key> and the "Q" key will cause the captioning client to insert an "[APPLAUSE]" label into the current text at a selected location. The second row of the shortcuts control 1202 indicates that the combination of the <control key> and the "W" key will cause the captioning client to insert a "[LAUGHTER]" label into the current text at a selected location. Further, as illustrated in FIG. 12, the modification controls 1204 are configured to receive input to add, edit, or delete shortcuts made available by the captioning client. The captioning client is configured to add, edit or delete shortcuts according to the input in response to reception of the input via the modifications controls 1204.

Continuing with the screen 1200, in some examples the captioning client is configured to retrieve and store a set of shortcuts from a data store (e.g., the captioner table 306 and/or the project table 308 of FIG. 3) and to populate the shortcut control 1202 with the set of shortcuts during initialization of the captioning client. Alternatively, in some examples, the captioning client is configured to hide or omit the modification controls 1204 to preserve a consistent user interface for all captioners.

Continuing with the screen 1200, the speaker control 1206 is configured to display a set of keystrokes that enable labels regarding speakers to be quickly inserted into the text currently being edited within the text input control 1214 during a live event. As shown in FIG. 12, the speaker control 1206 includes a table control in which each row is configured to display a combination of keystrokes and a speaker label insertable via input of the combination of keystrokes. For instance, as depicted in FIG. 12, the first row of the speaker control 1206 indicates that the combination of the <control key> and the "" key will cause the captioning client to insert a ">>" label (indicating that a new speaker has begun speaking) into the current text at a selected location. The second row of the shortcuts control 1202 indicates that the combination of the <control key> and the "1" key will cause the captioning client to insert a "SPEAKER 1" label into the current text at a selected location. Further, as illustrated in FIG. 12, the modification controls 1208 are configured to receive input to add, edit, or delete shortcuts made available by the captioning client. The captioning client is configured to add, edit or delete speaker labels according to the input in response to reception of the input via the modification controls 1208.

Continuing with the screen 1200, in certain implementations the captioning client is configured to retrieve and store a list of speakers from an event data store (e.g., the event table 310 of FIG. 3) and to populate the speaker control 1206 with the list of speakers during initialization of the captioning client.

Continuing with the screen 1200, the wordlists control 1220 is configured to display a list of words germane to the event being serviced with live captioning. In some examples, the wordlist is used to bias an ASR engine (e.g., the ASR engine 104 of FIG. 1) to be more likely to recognize uncommon words likely to be uttered during the event. As illustrated in FIG. 12, the modification control 1222 is configured to receive input to add new words to the wordlist. The captioning client is configured to add words according to the input in response to reception of the input via the modification control 1222.

Continuing with the screen 1200, in certain examples the captioning client is configured to retrieve a wordlist for the event from the event data store and to populate the wordlist control 1220 with the wordlist during initialization of the captioning client.

Continuing with the screen 1200, the event control 1216 is configured to display information regarding the event to be live captioned. As illustrated in FIG. 12, the event control 1216 is configured to display the customer producing the event, the name of the event, a description of the event, a list of speakers for the event, the genre of the event, and an estimated duration of the event. In some examples, the captioning client is configured to retrieve the information regarding the event from the event data store and to populate the event control 1220 with the event information during initialization of the captioning client.

Continuing with the screen 1200, the player control 1210 is configured to display status information regarding its connection to an event content source, such as a transcoder (e.g., the transcoding service 110 of FIG. 1) and to receive and render event content. In some examples, the player control 1210 is configured to receive event content from the event content source using an RTMP URL associated with the platform broadcasting the event. In some examples, the captioning client retrieves the RTMP URL for the event from the event data store and to passes the RTMP to the player control 1210 during initialization of the captioning client.

Continuing with the screen 1200, the text input control 1214 is configured to display status information regarding the connection of the captioning client to the ASR engine and interoperate with the ASR engine and the captioner to generate live captioning during an event. In some examples, the caption control 1212 is configured to receive verbal input (e.g., via a microphone) from the captioner, transmit the verbal input to the ASR engine, receive ASR text from the ASR engine, and render the ASR text for review by captioner. Further, in these examples, the caption control 1212 is configured to interact with the captioner to receive additional input (e.g., verbal and/or tactile input) specifying additional words and/or corrections to the received ASR text and to transmit the resulting captured text to a captured text target (e.g., the connection service 108 of FIG. 1). As shown in FIG. 12, the caption control 1212 indicates that the captioning client has finished initialization and is waiting to receive event content. In some examples, the captioning client is configured to transfer text residing within the text input control 1214 to the caption control 1212 after expiration of a configurable time period (e.g., 3 seconds, 5 seconds, etc.). Alternatively or additionally, in some examples, the captioning client is configured to transfer text residing within the text input control 1214 to the caption control 1212 in response to reception of input (e.g., a click or other selection) indicating that the captioner wishes to submit the text immediately.

Continuing with the screen 1200, the help control 1224 is configured to receive input (e.g., a click or some other selection) specifying that the captioner needs help. The captioning client is configured to, in response to reception of the input via the help control, initiate a user interface screen configured to prompt the captioner for additional information and to transmit a help request to a system administrator. One example of a user interface screen configured to prompt the captioner for additional information is described below with reference to FIG. 16. Given the real time nature of live captioning services, help requests transmitted via the help control 1224 are handled with special dispatch (e.g., responded to in real time), in some examples.

Continuing with the screen 1200, the job control 1226 is configured to receive input (e.g., a click or some other selection) specifying a request to terminate the captioner's participation in the captioning job. The captioner may need to communicate a termination request for a variety of reasons, including poorly performing captioning infrastructure, personal emergency, or the like. In response to receiving such a termination request from the job control 1226, the captioning client is configured to interoperate with a connection service (e.g., the connection service 108 of FIG. 1) and the caption service to terminate the captioner's participation in the captioning job.

In some examples, the captioning client is configured to display a countdown timer in the job control 1226 that displays the amount of time remaining in the caption job. Further, in these examples, the job control 1226 is configured to receive input (e.g., a click or some other selection) specifying that the captioner is ready to handoff captioning duty to another captioner who is scheduled to provide captioning services for the event. The captioning client is configured to communicate a handoff message to the connection service in response to reception of this input from the job control 1226.

Continuing with the screen 1200, the caption control 1212 is configured to display captured text in various levels of completion and, depending on the level of completion, interact with the captioner to finalize the captured text. For instance, in some examples, the caption control 1212 is configured to present captured text previously transmitted downstream (e.g., to the data storage service 112, the text streaming service 120, or the caption service 106 of FIG. 1) as finalized and immutable. Further, in these examples, the caption control 1212 is configured to present captured text that has not been transmitted downstream as draft and mutable. Moreover, in these examples, the caption control 1212 is configured to interact with the captioner (via the microphone and/or keyboard) to edit, or delete and replace, the draft captured text.

It should be noted that, in some examples, the screen 1200 is configured to display additional information helpful to the captioner. For instance, in some implementations, the screen 1200 includes a control configured to display an amount of time until the event to be live captioned starts (e.g., via a countdown or some other indication). Alternatively or additionally, the screen 1200 can include a control configured to display an amount of time that has elapsed since the event started. Additionally or alternatively, the screen 1200 can include a control configured to display an amount of time until the captioner's scheduled time to provide captioning services ends (e.g., via a countdown or some other indication).

Figure 13:
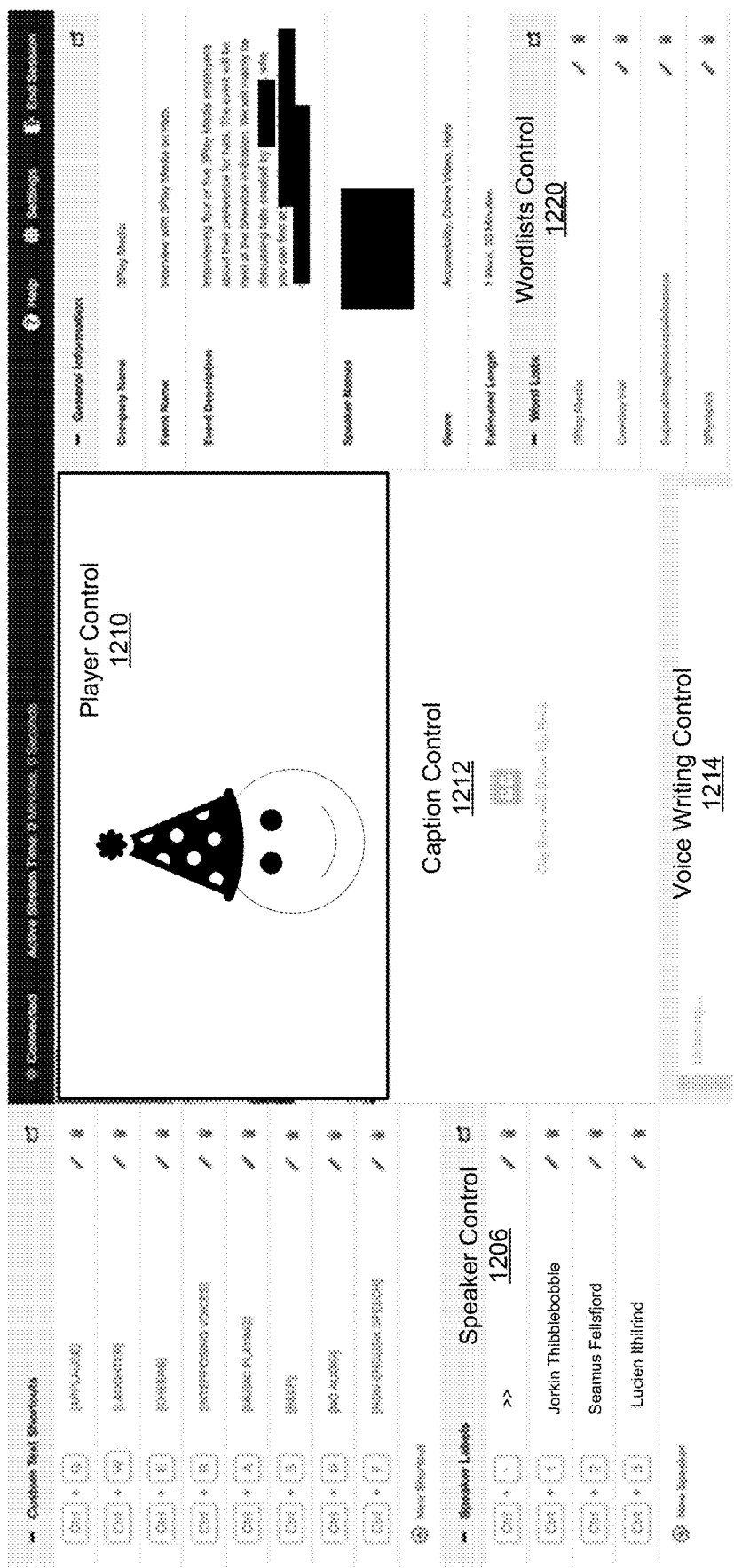
FIG. 13 is a front view of the user interface screen of FIG. 12 during interaction with a user according to one example of the present disclosure.

FIGS. 13-16 illustrate operation of a captioning client (e.g., the captioning client 102 of FIG. 1) according to one example. As shown in FIG. 13, a captioner (e.g., the captioner 212 of FIG. 2) has modified the speaker names listed in the speaker control 1206 and added a set of words to the wordlist control 1220. Further, in this example, the player control 1210 is receiving content from a transcoder. In addition, the text input control 1214 is in communication with the ASR engine and has updated its status indicate that the ASR engine is listening and ready to provide ASR text in response to reception of utterances from the captioner.

Figure 14:
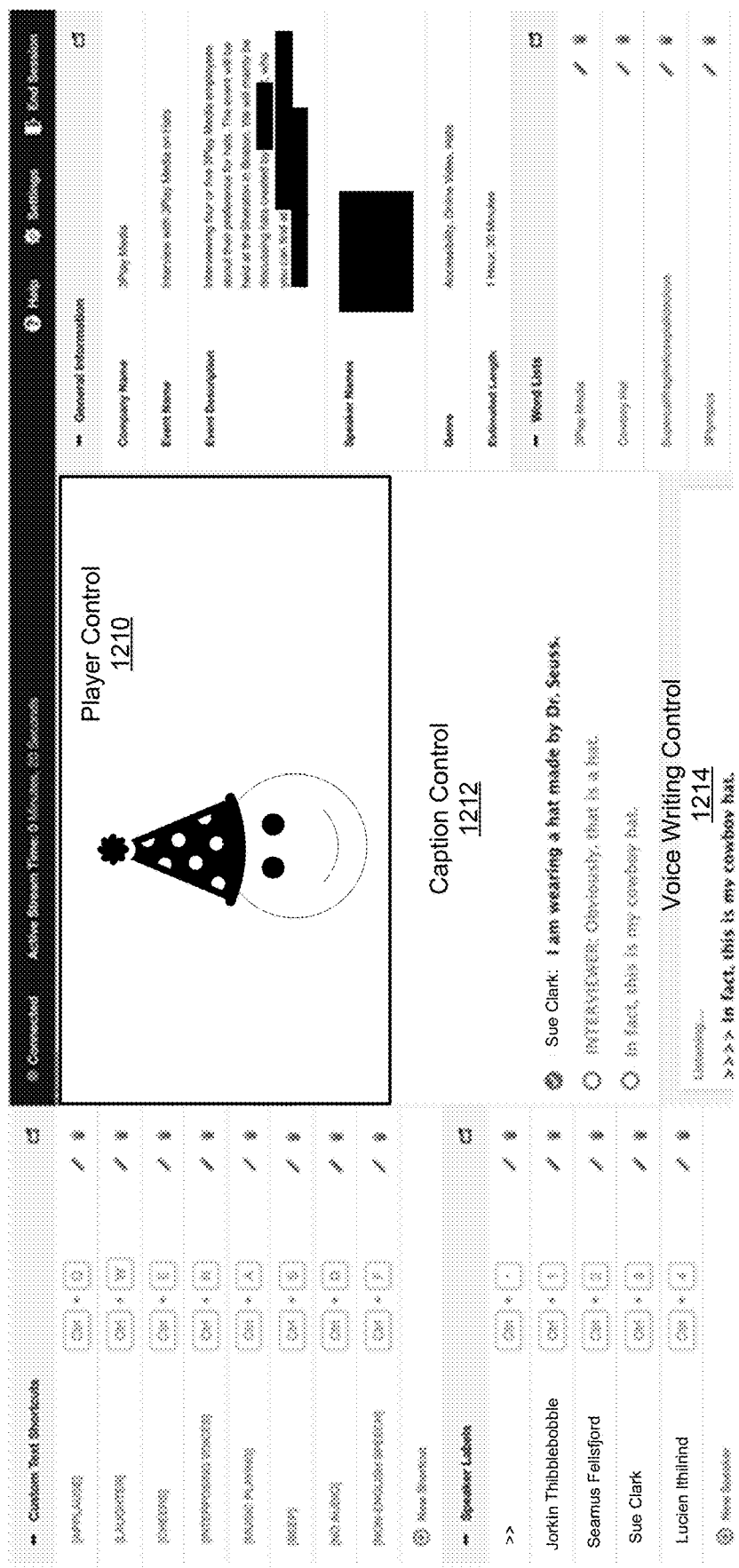
FIG. 14 is a front view of the user interface screen of FIG. 12 during interaction with a user according to one example of the present disclosure.
Figure 15:
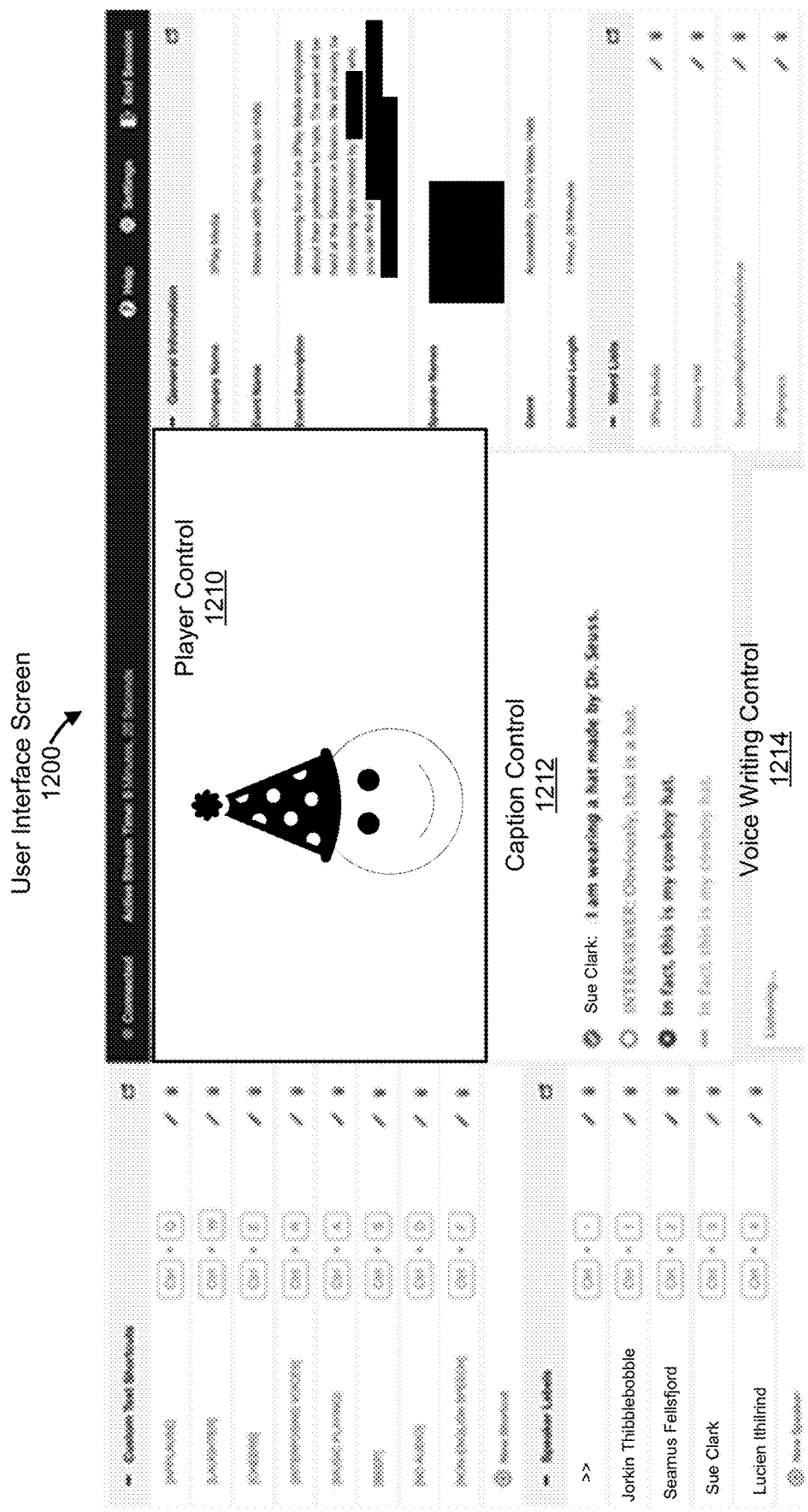
FIG. 15 is a front view of the user interface screen of FIG. 12 during interaction with a user according to one example of the present disclosure.

Continuing with the example of FIG. 13 with added reference to FIG. 14, the captioner has interacted with the text input control 1214 to produce 3 lines of text, which are displayed in the caption control 1212. The first line of text "Sue Clark: I am wearing a hat made by Dr. Seuss." is finalized and immutable, having been transmitted downstream. The second and third lines of text are drafts and mutable. Further, in the example shown in FIG. 14, the text input control 1214 has received and displayed an erroneous, second utterance of the third line of text from the captioner—"In fact, this is my cowboy hat." Continuing with the example of FIG. 14 with added reference to FIG. 15, the captioner has interacted with the caption control 1212 to delete the third line of text and, in this way, as corrected the previous error.

Figure 16:
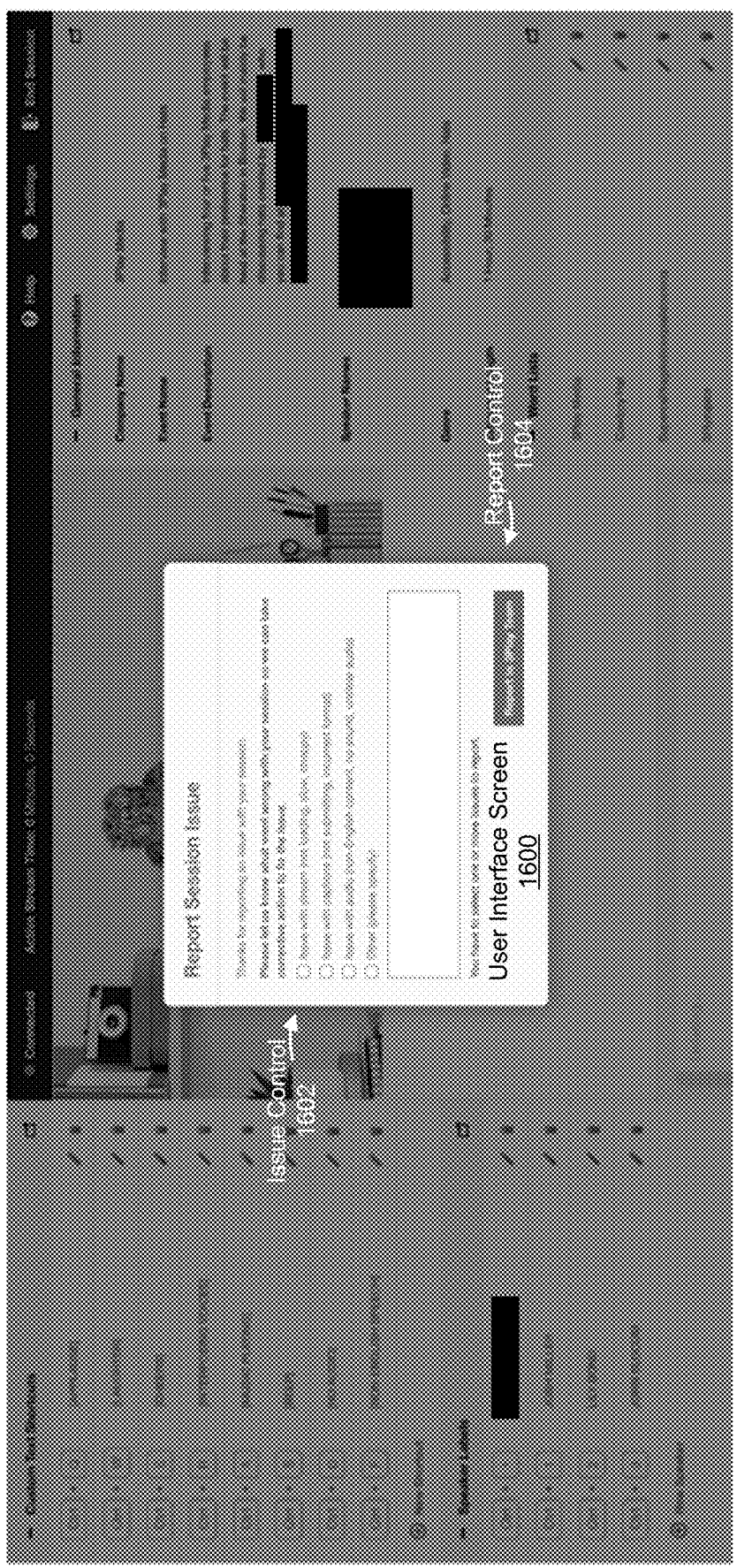
FIG. 16 is a front view of a user interface screen provided by a captioning client according to one example of the present disclosure.

FIG. 16 illustrates a user interface screen 1600 presented by a captioning client (e.g., the captioning client 102 of FIG. 1) in response to the captioner selecting a help control (e.g., the help control 1224 of FIG. 12), in some examples. As shown in FIG. 16, the user interface screen 1600 includes an issue control 1602 and a report control 1604. The issue control 1602 is configured to prompt the captioner for additional information regarding the issue encountered by the captioner. As illustrated, the issue control 1602 is configured to receive this additional information via input selecting of one of several issues more commonly encountered than others or via input specifying a different issue. The report control 1604 is configured to receive input (e.g., a click or other selection) indicating that the captioner is ready to submit the help request. The captioning client is configured to close the user interface screen 1600 in response to reception of the input via the report control 1604 and to communicate the help request to an administrator interface.

Returning to the example of FIG. 1, the connection service 108 is configured to receive live event content and text from multiple sources and arbitrate between the sources of the text prior to transmitting caption text to downstream processes. The connection service 108 may also be configured to save any of the information it receives to the data storage service 112 for later use by the caption service 106 in viewing the event content and/or captions or for producing a full transcript/caption from the event content.

Continuing with the example of FIG. 1, the connection service 108 is configured to establish the connections through which it receives text and event content. More specifically, in these examples, to receive text produced by the captioning client 102, the connection service can be configured to establish a connection with the captioning client 102, the text streaming service 120, and/or the caption service 106 (e.g., where the captioning client 102 transmits captured text to the text streaming service 120 and/or the caption service 106). These connections can be, for example, web server connections, web socket connections, and/or other internet connection mechanisms. Additionally, in some examples, the connection service 108 is configured to establish a connection to the transcoding service 110 prior to commencement of the event to receive event content.

Continuing with the example of FIG. 1, the connection service 108 is configured to extract audio content, as needed, from the event content received from the transcoding service 110. In these examples, the connection service 108 is also configured to supply the audio content to the ASR engine 104 and to receive from the ASR engine 104 ASR text generated by the ASR engine 104 and associated metadata (time codes, word confidences, and alternate words).

Continuing with the example of FIG. 1, the connection service 108 is configured to establish and maintain a connection with the caption service 106. In these examples, the connection service 108 can utilize this connection to communicate status information regarding operation of the connection service 108 or its upstream processes to the caption service 106. For instance, in certain implementations, the connection service is configured to communicate status information to the caption service 106 that indicates whether the captioning client 102 is connected to and receiving event content from the transcoding service 110. Alternatively or additionally, the connection service 108 can utilize its connection with the caption service 106 to transmit periodic heartbeat messages in the form HTTP posts. These heartbeat messages indicate that the connection service 108 is currently receiving event content, captured text from the captioning client 102, and/or ASR text from the ASR engine 104. The heartbeat messages can include information about audio content as well as words being recognized, in addition to simply signaling a valid connection.

Continuing with the example of FIG. 1, the connection service 108 is configured to record time periods when a heartbeat message from the live captioning client 102 is unavailable. Similarly, in some examples, the connection service 108 is configured to record time periods where no text is arriving from the captured text source, and optionally, where words are arriving from the ASR text source. This information can be stored and used to calculate of the customer price for the live captioning service and to determine the captioner pay.

Figure 17:
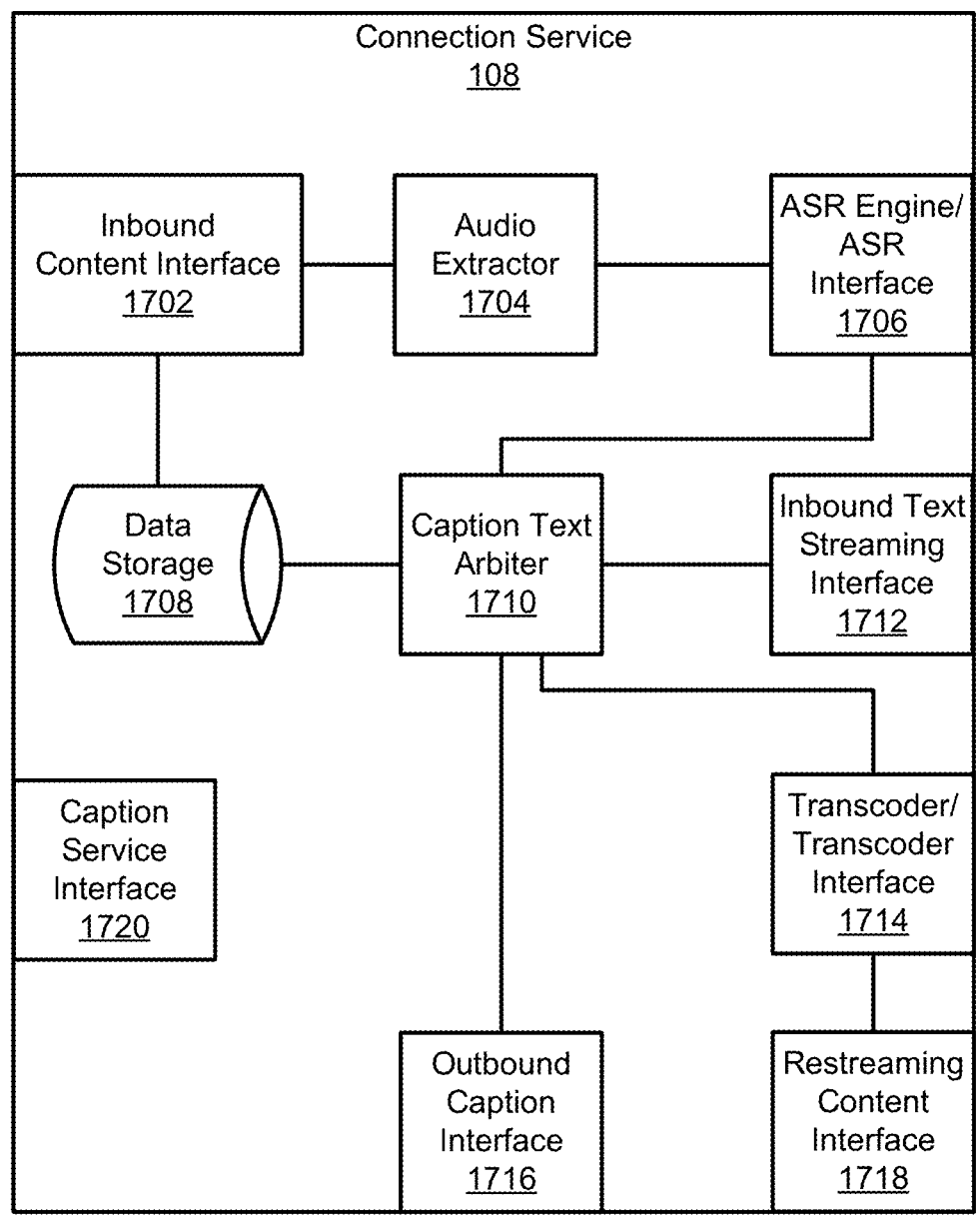
FIG. 17 is a block diagram showing an architecture of a connection service according to one example of the present disclosure.

FIG. 17 illustrates one implementation of the connection service 108. FIG. 17 is a block diagram in which each of the blocks depicts one or more processes implemented by computer hardware or a combination of computer hardware and computer software. Similarly, each of the cylinders depicts a data store implemented by computer hardware or a combination of computer hardware and computer software. The processes illustrated in FIG. 17 include an inbound content interface 1702, an audio extractor 1704, an ASR engine/interface 1706, a caption text arbiter 1710, an inbound text streaming interface 1712, a transcoder/transcoder interface 1714, an outbound caption interface 1716, a restreaming content interface 1718, and a caption service interface 1720. The data stores illustrated in FIG. 17 include a data storage 1708. The processes 1702, 1704, 1706, 1710, 1712, 1714, 1716, 1718, and 1720 and the data storage 1708 are hosted by a server environment including one or more computer systems. Each of the lines included in FIG. 17 depicts communications between processes and/or data stores. These communications can be transmitted within or across one or more computer systems via internal and/or external communication networks implemented by the computer systems. The communications can include, for example, API requests and responses between the illustrated processes, read and write requests to volatile and non-volatile memory, or the like, although other communication mechanisms will be apparent in light of this disclosure.

As shown in FIG. 17, the inbound content interface 1702 is configured to interoperate with a source of event content (e.g., the transcoding service 110 and/or the stream source 118 of FIG. 1). In some examples, the inbound content interface 1702 receives event content from the source, stores a copy of the event content in the data storage 1708, and passes the event content to the audio extractor 1704. The audio extractor 1704 is configured to receive the event content, extract audio information therefrom, and pass the audio information to the ASR engine/interface 1706. The ASR engine/interface 1706 can be a locally hosted ASR engine or an ASR interface to an ASR engine (e.g., the ASR engine 104 of FIG. 1) hosted remotely from the connection service 108. The ASR engine/interface 1706 processes the audio information to generate ASR text and associated metadata (time codes, word confidences, and alternate words).

Continuing with the example of FIG. 17, the inbound text streaming interface 1712 interoperates with a source (e.g., the live captioning client 102, the text streaming service 120, and/or the caption service 106 of FIG. 1) for captured text generated by a captioning client (e.g., the live captioning client 102). In some examples, the inbound text streaming interface 1712 receives captured text and passes a copy of the captured text to the caption text arbiter 1710. In these examples, the caption text arbiter 1710 is configured to generate caption text by arbitrating between the ASR text and captured text. In generating the caption text, the caption text arbiter 1710 is configured to execute one or more arbitration processes as described further below with reference to the operation 2020 of FIG. 20. The caption text arbiter 1710 is also configured to pass the generated caption text to the transcoder/transcoder interface 1714 and the outbound caption interface 1716.

Continuing with the example of FIG. 17, the transcoder/transcoder interface 1714 is configured to execute transcoding operations or transmit requests to and receive responds from a transcoding service (e.g., the transcoding service 110 of FIG. 1). As such, the transcoder/transcoder interface 1714 is either a locally hosted transcoding engine or is an interface to communication with a transcoding service hosted remotely from the connection service 108. In either case, the transcoder/transcoder interface 1714 is configured to process the caption text and the event content to generate a copy of the event content with embedded caption text (e.g., 608 format) and pass the captioned event content to the restreaming content interface 1718. In certain examples, the restreaming content interface 1718 is configured to interoperate with a target for restreamed content from the event encoded with live captions (e.g., the restreaming integrator 124 of FIG. 1). In some examples, the restreaming content interface 1718 transmits a stream of captioned event content to the restreaming target.

Continuing with the example of FIG. 17, the outbound caption interface 1716 is configured to interoperate with a target for caption text (e.g., the transcoding service 110, the caption integrator 122, the data storage service 112, and/or the content delivery network 116 of FIG. 1). In some examples, the outbound caption interface 1716 is configured to communicate the caption text to the target.

Continuing with the example of FIG. 17, the caption service interface 1720 is configured to interoperate with a caption service (e.g., the caption service 106 of FIG. 1). In some examples, the outbound caption interface 1716 is configured to transmit heartbeat messages to the caption service.

Computer System

As discussed above with regard to FIGS. 1-17, various aspects and functions described herein may be implemented as specialized hardware or software components executing in one or more computer systems. There are many examples of computer systems that are currently in use. These examples include, among others, network appliances, personal computers, workstations, mainframes, networked clients, servers, media servers, application servers, database servers, and web servers. Other examples of computer systems may include mobile computing devices, such as cellular phones and personal digital assistants, and network equipment, such as load balancers, routers, and switches. Further, aspects may be located on a single computer system or may be distributed among a plurality of computer systems connected to one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, examples are not limited to executing on any particular system or group of systems. Further, aspects and functions may be implemented in software, hardware or firmware, or any combination thereof. Thus, aspects and functions may be implemented within methods, acts, systems, system elements and components using a variety of hardware and software configurations, and examples are not limited to any particular distributed architecture, network, or communication protocol.

Figure 18:
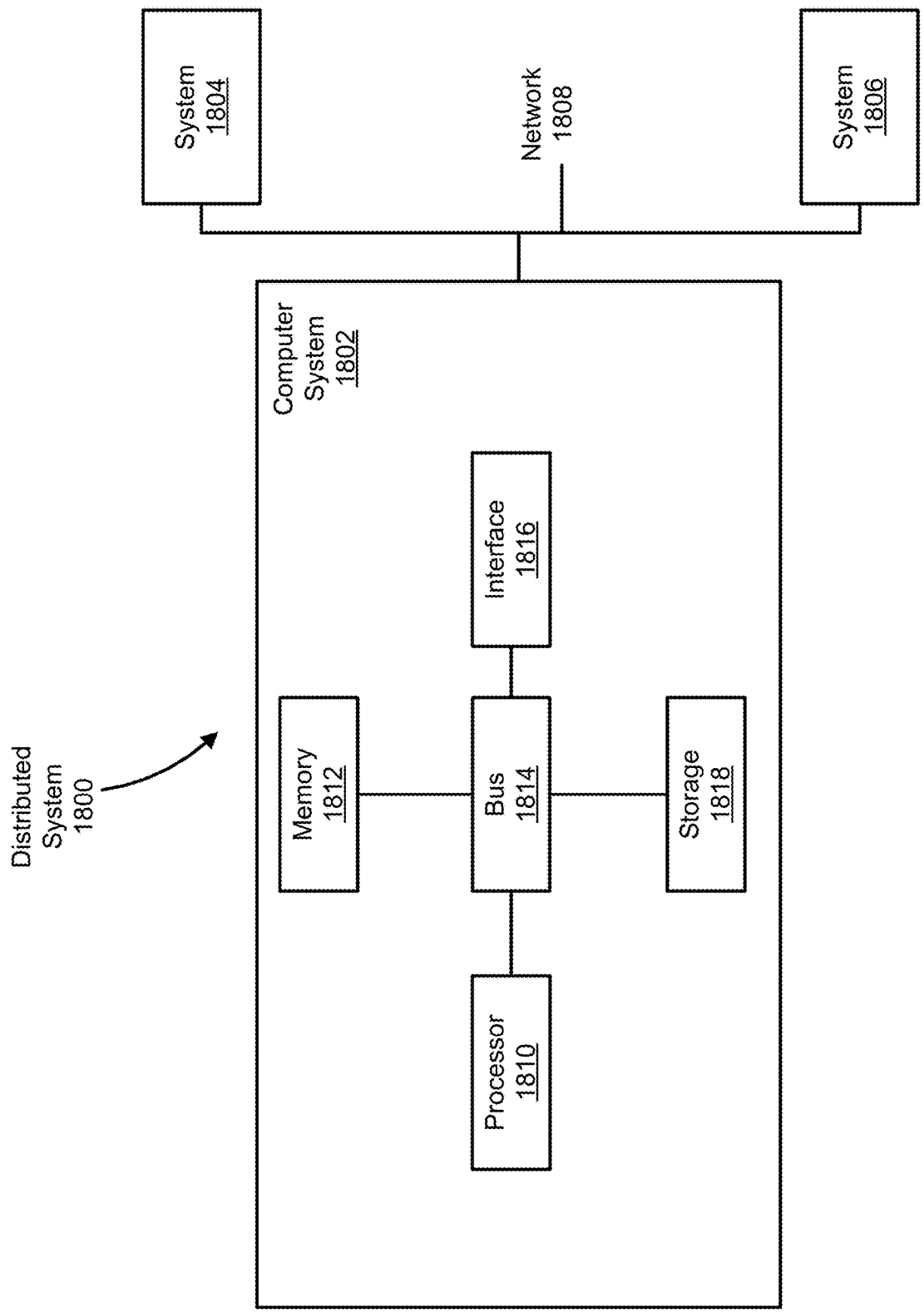
FIG. 18 is a block diagram of one example of a computer system that can implement the example systems and methods described herein according to one example of the present disclosure.

Referring to FIG. 18, there is illustrated a block diagram of a distributed computer system 1800, in which various aspects and functions are practiced. As shown, the distributed computer system 1800 includes one or more computer systems that exchange information. More specifically, the distributed computer system 1800 includes computer systems 1802, 1804, and 1806. As shown, the computer systems 1802, 1804, and 1806 are interconnected by, and may exchange data through, a communication network 1808. The network 1808 may include any communication network through which computer systems may exchange data. To exchange data using the network 1808, the computer systems 1802, 1804 and 1806 and the network 1808 may use various methods, protocols and standards, including, among others, Fibre Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST and Web Services. To ensure data transfer is secure, the computer systems 1802, 1804, and 1806 may transmit data via the network 1808 using a variety of security measures including, for example, TLS, SSL, or VPN. While the distributed computer system 1800 illustrates three networked computer systems, the distributed computer system 1800 is not so limited and may include any number of computer systems and computing devices, networked using any medium and communication protocol.

As illustrated in FIG. 18, the computer system 1802 includes a processor 1810, a memory 1812, a bus 1814, an interface 1816 and data storage 1818. To implement at least some of the aspects, functions, and processes disclosed herein, the processor 1810 performs a series of instructions that result in manipulated data. The processor 1810 may be any type of processor, multiprocessor, or controller. Some exemplary processors include commercially available processors. The processor 1810 is connected to other system components, including one or more memory devices 1812, by the bus 1814.

The memory 1812 stores programs and data during operation of the computer system 1802. Thus, the memory 1812 may be a relatively high performance, volatile, random access memory such as a dynamic random access memory (DRAM) or static memory (SRAM).

However, the memory 1812 may include any device for storing data, such as a disk drive or other non-volatile storage device. Various examples may organize the memory 1812 into particularized and, in some cases, unique structures to perform the functions disclosed herein. These data structures may be sized and organized to store values for particular data and types of data.

Components of the computer system 1802 are coupled by an interconnection element such as the bus 1814. The bus 1814 may include one or more physical busses, for example, busses between components that are integrated within a same machine, but may include any communication coupling between system elements including specialized or standard computing bus technologies such as IDE, SCSI, PCI, and InfiniBand. The bus 1814 enables communications, such as data and instructions, to be exchanged between system components of the computer system 1802.

The computer system 1802 also includes one or more interface devices 1816 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 1802 to exchange information and to communicate with external entities, such as users and other systems.

The data storage 1818 includes a computer readable and writeable nonvolatile, or non-transitory, data storage medium in which instructions are stored that define a program or other object that is executed by the processor 1810. The data storage 1818 also may include information that is recorded, on or in, the medium, and that is processed by the processor 1810 during execution of the program. More specifically, the information may be stored in one or more data structures specifically configured to conserve storage space or increase data exchange performance. The instructions may be persistently stored as encoded signals, and the instructions may cause the processor 1810 to perform any of the functions described herein. The medium may, for example, be optical disk, magnetic disk or flash memory, among others. In operation, the processor 1810 or some other controller causes data to be read from the nonvolatile recording medium into another memory, such as the memory 1812, that allows for faster access to the information by the processor 1810 than does the storage medium included in the data storage 1818. The memory may be located in the data storage 1818 or in the memory 1812, however, the processor 1810 manipulates the data within the memory, and then copies the data to the storage medium associated with the data storage 1818 after processing is completed. A variety of components may manage data movement between the storage medium and other memory elements and examples are not limited to particular data management components. Further, examples are not limited to a particular memory system or data storage system.

Although the computer system 1802 is shown by way of example as one type of computer system upon which various aspects and functions may be practiced, aspects and functions are not limited to being implemented on the computer system 1802 as shown in FIG. 18. Various aspects and functions may be practiced on one or more computers having different architectures or components than those shown in FIG. 18. For instance, the computer system 1802 may include specially programmed, special-purpose hardware, such as an application-specific integrated circuit (ASIC) tailored to perform a particular operation disclosed herein. While another example may perform the same function using a grid of several general-purpose computing devices running commercially available hardware and operating systems and several specialized computing devices running proprietary hardware and operating systems.

The computer system 1802 may be a computer system including an operating system that manages at least a portion of the hardware elements included in the computer system 1802. In some examples, a processor or controller, such as the processor 1810, executes an operating system. Examples of a particular operating system that may be executed include a Windows-based operating system, such as WINDOWS 10 operating system available from Microsoft Corporation, one of many Linux-based operating system distributions, for example, the Enterprise Linux operating system available from Red Hat Inc., or a UNIX operating system available from various sources. Many other operating systems may be used, and examples are not limited to any particular operating system.

The processor 1810 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, or C# (C-Sharp). Other object-oriented programming languages may also be used. Alternatively, functional, scripting, or logical programming languages may be used.

Additionally, various aspects and functions may be implemented in a non-programmed environment, for example, documents created in HTML, XML or other format that, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements, e.g., specialized hardware, executable code, data structures or objects, that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a proprietary data structure (such as a database or file defined by a user mode application) or in a commonly shared data structure (such as an application registry that is defined by an operating system). In addition, some examples provide for both system and user interfaces that allow external entities, such as customers or captioners, to modify the parameters and thereby configure the behavior of the components.

Caption System Processes

Figure 19:
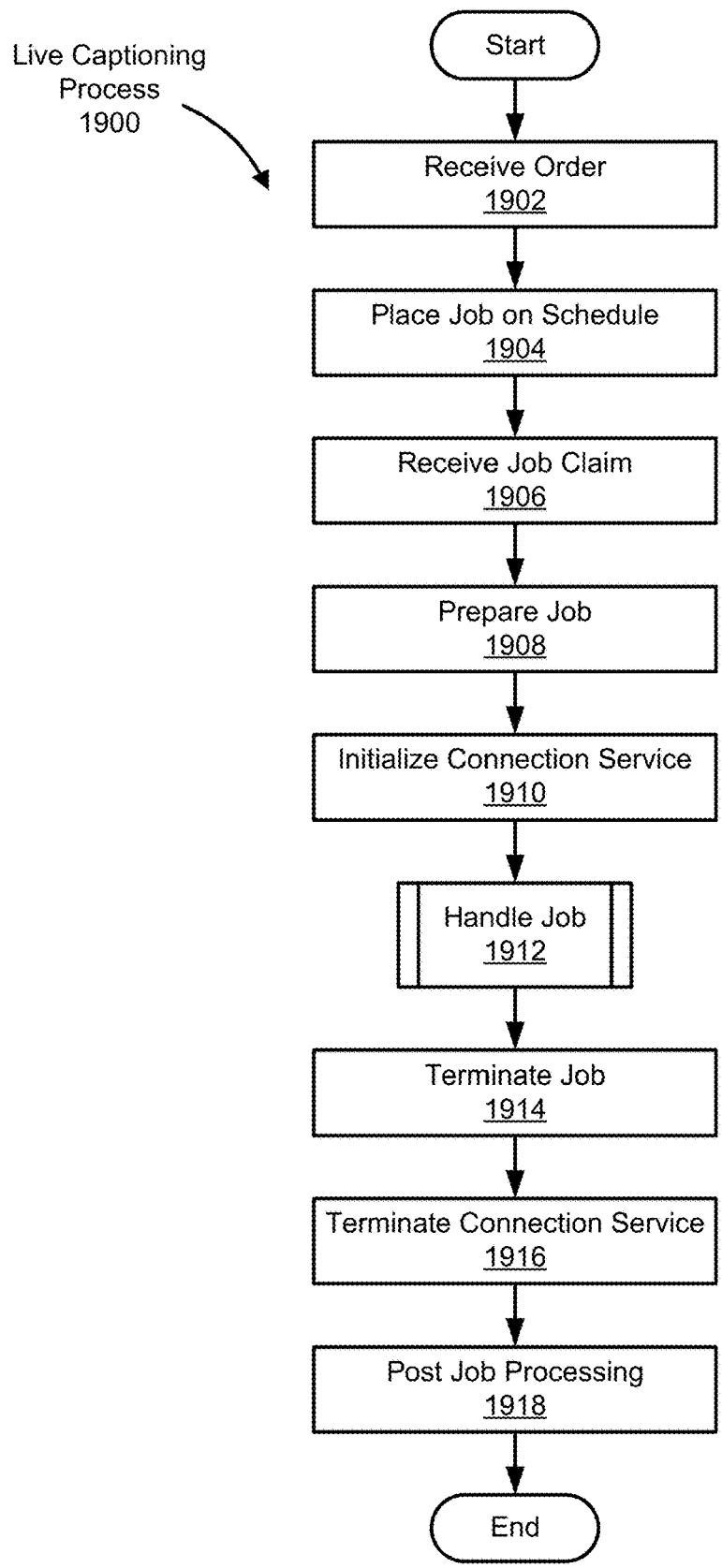
FIG. 19 is a flow diagram illustrating a process for providing live captioning services according to one example of the present disclosure.

In some implementations, processes are performed that generate captions of live events using a live caption system, such as the live caption system 100 described above with reference to FIG. 1. An example of one of these caption generation processes is illustrated by FIG. 19. According to this example, the live captioning process 1900 includes acts of receiving a receiving a captioning service request, scheduling a job to fulfill the request, receiving a claim for the job, prepare the job, initializing a connection service session, processing the job, terminating the job, terminating the connection service session, and executing post job processing.

In operation 1902, the live caption system receives a request for live captioning services of an event. In at least one example, the live caption system receives the request via a customer interface (e.g., the customer interface 224 of FIG. 2). For instance, in some examples, a customer (e.g., the customer 210 of FIG. 2) interacts with the customer interface via one or more user interface screens (e.g., the screens 400-800 of FIGS. 4-8) that prompt the customer to input the information required to complete the captioning service request. In some examples, the customer interface prompts for and receives input specifying an overall duration of the event as input distinct from a duration of human captioning. In certain examples, the input specifying the duration of human captioning may be less than the overall duration. In these examples, captions may be not generated or presented for segments of the event. Alternatively, in some examples, the customer interface prompts for and receives input specifying a detailed schedule for human captioning during the event and input specifying that automated captioning should be provided for other segments of the event.

In some examples of the operation 1902, the customer interface prompts for and receives input specifying a detailed schedule for human captioning during the event, input specifying a detailed schedule for automated captioning during the event, and input specifying whether captioning should be provided for other segments of the event. In certain examples, the input specifying whether captioning should be provided for the other segments may specify that captioning should not be provided for the other segments. This configuration could be useful, for example, if the event has a scheduled intermission or if a segment of the event was pre-recorded and pre-captioned.

In some examples of the operation 1902, the customer interface prompts for and receives input specifying a price-per-minute that the customer wishes to pay within a range from a "pure automation price rate" (e.g., $0.60/minute) to the "pure human price rate" (e.g., $2.50/minute). In these examples, the customer interface calculates, in response to reception of the input, a duration of human captioning and a duration of automated captioning and prompts the customer to distribute these durations within the event. It should be noted that, in some examples, the customer interface distributes the human captioning to the beginning of the event and the automated captioning to the remainder of the event, as a default distribution.

In some examples of the operation 1902, the customer interface prompts for and receives input specifying a detailed schedule for human captioning during the event. In certain examples, the customer interface also prompts for and receives distinct input specifying a duration of human captioning for the event. In these examples, where the duration of human captioning exceeds the duration of human captioning consumed by the detailed schedule, the customer interface prompts the customer to distribute the excess duration to the remainder of the event. In certain other examples, the customer interface also prompts for and receives distinct input specifying segments of the event for which no captioning is requested. In certain other examples, the customer interface also prompts for and receives distinct input specifying a price-per-minute that the customer wishes to pay within a range from the "pure automation price rate" to the "pure human price rate". In these examples, the customer interface calculates, in response to reception of the input, a duration of human captioning and a duration of automated captioning and prompts the customer to distribute these durations within the remainder of the event.

In some examples of the operation 1902, the customer interface prompts for and receives a target accuracy for the event. For instance, the customer interface can prompt the customer to select a point within an accuracy range with an upper bound equal to an accuracy rate achievable through human captioning (e.g., 95%) and a lower bound equal to an accuracy rate achievable through automated captioning (e.g., 80%). In these examples, the customer interface may further display a message to the customer indicating that the system will mix the duration of human and automated captioning (and thus the total cost of the live captioning service for the event) to reach the selected accuracy.

In some examples of the operation 1902, once the captioning service request has been created by the customer interface, the customer interface sends the captioning service request to a scheduling engine (e.g., the job scheduling engine 232 of FIG. 2) for further processing.

Continuing with the process 1900, in operation 1904 where the request includes at least one segment for which human live captioning services are requested, the scheduling engine creates a captioning job based on the captioning service request received in the operation 1902. For instance, in at least one example, the scheduling engine generates and inserts a job record in a job table (e.g., the job table 304 of FIG. 3) within the operation 1904. Additionally, where the captioning service request includes multiple segments, the scheduling engine creates multiple captioning jobs. For each job created, the scheduling engine stores a start time, an end time (or duration), and a payrate (or amount).

In some examples of the operation 1904, the scheduling engine calculates a buffered start time by subtracting a configurable amount of time (e.g., 15 minutes) from the scheduled start time of the event and stores the buffered start time as the start time for the job. This configurable amount of time provides a buffer in which the captioner can prepare to provide live captioning services. In some examples where the captioning service request includes a target accuracy, the scheduling engine sets a flag that indicates the duration for the job is approximate. This is advantageous because, in these examples, the scheduling engine monitors the actual accuracy of live captioning during the event and adjusts the remaining duration of human captioning required to achieve the target accuracy. Thus the remaining duration can vary at any given point in the event—depending on the level of accuracy already achieved during the event and the level of accuracy achievable by automatic live captioning.

In some examples of the operation 1904, the scheduling engine incorporates a machine learning process trained to set payrates for captioning jobs. In these examples, the machine learning process accepts feature vectors including elements that identify a job's difficulty, time until the event starts, number of available captioners, and target accuracy and outputs a payrate. Further, in these examples, the job's difficulty can itself be stored as a feature vector including elements that identify the customer, event description, event genre, wordlist contents, and content samples identified by the customer as being representative of the content to be generated at the event. Alternatively or additionally, the job's difficulty can be stored as a metric determined from one or more of the factors articulated above. This difficulty metric can be determine, for example, using a separate machine learning process that accepts the factors listed above as input and outputs a difficulty metric for the job.

In some examples of the operation 1904, the scheduling engine sets the payrate for captioning jobs to a fixed hourly rate (e.g., $30/hour). Further, in some examples, the scheduling engine sets the payrate as being "negotiable". In either case, in certain examples, the scheduling engine also accepts bids to complete the job from captioners, as will now be discussed with reference to operation 1906.

Continuing with the process 1900, in operation 1906 the live caption system receives a claim for a job. In at least one example, the live caption system receives the claim via a captioner interface (e.g., the captioner interface 226 of FIG. 2). For instance, in some examples, a captioner (e.g., the captioner 212 of FIG. 2) interacts with the captioner interface via one or more user interface screens (e.g., the screen 1000 of FIG. 10) that prompt the captioner to input the information required to complete the job claim. In some examples, the captioner interface prompts for and receives input specifying a duration of the event (e.g., the entire event or a segment of the event) that captioner wishes to claim and a payrate (e.g., the offered payrate or a bid) for which the caption is willing to perform the job. The bid may be, for example, a payrate higher or lower than the offered rate. In response to receiving the claim, the captioner interface passes the claim to the scheduling engine for processing.

In some examples of the operation 1906, the scheduling engine receives the claim for the job. In some examples, the claim may be for a job at the offered payrate and schedule. In this case, the scheduling engine prevents the job from being claimed by other captioners by, for example, changing a state variable in the job record for the job from "available" to "assigned", which will cause the captioner interface to not display the job to other captioners. In other examples, the claim is for a segment of the job. In these examples, the scheduling engine accepts the claim and generates one or more new jobs (via corresponding job records) for the remainder of the original job. Alternatively or additionally, in some examples, the scheduling engine tentatively accepts the claim. In these examples, the scheduling engine notifies the captioner (via a message to the captioner interface) that the tentative acceptance will be rescinded if another captioner claims the full job, or a larger segment of the job that encompasses the segment claimed by the captioner prior to a configurable cut-off time. In certain examples, this cut-off time is configured to be two hours prior to the start of the event.

In some examples of the operation 1906, the scheduling engine receives a claim with a bid for a job labeled as "negotiable". In these examples, the scheduling engine tentatively accepts the claim, but notifies the captioner (via a message to the captioner interface) that the tentative acceptance will be rescinded if another captioner outbids the captioner prior to a configurable cut-off time. In certain examples, this cut-off time is configured to be two hours prior to the start of the event.

In some examples of the operation 1906, the scheduling engine receives a claim with a bid for a segment of the job. In these examples, the scheduling engine tentatively accepts the claim, but notifies the captioner (via a message to the captioner interface) that the tentative acceptance will be rescinded if another captioner outbids the captioner, claims the full job, or claims a larger segment of the job that encompasses the segment in the claim prior to a configurable cut-off time. In certain examples, this cut-off time is configured to be two hours prior to the start of the event.

It should be noted that once the job is claimed, in some examples, the scheduling engine prevents the customer from cancelling the event or charges the customer a fee for cancellation. In the latter case, the captioner is paid a configurable percentage of the fee for the act of claiming the job. In these examples, as the scheduled event start time approaches, the scheduling engine increases the fees/payments for cancellation.

Continuing with the process 1900, in operation 1908 the live caption system prepares for the job. In some examples, the operation 1908 begins with a captioning client (e.g., the live captioning client 102 of FIG. 1) authenticating and logging in the captioner via the captioner interface. This authentication can occur, for example, at the captioner check-in time. In response to captioner login, the scheduling engine changes a state variable in the job record for the job from "assigned" to "in process" and records the current time in the job record. Further, in response to captioner login the captioning client presents information regarding the event to the captioner (e.g., via the user interface screen 1200 of FIG. 12). This information can include the identity of the customer, a description of the event, the genre of the event, an associated wordlist, speaker labels, and/or event samples identified by the customer and/or having an established commonality with the event (e.g., samples associated with the same customer and/or project as the event). In some examples, once the captioner has logged into the live caption system, the scheduling engine prevents the customer from cancelling the event or charges a fee for cancellation, in which case the captioner would be paid a configurable amount for her time.

In some examples of the operation 1908, after login the captioning client loads shortcut key assignments, speaker labels, and wordlists based on information provided by the customer regarding the event, based on default values, and/or based on captioner preferences. In these examples, the captioning client also loads and plays, upon request of the captioner, sample videos previously identified as being pertinent to the event.

In some examples of the operation 1908, the captioning client validates its audio connection and quality with an ASR engine (e.g., the ASR engine 104 of FIG. 1, which may be local to the captioning client or hosted by a computer system distinct from the host of the captioning client) by walking the captioner thru a test pattern. In these examples, the captioning client prompts the captioner to speak the test pattern into a microphone connected to the captioning client. The captioning client receives the resulting audio input and sends the input to a voice writing control (e.g., the text input control 1214 of FIG. 12). The voice writing control sends the audio input to the ASR engine, receives a response including ASR text generated from the audio input, and displays the ASR text and/or sends the ASR text to a caption control (e.g., the caption control 1212 of FIG. 12). Alternatively or additionally, the captioning client validates the audio connection by measuring volume ranges, clipping, distortion, frequency response, and the like and comparing these measurements to predefined threshold values to determine whether the audio quality is sufficient to support live captioning services. Where the captioning client is unable to validate its audio connection to the ASR engine, the captioning client autonomously notifies an administrator.

In some examples of the operation 1908, the captioning client validates its connection to a connection service (e.g., the connection service 108 of FIG. 1), a text streaming service (e.g., the text streaming service 120 of FIG. 1), and/or a caption service (e.g., the caption service 106 of FIG. 1). In some examples, the captioning client validates these connection by transmitting and receiving test communications (e.g. via a ping, HTTP, or the like). In addition, the captioning client validates its communication link with an administrator of the live captioning system so that the captioner can request additional information about the event, any special instructions associated with the event, or other aspects of the captioning job which may arise, e.g. from research that the captioner may perform during this preparation time.

In certain examples of the operation 1908, the captioning client primes the ASR engine with information applicable to the event to increase accuracy of recognition during the event. For instance, in some examples, the captioning client transmits a wordlist applicable to the event to the ASR engine and requests that the ASR engine use the wordlist to increase the likelihood of the ASR engine recognizing the wordlist items. Additionally or alternatively, in some examples, the captioning client transmits speaker-specific acoustic models to the ASR engine and requests that the ASR engine load these models to increase the likelihood of the ASR engine recognizing the words utilized by the captioner and/or the speakers. Additionally or alternatively, in some examples, the captioning client transmits genre-specific acoustic models to the ASR engine and requests that the ASR engine load these models to increase the likelihood of the ASR engine recognizing the words utilized in events within these genres.

In some examples of the operation 1908, where the event is segmented into multiple jobs for human captioners, one or more of which precedes the current job, or if the event is presently being automatically captioned, the captioning client displays the ongoing event (e.g., via the player control 1210 of FIG. 12) but does not accept entry of captions. Further, in these examples, the captioning client displays, as the scheduled start time for the job approaches, a countdown timer. After the expiration of the countdown timer, the captioning client enables text entry by the captioner (e.g., via the text input control 1214 of FIG. 12).

In some examples of the operation 1908, where the event is segmented into multiple human captioner jobs, one or more of which succeeds the current job, the captioning client displays instructions (e.g., via the event control 1216 of FIG. 12) to indicate when control of the captioning service will pass to a subsequent captioner. For example, these instructions may state that the captioner is about to handoff captioning and request that the captioner continue to provide live captioning services the captioning client displays an indication (e.g., via a modal dialog) that the next captioner has started providing captioning services. In some examples, the captioning client displays the indication upon receiving a message from the connection service that indicates the next captioner's audio connection to the ASR engine is producing valid output. The instructions displayed may also include an indication that the current captioner will be paid for any extra time they produce captions for the event.

Continuing with the process 1900, in operation 1910 the scheduling engine transmits, prior to the start time of a job, a message to the connection service via the connection service interface that indicates a time at which the job is scheduled to begin. In response to reception of this message, the connection service executes a pre-event sequence that includes establishing one or more connections to one or more other processes implemented within the live captioning system. These one or more other processes can include one or more sources of event content (e.g., the transcoding service 110 and/or the stream source 118 of FIG. 1), one or more ASR engines (e.g., the ASR engine 104 of FIG. 1), one or more sources for captured text generated by a captioning client (e.g., the live captioning client 102, the text streaming service 120, and/or the caption service 106 of FIG. 1), one or more targets for live captions (e.g., the transcoding service 110, the caption integrator 122, the data storage service 112, and/or the content delivery network 116 of FIG. 1), one or more targets for restreamed content from the event encoded with live captions (e.g., the restreaming integrator 124 of FIG. 1), and one or more targets for operational heartbeat messages (e.g., the scheduling engine 232 of FIG. 2). In some examples, the pre-event sequence also includes opening local files (e.g., in the data storage 1708 of FIG. 17) to store text and/or event content into local memory. It should be noted that the operation 1910 may be executed several minutes, or even hours, prior to a human captioner providing live captioning services to an event (e.g., where the beginning of the event is scheduled for automated captioning).

Continuing with the process 1900, in operation 1912 the live caption system processes the caption job. One example of a job handling process 2000 executed by the live caption system within the operation 1912 is illustrated with reference to FIG. 20.

In operation 2002, the connection service receives event content from the event content source connected to in operation 1910. In operation 2004, the captioning client receives event content and renders (e.g., in audio and/or video form) the event content to the captioner. It should be noted that, the operations 2002 and 2004 may be concurrent (e.g., where human captioning is scheduled to begin at the start of the event) or the operation 2004 may follow the operation 2002 (e.g., where automated captioning is scheduled to begin at the start of the event).

In operation 2006, the connection service generates and transmits a request for ASR processing to the ASR engine. In some examples, to generate the request, the connection service extracts audio from the event content and includes the audio in the request. Alternatively or additionally, in some examples, the connection service includes a copy of the event content as received in the request. In operation 2010, the connection service receives a response from the ASR engine that includes recognized text and metadata regarding the recognized text (e.g., words, confidences, alternative words/word-choice information, etc.) and stores this information in memory for subsequent processing. It should be noted that the connection service continuously exchanges event content with the ASR engine while the event is ongoing, independent of the state of the captioning client.

In operation 2008, the captioning client receives an indication (e.g., tap, mouse-click, keystroke, vocal utterance, etc.) that the captioner is ready to begin producing live captions. In some examples, this indication is the first utterance or keystrokes used by the captioner to produce live captions. Regardless of the particular form of the indication, within the operation 2008, the captioning client captures input (e.g., via the text input control 1214 of FIG. 12) from the captioner to produce captured text. This input can be vocal. For instance, in some examples, the captioning client receives, via a microphone, audio of the captioner re-speaking ("shadow speaking") appropriate words that the captioner hears from the event content. Alternatively or additionally, in some examples, the captioning client receives, via a keyboard, keystrokes for appropriate words that the captioner hears from the event content. These keystrokes can include shortcut key combinations. Moreover, these keystrokes can be received from a standard computer-keyboard or another peripheral, such as a stenographer's keyboard. In certain implementations, words received via keystrokes are assigned a high confidence score (e.g., 100%) to indicate the certainty of their recognition vis-à-vis words recognized by the ASR engine.

It should be noted that, in some examples, the keyboard-based input received in the operation 2008 can include corrections to and/or deletion of words recognized by the ASR engine. Moreover, both in re-speaking and in typing, the input need not, and generally will not, follow exactly the same wording uttered in the live event. For example, the input can include one or more of the following: added spoken or typed punctuation (e.g., "full stop", "comma" "quex", etc.); added spoken or typed indicators of speaker changes or speaker labels (e.g., "next speaker", "speaker 1" "counselor johnson", etc.); added spoken or typed indicators of caption frame boundaries (e.g., "new caption", "end caption", etc.); and/or added spoken or typed indicators of non-speech sounds, such as "[APPLAUSE]", "[MUSIC PLAYING]" or "[INAUDIBLE]". Alternatively or additionally, the input can include spoken or typed numeric or other information in a way that disambiguates formatting choices (e.g., speaking "September eighth twenty" as opposed to "nine eight twenty"). The input can also include input that ignores hesitation words (such as "um" and "ah") or restarts or other disfluencies in the live speech. In some examples, these interpretive actions are important in light of the arbitration between the ASR text and captured text as explained below.

In the operation 2012, the captioning client transmits a request for ASR processing to the ASR engine. This request includes the voice input. In the operation 2014, the captioning client receives recognized text and metadata. In the operation 2016, the captioning client displays the text from the ASR output in a text input control (e.g., the text input control 1214 of FIG. 12). After expiration of a configurable time period or in response to captioner input, the captioning client transfers the text (and any keyboard-based input received from the captioner) to a caption control (e.g., the caption control 1212 of FIG. 12). Alternatively or additionally, in some examples, the captioning client transmits the captured text, timestamps (e.g., relative to the start of the event), and/or other metadata to a captured text target. This captured text target can be a text streaming service (e.g., the text streaming service 120 of FIG. 1), the connector (e.g., via HTTP(S) or a web socket), and/or through another connector interface (e.g., the connection service interface 238 of FIG. 2).

In operation 2018, the connection service receives captured text and metadata from an captured text source (e.g., the captured text target of the operation 2016). In some examples, the connection service stores the captured text and metadata in a buffer separate from the buffer used to store the ASR text and metadata received from the ASR engine, and thereby begins to arbitrate between the two sources of captioning information for the event. Simultaneously, the connection service stores the contents of these buffers into local disk files for later processing as described below.

In operation 2020, the connection service generates caption text. As part of the operation 2020, the connection service arbitrates between two sources of text, the ASR text source buffer and the captured text source buffer. Given the inherent delay in composing caption frames, the connection service can arbitrate between the two sources in a number of ways. For instance, in some examples, the connection service prefers the text coming from the captured text source in creating the caption text. In these examples, only the captured text buffer is used to create caption text. Alternatively or additionally, in some examples, the connection service prefers the text coming from the captured text source by default and fails over to the ASR text source where the captured text source does not provide captured text within a configurable time delay threshold (e.g., 5 seconds) or the captured text does not include words, but the ASR text source does provide timely text including words. In these examples, the connection service reverts to the captured text source where the captured text source delivers timely text including words for greater than a configurable period of time. It should be noted that these examples transparently handle situations where a human captioner is unavailable (e.g. unscheduled or due to job termination) for some period of time during the event.

In certain examples, the connection service prefers the text coming from the captured text source and fails over to the ASR text source where heartbeat messages from the captioning client fail to arrive for a configurable period of time. In these examples, where text received from the captured text source does not contain words, but heartbeat messages are still arriving from the captioning client, the connection service produces no caption text. This configuration enables the connection service to properly handle silence during the event, even where background noise is present.

In some examples, the connection service selects which source of information to use for the captions based on confidence measures present in the metadata arriving and buffered from the ASR text source and the captured text source. For instance, in some examples, the connection service uses the ASR text source where the metadata from the ASR text source includes confidence metrics (e.g. the average confidence or duration-weighted average confidence for all words) above a configurable threshold. For example, the connection service may prefer the ASR text source if the confidence computed in this way is greater than 95%. Similarly, in certain examples, the connection service uses the captured text source where the metadata from the captured text source includes confidence metrics above a configurable threshold. Alternatively or additionally, in some examples, the connection service uses the text source with higher confidence in its words.

In some examples, the connection service runs a process that compares text produced by the two sources and computes an accuracy metric for the ASR text source based on its agreement with the captured text source. For instance, in one example, the accuracy metric is the percentage of words produced by the ASR text source that match (e.g. are the same as (or within a configurable threshold similarity to)) corresponding words produced by the captured text source. For example, if the captured text source is "It is hard to recognize speech", whereas the ASR text source is "It is hard to wreck a nice beach", the ASR accuracy would be computed as 50%, since only the first four words of the eight recognized words are correct. In these examples, the connection service can identify the ASR text source as the source of caption text where the accuracy metric transgresses a threshold value. It should be noted that this method can be used to continually update the accuracy estimate for the ASR text, with more and more text being compared as the event and captioning jobs proceed. Further, in these examples, the connection service can optimize for customer cost where the customer has selected a target accuracy for captioning services by utilizing the ASR text source where the accuracy metrics meet the target accuracy. It should be noted that, in some examples, the comparison process may increase the frequency with which comparisons between the sources are made where the audio attributes of the event or system change (e.g., where audio conditions or speakers change). It should be further noted that, in some examples, the comparison process ignores some of the non-verbal textual information coming from captured text source (e.g., speaker labels, punctuation, capitalization, sound effect indicators, etc.) to create the accuracy metric.

In some examples, the connection service utilizes other factors to arbitrate between the two sources. For instance, in certain examples, the connection service monitors a frequency of words coming from each source and selects the source with a higher frequency as the source of caption text. In some of these examples, the connection service calculates word frequency over a configurable time window (e.g., a 10-second window, a 20-second window, a 60-second window, etc.). In some examples, the connection service monitors a relative delay between the two sources. In these examples, the connection service compares text produced by both sources to identify text from one source that corresponds to text from the other source and calculates a relative delay between the sources based on timestamps indicating the arrival time of the corresponding text from each source. Further, in these examples, the connection service selects the source with earlier arriving text where the relative delay exceeds a configurable threshold (e.g., 0.5 seconds, 1 second, etc.). In some examples, the connection service monitors the sources of text for consistency of connection and/or presence of words. In these examples, the connection service calculates a percentage of a time window having a configurable duration during which the captured text source fails to produce text and/or heartbeat messages from the captioning client are not received. Where this percentage of the event duration exceeds a configurable threshold value, the connection service selects the ASR text source as the caption text source. In some examples, the connection service monitors text from the two sources for the presence of words from a wordlist associated with the job and selects, as the caption text source, the text source that includes more of the wordlist words.

Combinations of the above arbitration methods may be used in general to optimize the reliability, accuracy, and consistency of the caption text produced by the connection service. In all of the above cases and combinations, the connection service can wait a certain time period and/or number of caption frames before selecting one or the other source as the caption text source. It should be noted that such a time delay will improve the consistency of the caption text. Also, it should be noted that, in some examples, the connection service continually monitors both text sources, independent of which is the currently preferred source. In these examples, the connection service switches the preferred source any number of times during the event.

Independent of which source(s) of text is/are being used to create caption text for the event, in some examples, the connection service waits for a configurable time period or for a configurable number of words or characters before creating each caption frame. For example, the connection service can be configured to wait for a configurable number of seconds (e.g. 5 seconds) prior to transforming the contents of its buffer(s) into a caption frame. Alternatively or additionally, the connection service can be configured to wait for a configurable number of words or characters before forming the caption frame. Alternatively or additionally, these conditions may be combined in boolean fashion to require both a certain duration and certain number of words/characters or either threshold being reached. Other rules, such as keying on certain punctuation marks or parts of speech, may be used to trigger caption framing.

In some examples of the operation 2020, the connection service applies postprocessing to text included in a caption frame to improve the output per customer requirements. For instance, in certain examples, the connection service deletes or obscures (e.g. using a token like "[BLEEP]" or "*") words that the customer deems as offensive. In this example, the connection service retrieves the customer's sensitivity level from a customer data store (e.g., the customer table 300 of FIG. 3) and identifies a reference (e.g., a lookup table of offensive words, a regular expression matching of such words, or a customer-provided list of words to exclude that matches the customer's sensitivity level). Then the connection service checks caption text against the identified reference to determine whether each word should be deleted or obscured. For example, a sensitivity level of "1" may indicate that certain very offensive words or phrases should be deleted or obscured, whereas a sensitivity level of "3" may indicate that even plausibly non-offensive words should be treated in this way due to the risk that they may offend some users.

In some examples of the operation 2020, the connection service formats certain caption words or phrases per customer preference. For example, using customer-provided wordlists, the connection service builds a lookup table or a regular expression for capitalization which matches against non-capitalized versions of wordlists and converts them to the customer's spelling. Additionally or alternatively, in the case of customer-provided acronyms, the connection service builds up a regular expression matcher which then converts sequences of letters to the acronym form. For example, to create the acronym "ABC" from other sequences of the letters "a", "b", and "c", the connection can employ the following regular expression.

[Aa]\.??[Bb]\.??[Cc]\

In some examples of the operation 2020, the connection service adds or deletes punctuation and capitalization in ASR-provided words using a punctuation model. In some examples, the punctuation model includes one or more human-generated rules (e.g., logical implications) defined by the customer. In other examples, the model is a machine learning model trained using captions created during completion of previous human captioning jobs.

Continuing with the process 2000, in operation 2022 the connection service transmits caption text to the one or more caption text targets, such as those connected to within the operation 1910. For instance, in some examples, the connection service may transmit captions to a caption integrator (e.g., the caption integrator 122 of FIG. 1). In these examples the caption integrator may be exposed by a video platform (e.g. Zoom or YouTube) at a URL identified within the customer's account information using an event identifier of the video platform (e.g. an "event ID" on the Zoom platform). The transmissions from the connection service to the caption integrator may take the form of, for example, HTTP POSTs to the URL with the caption contents as a payload. Alternatively or additionally, the connection service may add the caption text to the event content using a transcoding operation (e.g., via the transcoding service 110 and/or a local transcoder) to embed the captions in 608 or 708 format, and then transmit the captioned event content as a restreamed a restreaming integrator (e.g., the restreaming integrator 124 of FIG. 1). This restreaming integrator may be accessible, for example, at a destination streaming URL received in a captioning service request (e.g., as received in the operation 1902 described above).

Continuing with the operation 2022, the connection service stores the caption text in a data storage service (e.g., the data storage service 112 of FIG. 1). This data storage service may be, for example, a cloud-accessible storage medium such as Amazon's Simple Storage Service. Alternatively or additionally, in certain examples, the connection service stores the caption text in a content delivery network (e.g., the content delivery network 116 of FIG. 1) that fronts the data storage service. In either case, a viewing client (e.g., the viewing client 114 of FIG. 1) can access the caption text stored thusly and to display the caption text in a "div" via, for example, a plugin.

Within the process 2000, in operation 2024 the connection service periodically (e.g., once per minute) sends heartbeat messages to the caption service to communicate status information. In some examples, one or more of the heartbeat messages communicate status information simply by being transmitted to and being received by the caption service (e.g., the one or more heartbeat messages specify no additional information). Alternatively or additionally, in some examples, one or more of the heartbeat messages specify additional information, such as that the connection service is operational, that the connection service is (or is not) receiving event content, that the connection service is (or is not) extracting audible audio data from the event content, that the connection service is (or is not) receiving ASR text and metadata from an ASR text source, that the connection service is (or is not) receiving captured text and metadata from an captured text source, that the connection service is (or is not) sending caption text to one or more caption targets, and/or that the connection service is (or is not) sending captioned event content to one or more restreaming targets.

Continuing with the process 2000, in operation 2026 the caption service (e.g., via the connection service interface 238 of FIG. 2) processes heartbeat messages received from the connection service or takes action based on a lack thereof. For instance, in some examples, the caption service restarts the connection service where the caption service receives no heartbeat messages for a configurable period of time (e.g., 2 minutes). Alternatively or additionally, in some examples, the caption service prompts the customer (e.g., via the customer interface) to check and troubleshoot the customer's video infrastructure (e.g., camera, encoder, network connection, etc.) where the connection service is not receiving video content. Alternatively or additionally, in some examples, the caption service prompts the customer (e.g., via the customer interface) to check and troubleshoot the customer's audio infrastructure (e.g., microphone, encoder, network connection, etc.) where the connection service is not receiving audio content with sufficient energy to be audible. Alternatively or additionally, in some examples, the caption service restarts the ASR engine where the connection service has not receiving ASR text for a configurable period of time (e.g., 1 minute). Alternatively or additionally, in some examples, the caption service prompts the captioner (e.g., via the captioner interface) to check and troubleshoot the captioning client where the connection service is not receiving captured text from the captured text source. This troubleshooting can include reinitiating the captioning client and/or the network connection utilized by the captioning client. Alternatively or additionally, in some examples, the caption service prompts the customer (e.g., via the customer interface) to validate that the URL information is correct and/or that the systems that are consuming data at the given URL(s) are functioning correctly where the connection service is not successfully posting captions or restreaming the 608-encoded captions. Alternatively or additionally, in some examples, the caption service prompts an administrator (e.g., via an administrative interface such as the administrator interface 130 of the 'Electronic Transcription Job Market' application) to diagnose other live captioning system processes (e.g., the data storage service 112 of FIG. 1 and connections thereto) where the connection service is not successfully posting captions or restreaming the 608-encoded captions.

As illustrated by the various examples described above, the heartbeat messages may be used in general by the caption service to present information to various users (e.g. customers, captioners, administrators) that can be used to rectify problems encountered while processing captioning jobs and/or to notify the users of expected state transitions.

Within the process 2000, in operation 2028 the captioning client periodically (e.g., once per minute) sends heartbeat messages to the connection service to communicate status information. In some examples, one or more of the heartbeat messages communicate status information simply by being transmitted to and being received by the connection service (e.g., the one or more heartbeat messages specify no additional information). Alternatively or additionally, in some examples, one or more of the heartbeat messages specify additional information, such as that the captioning client is operational, that the captioning client is (or is not) receiving event content, that the captioning client is (or is not) extracting audible audio data from the event content, that the captioning client is (or is not) receiving ASR text and metadata from an ASR engine, that the captioning client is (or is not) receiving text from a captioner, and/or that the captioning client is (or is not) sending captured text to the connection service.

Continuing with the process 2000, in operation 2030 the connection service processes heartbeat messages received from the captioning client or takes action based on a lack thereof. In some examples, the stores heartbeat messages in a local storage (e.g., the data storage 1708 of FIG. 17) and processes the heartbeat messages to arbitrate between the ASR text source and the captured text source.

Returning to the process 1900 of FIG. 19, in operation 1914 the live caption system terminates a captioner's participation in a captioning job. In some examples, within the operation 1914, the captioning client communicates a job termination message (e.g., via HTTP POST) to the caption service to indicate that the captioner's participation has ended. The captioning client may communicate a job termination message in response to a number of occurrences. For instance, in some examples, the captioning client communicates a job termination message where the captioner's schedule time to provide captioning services has ended, where the event has ended, where the captioner has input data requesting termination of the captioner's provision of captioning services, and/or where the captioner has been relieved by another captioner.

Continuing with the operation 1914, the caption service processes the job termination message by executing a sequence of operations. In some examples, this sequence of operations includes transitioning the state of the job to "complete" and storing a timestamp indicating the time of this transition in the job table; communicating an event termination message to the connection service, where the event's scheduled time has transpired; notifying the customer of termination of the job (e.g., via email and/or the customer interface); and/or notifying an administrator (e.g., via email and/or an administrative interface) of termination of the job. In certain examples, where the caption service continues to receive heartbeat messages from the connection service after receiving a job termination message, the caption service creates (e.g., via the scheduling engine) an urgent captioning job and places the urgent job on the schedule. In this way, the caption service notifies captioners who are online, or otherwise available, of the need to continue providing captioning services to the event. In certain implementations, to incentivize captioners to take unexpected and urgent jobs, the caption service highlights urgent jobs in the captioner interface and/or increases the job's payrate (e.g., by 1.5 times or 2 times). It should be noted that, in some examples, where the live event ends prior to the schedule time (e.g., a time for which the captioner agreed to be available), the caption service charges the customer for the event as fully scheduled, and also pays the captioner for the entire time period.

Continuing with the process 1900, in operation 1916 the connection service terminates captioning job processing. Within the operation 1916, the connection service may terminate processing of the captioning job in response to a number of occurrences. Examples of these occurrences can include expiration of the period of time scheduled for the event associated with the job, a discontinuity in reception of event content that exceeds a configurable amount of time (e.g., 5 minutes), a discontinuity in reception of text from the captured text source and/or the ASR text source that exceeds a configurable amount of time (e.g., 5 minutes), and or reception of a termination request from the customer interface.

Continuing with the operation 1916, in some implementations, the connection service executes a termination process that includes one or more of the following actions. The connection service stores a copy of the captured text and metadata in a permanent storage location (e.g., the data storage service 112 of FIG. 1). The connection service stores a copy of the ASR text and metadata in the permanent storage location. The connection service stores a copy of the caption text in the permanent storage location. The connection service stores a copy of the event content in the permanent storage location. The connection service stores a copy of captioned event content in the permanent storage location. The connection service communicates the storage locations of the copies stored to the caption service. The connection service disconnects from all other processes within the live captioning system, except for the caption service. The connection service communicates a termination message to the caption service that indicates the termination process has successfully completed.

Continuing with the operation 1916, in certain examples, the caption service responds to reception of a termination message from the connection service by executing an accounting process including any of several operations. For instance, in some examples, the caption service calculates the price of the captioning service to the customer based on the amount of time that human captioners interacted with captioning clients during the event. In these examples, the caption service calculates an event duration (e.g., event end time—event start time) and a captioner duration (e.g., a sum of the amounts of time that a captioner worked on the event (e.g., amounts of time when the job(s) associated with the event were in the "in progress" state). Further, in these examples, the caption service calculates the price to the customer according to the following equation.

$$\text{Customer price} = (CD * CR) + ((ED - CD) * AR),$$ where
CD=captioner duration, CR=captioner price rate, ED=event duration, and AR=automated price rate.

In some examples, prior to calculating customer price using the equation recited above, the caption service adjusts the captioner duration by subtracting amounts of time during the event when captured text and/or heartbeat messages from the captioning client were not being received at the connection service. This adjustment reflects periods of time when the caption text generated by the connection service was based on ASR text.

In some implementations, the caption service calculates captioner pay by multiplying the captioner duration, calculated using any of the processes described above, by the captioner payrate. It should be noted that the captioner duration can include preparation time in addition to time spent generating captured text.

Continuing with the process 1900, in operation 1918 the caption service generates a full or partial transcription where the customer has requested the same. In some examples, within the operation 1918, the scheduling engine creates and schedules a transcription job that targets a copy of the event content saved to the permanent data storage during the captioning job. Once the transcription job is created, the caption service acts as the transcription system 100 as described in the 'Electronic Transcription Job Market' application in stewarding the transcription job to completion. In some examples, where only a segment of the event content is selected for transcription, the resulting transcription can be merged with the caption text generated by the captioning job to create a single transcription.

It should be noted that a full transcription of event content can be created where a copy of the event content was not saved to the permanent data storage, provided that the customer saved another copy of the event content to another location. In this situation, the customer can use the transcription functionality provided by the captioning service to order and receive the full transcription by uploading the other copy of the event content to the captioning service.

The processes depicted herein are particular sequences of operation in particular examples. The operations included in these processes may be performed by, or using, one or more computer systems specially configured as discussed herein. Some operations are optional and, as such, may be omitted in accord with one or more examples. Additionally, the order of operations can be altered, or other operations can be added, without departing from the scope of the systems and processes discussed herein. Furthermore, as discussed above, in at least one example, the operations are performed on a particular, specially configured machine, namely a live caption system configured according to the examples disclosed herein.

Having thus described several aspects of at least one example, it is to be appreciated that various alterations, modifications, and improvements will readily occur to those skilled in the art. For instance, examples disclosed herein may also be used in other contexts. In one such example, the arbitration processes described herein can be used to arbitrate between to differently trained ASR processes. Such alterations, modifications, and improvements are intended to be part of this disclosure, and are intended to be within the scope of the examples discussed herein. Accordingly, the foregoing description and drawings are by way of example only.

The invention claimed is:

1. A computer system configured to generate captions, the computer system comprising:
a memory; and
at least one processor coupled to the memory and configured to
access a first buffer configured to store text generated by an automated speech recognition (ASR) process;
access a second buffer configured to store text generated by a captioning client process;
arbitrate between the first buffer and the second buffer to identify either the first buffer or the second buffer as a source buffer of caption text;
generate caption text from the source buffer; and
communicate the caption text to a target process.

2. The computer system of claim 1, wherein to arbitrate comprises to always identify the second buffer.

3. The computer system of claim 1, further comprising the captioning client process, wherein:
to arbitrate comprises to:
identify the second buffer by default; and
identify the first buffer after expiration of a threshold time period since the text generated by the captioning client process was last received in the second buffer.

4. The computer system of claim 1, further comprising the captioning client process, wherein:
the captioning client process is configured to generate heartbeat messages; and
to arbitrate comprises to:
identify the second buffer by default; and
identify the first buffer after expiration of a threshold time period since a heartbeat message was last generated by the captioning client process.

5. The computer system of claim 1, wherein:
the first buffer is further configured to store a confidence metric regarding the text generated by the ASR process; and
to arbitrate comprises to identify the first buffer where the confidence metric exceeds a threshold value.

6. The computer system of claim 1, wherein:
the second buffer is further configured to store a confidence metric regarding the text generated by the captioning client process; and
to arbitrate comprises to identify the second buffer where the confidence metric exceeds a threshold value.

7. The computer system of claim 1, wherein:
the first buffer is further configured to store a confidence metric regarding the text generated by the ASR process;
the second buffer is further configured to store a confidence metric regarding the text generated by the captioning client process; and
to arbitrate comprises to identify a buffer storing a higher confidence metric as the source buffer.

8. The computer system of claim 1, wherein to arbitrate comprises to:
calculate a percentage of words within the first buffer that match to corresponding words in the second buffer; and
identify the first buffer as the source buffer where the percentage of words transgresses an accuracy threshold.

9. The computer system of claim 1, wherein to arbitrate comprises to identify a buffer storing words with greater frequency as the source buffer.

10. The computer system of claim 1, wherein to arbitrate comprises to identify a buffer storing words with less latency as the source buffer.

11. The computer system of claim 1, wherein to arbitrate comprises to identify a buffer storing a greater number of words from a wordlist as the source buffer.

12. The computer system of claim 1, further comprising a network interface, wherein the at least one processor is further configured to:
receive event content via the network interface;
communicate the event content to the ASR process;
receive the text generated by the ASR process based on the event content; and
store the text generated by the ASR process in the first buffer.

13. The computer system of claim 12, wherein the ASR process is a first ASR process and the captioning client process is configured to:
 receive vocal input from a user;
 communicate the vocal input to a second ASR process;
 receive text generated by the second ASR process based on the vocal input; and
 store the text generated by the second ASR process in the second buffer.

14. The computer system of claim 13, wherein the captioning client process is further configured to:
 receive the event content; and
 present the event content via a user interface.

15. The computer system of claim 13, wherein the first ASR process and the second ASR process are distinct processes.

16. The computer system of claim 13, wherein the captioning client process is further configured to:
 receive additional input from the user; and
 modify the text generated by the second ASR process based on the additional input before the text generated by the second ASR process is stored in the second buffer.

17. A method of generating captions, the method comprising:
 accessing a first buffer configured to store text generated by an automated speech recognition (ASR) process;
 accessing a second buffer configured to store text generated by a captioning client process;
 arbitrating between the first buffer and the second buffer to identify either the first buffer or the second buffer as a source buffer of caption text;
 generating caption text from the source buffer; and
 communicating the caption text to a target process.

18. The method of claim 17, wherein arbitrating comprises identifying the second buffer only.

19. The method of claim 17, further comprising:
 storing the text generated by the ASR process in the first buffer; and
 storing the text generated by the captioning client process in the second buffer, wherein
 arbitrating comprises:
  identifying the second buffer by default; and
  identifying the first buffer after expiration of a threshold time period since text was last stored in the second buffer.

20. The method of claim 17, further comprising generating heartbeat messages, wherein arbitrating comprises:
 identifying the second buffer by default; and
 identifying the first buffer after expiration of a threshold time period since a heartbeat message was last generated.

21. The method of claim 17, further comprising accessing a confidence metric regarding the text generated by the ASR process, wherein arbitrating comprises identifying the first buffer where the confidence metric exceeds a threshold value.

22. The method of claim 17, further comprising accessing a confidence metric regarding the text generated by the captioning client process, wherein arbitrating comprises identifying the second buffer where the confidence metric exceeds a threshold value.

23. The method of claim 17, further comprising:
 accessing a confidence metric regarding the text generated by the ASR process;
 accessing a confidence metric regarding the text generated by the captioning client process; and
 arbitrating comprises identifying a buffer storing a higher confidence metric as the source buffer.

24. The method of claim 17, wherein arbitrating comprises:
 calculating a percentage of words within the first buffer that match to corresponding words in the second buffer; and
 identifying the first buffer as the source buffer where the percentage of words transgresses an accuracy threshold.

25. The method of claim 17, wherein arbitrating comprises identifying a buffer storing words with greater frequency as the source buffer.

26. The method of claim 17, wherein arbitrating comprises identifying a buffer storing words with less latency as the source buffer.

27. The method of claim 17, wherein arbitrating comprises identifying a buffer storing a greater number of words from a wordlist as the source buffer.

28. The method of claim 17, further comprising:
 receiving event content via a network interface;
 communicating the event content to the ASR process;
 receiving the text generated by the ASR process based on the event content; and
 storing the text generated by the ASR process in the first buffer.

29. The method of claim 28, wherein the ASR process is a first ASR process and the method further comprises:
 receiving vocal input from a user;
 communicating the vocal input to a second ASR process;
 receiving text generated by the second ASR process based on the vocal input; and
 storing the text generated by the second ASR process in the second buffer.

30. The method of claim 29, further comprising:
 receiving the event content; and
 presenting the event content via a user interface.

31. The method of claim 29, wherein communicating the vocal input to the second ASR process comprises communicating the vocal input to a second ASR process that is distinct from the first ASR process.

32. The method of claim 29, further comprising:
 receiving additional input from the user; and
 modifying the text generated by the second ASR process based on the additional input before the text generated by the second ASR process is stored in the second buffer.

33. One or more non-transitory computer readable media storing computer-executable sequences of instructions to generate captions via a computer system, the sequences of instructions comprising instructions to:
 access a first buffer configured to store text generated by an automated speech recognition (ASR) process;
 access a second buffer configured to store text generated by a captioning client process;
 arbitrate between the first buffer and the second buffer to identify either the first buffer or the second buffer as a source buffer of caption text;
 generate caption text from the source buffer; and
 communicate the caption text to a target process.

34. The one or more non-transitory computer readable media of claim 33, wherein the instructions to arbitrate comprise instructions to identify the second buffer only.

35. The one or more non-transitory computer readable media of claim 33, wherein the sequences of instructions further comprise instructions to:

store the text generated by the ASR process in the first buffer; and store the text generated by the captioning client process in the second buffer, wherein the instructions to arbitrate comprise instructions to:
identify the second buffer by default; and
identify the first buffer after expiration of a threshold time period since text was last stored in the second buffer.

36. The one or more non-transitory computer readable media of claim 33, wherein the sequences of instructions further comprise instructions to generate heartbeat messages, wherein the instructions to arbitrate comprise instructions to:
identify the second buffer by default; and
identify the first buffer after expiration of a threshold time period since a heartbeat message was last generated.

37. The one or more non-transitory computer readable media of claim 33, wherein the sequences of instructions further comprise instructions to access a confidence metric regarding the text generated by the ASR process, wherein the instructions to arbitrate comprise instructions to identify the first buffer where the confidence metric exceeds a threshold value.

38. The one or more non-transitory computer readable media of claim 33, wherein the sequences of instructions further comprise instructions to access a confidence metric regarding the text generated by the captioning client process, wherein the instructions to arbitrate comprise instructions to identify the second buffer where the confidence metric exceeds a threshold value.

39. The one or more non-transitory computer readable media of claim 33, wherein the sequences of instructions further comprise instructions to:
access a confidence metric regarding the text generated by the ASR process; and
access a confidence metric regarding the text generated by the captioning client process, wherein the instructions to arbitrate comprise instructions to identify a buffer storing a higher confidence metric as the source buffer.

40. The one or more non-transitory computer readable media of claim 33, wherein the instructions to arbitrate comprise instructions to:
calculate a percentage of words within the first buffer that match to corresponding words in the second buffer; and
identify the first buffer as the source buffer where the percentage of words transgresses an accuracy threshold.

41. The one or more non-transitory computer readable media of claim 33, wherein the instructions to arbitrate comprise instructions to identify a buffer storing words with greater frequency as the source buffer.

42. The one or more non-transitory computer readable media of claim 33, wherein the instructions to arbitrate comprise instructions to identify a buffer storing words with less latency as the source buffer.

43. The one or more non-transitory computer readable media of claim 33, wherein the instructions to arbitrate comprise instructions to identify a buffer storing a greater number of words from a wordlist as the source buffer.

44. The one or more non-transitory computer readable media of claim 33, wherein the sequences of instructions further comprise instructions to:
receive event content via a network interface;
communicate the event content to the ASR process;
receive the text generated by the ASR process based on the event content; and
store the text generated by the ASR process in the first buffer.

45. The one or more non-transitory computer readable media of claim 44, wherein the ASR process is a first ASR process and the sequences of instructions further comprise instructions to:
receive vocal input from a user;
communicate the vocal input to a second ASR process;
receive text generated by the second ASR process based on the vocal input; and
store the text generated by the second ASR process in the second buffer.

46. The one or more non-transitory computer readable media of claim 45, wherein the sequences of instructions further comprise instructions to:
receive the event content; and
present the event content via a user interface.

47. The one or more non-transitory computer readable media of claim 45, wherein the instructions to communicate the vocal input to the second ASR process comprise instructions to communicate the vocal input to a second ASR process that is distinct from the first ASR process.

48. The one or more non-transitory computer readable media of claim 45, wherein the sequences of instructions further comprise instructions to:
receive additional input from the user; and
modify the text generated by the second ASR process based on the additional input before the text generated by the second ASR process is stored in the second buffer.

* * * * *